United States Patent [19]
Kobayashi et al.

[11] Patent Number: 5,386,372
[45] Date of Patent: Jan. 31, 1995

[54] VIBRATION/NOISE CONTROL SYSTEM FOR VEHICLES

[75] Inventors: Toshiaki Kobayashi; Masaki Ueyama; Toshio Yokoyama; Yasuji Nozawa; Hidetaka Ozawa, all of Wako, Japan

[73] Assignee: Honda Giken Kogyo Kabushiki Kaisha, Tokyo, Japan

[21] Appl. No.: 29,909

[22] Filed: Mar. 11, 1993

[30] Foreign Application Priority Data

Mar. 12, 1992 [JP] Japan ................................. 4-088075
Jun. 3, 1992 [JP] Japan ................................. 4-168628

[51] Int. Cl.⁶ ........................................... G01K 11/16
[52] U.S. Cl. .................................... 364/574; 364/581
[58] Field of Search ............................. 364/572–581; 244/17.1, 17.13

[56] References Cited

U.S. PATENT DOCUMENTS

| | | | |
|---|---|---|---|
| 4,715,559 | 12/1987 | Fuller | 244/1 N |
| 4,878,188 | 10/1989 | Ziegler, Jr. | |
| 5,146,505 | 9/1992 | Pfaff et al. | 381/71 |
| 5,222,148 | 6/1993 | Yuan | 381/71 |

FOREIGN PATENT DOCUMENTS

| | | |
|---|---|---|
| 412853A2 | 8/1990 | European Pat. Off. . |
| 465174A2 | 1/1992 | European Pat. Off. . |
| 479367A3 | 4/1992 | European Pat. Off. . |
| 164400 | 7/1987 | Japan . |
| 3219139 | 9/1991 | Japan . |
| 2239577 | 7/1991 | United Kingdom . |
| WO8802912 | 4/1988 | WIPO . |

OTHER PUBLICATIONS

Publication entitled "Signal Processing for Active Control", Apr. 9–11, 1991, Author Hareo Hamada; International Symposium on Active Control of Sound and Vibration.

Primary Examiner—Emanuel T. Voeltz
Assistant Examiner—Craig Steven Miller
Attorney, Agent, or Firm—Lyon & Lyon

[57] ABSTRACT

A plurality of pulse signals (trigger signals) responsive to driving of a power plant are directly supplied to respective adaptive control circuits each having an adaptive digital filter for controlling components of periodic or semi-periodic vibrations and noises ascribed to related component parts of a vibration/noise source. Further, the adaptive control is performed while varying a sampling frequency in response to changes in parameters of operating conditions of the power plant. Optionally, a control signal from the adaptive digital filter is corrected for gain. Further, periodic signal-eliminating means is provided for determining a transfer characteristic of a system to which the adaptive control is applied, based on a residual component signal from the periodic signal-eliminating means, a random signal having a low amplitude level, etc.

39 Claims, 35 Drawing Sheets

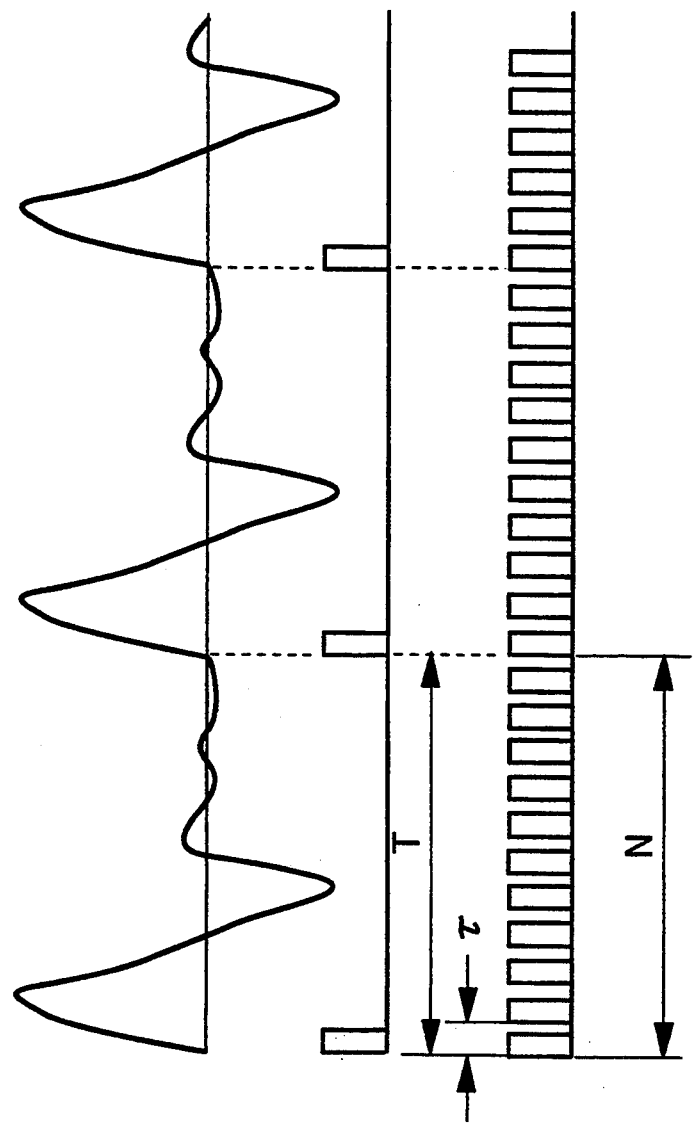

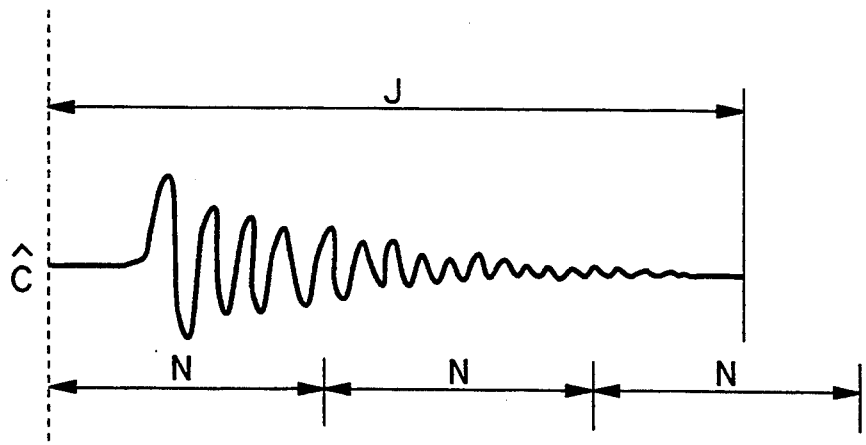
FIG.14a FILTER COEFFICIENT $\hat{c}$
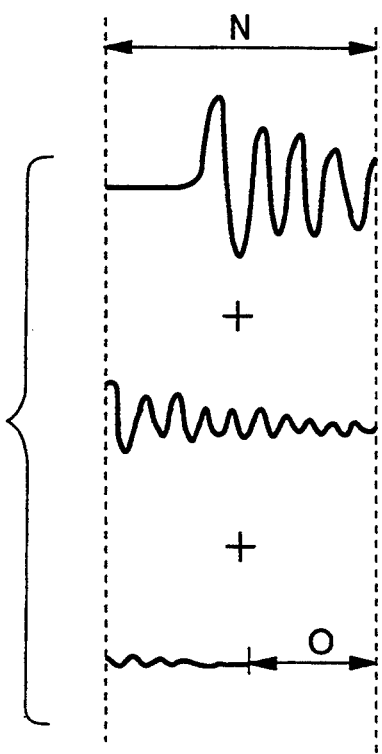
FIG.14b $\tilde{c}$ (J > N)
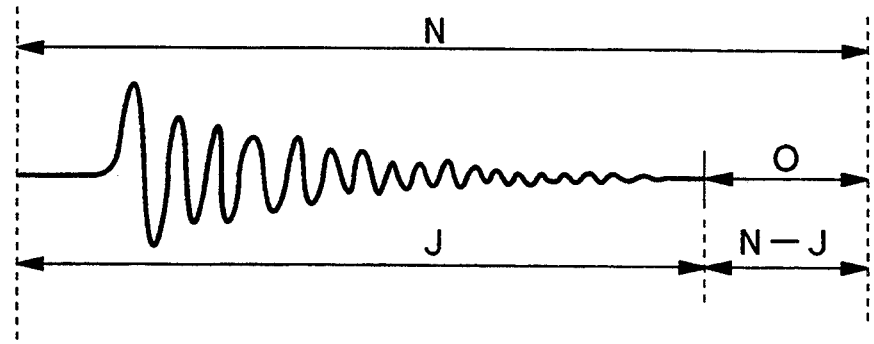
FIG.14c $\tilde{c}$ (J < N)

FIG.22

| PB (mmHg) / NE (rpm) | −700 | −500 | ..... | 0 |
|---|---|---|---|---|
| 500 | 0 | 0.2 | ..... | 0.5 |
| 1000 | 0.2 | 0.5 | ..... | 1.0 |
| 2000 | 1.0 | 1.3 | ..... | 1.5 |
| ⋮ | ⋮ | ⋮ | ⋮ | ⋮ |

FIG.23

| NE (rpm) | 500 | 1000 | 2000 | ..... | 7000 |
|---|---|---|---|---|---|
| EOF | 1.0 | 1.2 | 1.3 | ..... | 1.5 |

FIG.24

| NE (rpm) | 500 | 1000 | 2000 | ..... | 7000 |
|---|---|---|---|---|---|
| EOS | 1.5 | 1.0 | 0.8 | ..... | 0.5 |

VIBRATION/NOISE CONTROL SYSTEM FOR VEHICLES

BACKGROUND OF THE INVENTION

1. Field of the Invention

This invention relates to a vibration/noise control system for vehicles, and more particularly to a vibration/noise control system of this kind which is adapted to actively control vibrations and noises occurring in vehicles, particularly during operation of an engine installed thereon and/or during travelling of the vehicle to reduce the vibrations and noises.

2. Prior Art

Recently, active vibration/noise control systems have been developed in various fields of the industry, which is adapted to damp vibrations and noises produced from vibration/noise sources by the use of an adaptive digital filter (hereinafter referred to as the "ADF") to thereby reduce the vibrations and noises. For example, vibration/noise control systems of this kind have been proposed by Japanese Provisional Patent Publications (Kokai) Nos. 62-164400 and 3-219139, and WO88/02912.

FIG. 1 schematically shows the outline of a vibration/noise control system of this kind, which is applied to an automotive vehicle.

The vibration/noise control system is essentially formed of a vibration/noise sensor 502 for detecting vibrations and noises transmitted from a vibration/noise source 501, such as an engine installed on the vehicle, an adaptive control circuit 503 which is supplied with a reference signal x carrying digital data on vibrations and noises detected by the sensor 502 and outputs a control signal having a transfer characteristic which are inverse in phase to a characteristic of the reference signal x, an engine mount 504 arranged in a path through which vibrations and noises are transferred, a chassis 505 of the vehicle on which the engine is installed, and an error sensor 506 such as an acceleration sensor arranged on the floor of a compartment of the vehicle.

The adaptive control circuit 503 has an algorithm construction as shown in FIG. 2, which will be referred to as "Filtered-X-LMS Algorithm". More specifically, the adaptive control circuit 503 comprises a Wiener filter (hereinafter referred to as the "W filter") 507, which is an ADF having a finite impulse response (FIR), an adaptive algorithm (LMS) processor 508 which generates an optimum control signal (i.e. a control signal having the optimum transfer characteristic) by the use of the least mean square method (hereinafter referred to as the "LMS method") as the algorithm, and a correction digital filter (hereinafter referred to as the "C filter") 509 which corrects changes in phase, amplitude, etc. of the transfer characteristic of the control signal outputted from the W filter 507.

The vibration/noise control system constructed as above operates in the following manner: As shown in FIG. 1, vibrations and noises detected by the vibration/noise sensor 502 are sampled and converted by an A/D converter 510 into a digital signal as the reference signal x, which is supplied to the adaptive control circuit 503. Then, the adaptive control circuit 503 generates and supplies a digital signal as the control signal to a D/A converter 511, where the digital signal is converted into an analog signal and supplied to the engine mount 504, from which the control signal is transferred through the chassis 505 and supplied as a driving signal y to the error sensor 506.

On the other hand, the error sensor 506 is also supplied with a vibration/noise signal d directly transmitted from the vibration/noise source 501, and generates an error signal $\epsilon$ indicative of the difference between the vibration/noise signal d and the driving signal y. The error signal $\epsilon$ is converted into a digital signal by an A/D converter 512, and supplied to the adaptive control circuit 503 in a feedback manner. Namely, the error signal $\epsilon$ represents a residual error remaining after the vibrations and noises transmitted to the error sensor 506 is cancelled by the driving signal y. The adaptive algorithm processor 508 is responsive to the error signal $\epsilon$ to renew a correction amount to a desired value by the use of a so-called step-size parameter $\mu$ (a parameter which controls an amount of correction to be made whenever the error signal $\epsilon$ is supplied to the adaptive control circuit 503), to thereby establish causality such that the error signal $\epsilon$ becomes the minimum value. More specifically, the LMS processor 508 calculates to form the optimum control signal such that the mean square error value $\{E(e^2)\}$ of the error signal $\epsilon$ will become the minimum value. Thus, the transfer characteristics of the control signal which is inverse in phase to the reference signal x is changed so as to reduce vibrations and noises.

Further, in the vibration/noise control system having the adaptive control circuit 503, the transfer characteristic of the path through which the vibrations and noises is transmitted are determined in advance by and set into the C filter 509, which makes it possible to eliminate factors resulting from the influence of the engine mount 504, etc., which cause changes in the transfer characteristic of the control signal obtained from the error signal $\epsilon$, which makes it possible to supply the desired driving signal y to the error sensor 506.

However, the proposed vibration/noise control system suffers from the following inconveniences:

(1) The reference signal x supplied to the W filter 507 and the C filter 509 has a time series waveform, so that in each of the filters 507 and 509, convolution must be carried out for the reference signal x per each tap, which requires much time in calculation. In other words, to control vibrations and noises having complicated characteristics, such as those occurring in an automotive vehicle or the like, it is necessary to set the number of signal taps of the filters to larger values. However, the larger the number of signal taps, the longer the time period required to perform convolution in the filters, which lowers the converging speed of the ADF at which are reduced the vibrations and noises.

(2) Noise and ghosts occurring during communication in electronic equipment and the like, or vibrations and noises from ducts, etc. in a plant generally have phases and/or waveforms which do not significantly change. Once the noise-transmission system has been identified or determined, the system shows a robust behavior, i.e. the system is stable so that it is easy to establish causality, and hence there hardly arises a problem that it takes much time for the characteristic of the ADF to be converged to the optimum characteristic. On the other hand, in reducing noises occurring within the vehicle compartment, road noises, or secondary vibrations of the engine, etc., the waveform of the reference signal x indicative of vibrations and noises supplied to the adaptive control circuit 503 varies in response to changes in the operating condition of the engine. This makes it difficult to establish causality, resulting in poor convergence of the characteristic of the ADF and hence incapability of reducing vibrations and noises to a desired degree.

In other words, the waveforms of regular vibrations and noises occurring from ducts, etc., do not vary so much in phase and amplitude. Therefore, the adaptive control circuit 503 is capable of generating a control signal pursuant to operating conditions of the vibration/noise source 501, so that the error signal $\epsilon$ is reduced to nearly 0, to thereby reduce the vibrations and noises to a desired degree. However, in the case of automotive vehicles and the like, the waveforms of vibrations and noises undergo significant changes in response to changes in operating parameters of the engine such as the engine rotational speed and load on the engine, and hence the calculation time is necessarily long. Therefore, only noises and vibrations having the same waveform as the reference signal x can be suppressed to a sufficient degree. Thus, the adaptive control cannot be achieved to a desired degree with fully quick response.

(3) Vibrations and noises are produced in an automotive vehicle in a complicated manner depending on operating conditions of the engine, such as the rotational speed and combustion state of the engine. Besides, they have particular waveforms and frequencies corresponding, respectively, to various operating conditions of the engine. Therefore, if these variations and noises varying with changes in the operating condition of the engine are processed by the use of a single kind of control signal in order to suppress them, the error signal $\epsilon$ cannot be reduced to a desired value, thus failing to achieve fine control of the vibrations and noises.

(4) The A/D converter 510 has a fixed sampling frequency. However, in the case of a vibration/noise control system for an automotive vehicle or the like, the vibration/noise transfer path has a transfer function varying with changes in the engine rotational speed, etc. As a result, it is impossible to properly carry out the vibration/noise control.

Further, as the adaptive algorithm of the ADF, there has been already proposed an algorithm called Error Scanning Algorithm, which is intended to reduce the amount of calculation per each sampling interval (Haruo Hamada, "SIGNAL PROCESSING FOR ACTIVE CONTROL", International Symposium on Active Control of Sound and Vibration, Apr. 9-11, 1991, pp. 33-44).

The operating principle of the proposed error scanning algorithm will be described with reference to FIG. 3 showing a case where the number of taps of the W filter 507 is one, and the number of evaluating points as objects of the vibration/noise control is two (i.e. a first evaluating point and a second evaluating point). The ordinate represents an evaluated error J, while the abscissa represents a filter coefficient of the W filter 507.

In the figure, symbols $J_1$ and $J_2$ represent, respectively, a function of the evaluated error obtained at the first evaluating point and a function of the evaluated error obtained at the second evaluating point, which are represented by mean square errors $\{E(e_1^2)\}$, $\{E(e_2^2)\}$ of the respective error signals $e_1$, $e_2$, and $W_1$ and $W_2$ represent values of the filter coefficient W at which the first and second functions $J_1$ and $J_2$ of the evaluated errors assume the minimum values, respectively.

In the error scanning algorithm, the function of the evaluated errors occurring in the system as a whole is represented by a quadric curve of the sum $(J_1+J_2)$ of the first and second functions $J_1$ and $J_2$, and has the minimum value which corresponds to a value $W_{1+2}$ of the filter coefficient W. The filter coefficient W of the W filter 507 is renewed to the value $V_{1+2}$ which is to attain the minimum value of the evaluated error, whereby the control signal generated by the W filter is optimized.

Thus, the error scanning algorithm is capable of reducing the amount of calculation within one sampling interval, as compared with known control algorithms, such as the multiple error filtered-X-algorithm, and hence is suitable for application in a multi-channel vibration/noise control system for controlling vibrations and noises from a plurality of vibration/noise sources or having a plurality of control areas (evaluating points).

In a case where a plurality of error sensors are provided at respective control areas in a power plant for driving an automotive vehicle for detecting vibration/noise error signals, output voltages from these error sensors vary as shown in FIG. 4 according to the engine rotational speed NE. Moreover, the output voltage V from a noise error sensor EN0 for detecting a residual error of noise within the vehicle compartment is relatively high as compared with the output voltage V from a floor vibration error sensor EF0 for detecting a residual error of vibration of the floor of the vehicle compartment and a steering vibration error sensor ES0 for detecting a residual error of vibration of a steering wheel. As a result, if the above described error scanning algorithm is applied to a vibration/noise control system for automotive vehicles, and error scanning is carried out in a low engine rotational speed region, e.g. in the vicinity of the idling engine rotational speed NEIDL, the evaluated error J is converged in such a direction that mainly the output voltage V from the noise error sensor EN0 is reduced.

However, in controlling vibrations and noises in automotive vehicles or the like, there are cases where it is not preferable to control the evaluated error J representative of remaining or uncontrolled vibrations and noises as a whole to the minimum value, by such a simple calculation as described above. For instance, when the engine rotational speed is low as in the vicinity of the idling engine rotational speed NEIDL, noises are hard to be perceived by the sense of hearing. However, the noise error sensor EN0 detects noise by sound pressure level and hence the output voltage therefrom becomes relatively high. That is, although it is really preferable to reduce the steering vibration rather than the noises within the compartment which are relatively imperceivable, when the engine rotational speed is low, the evaluated error J is in fact converged in the direction of reducing the noises, but not in the direction of reducing the steering vibration, resulting in failure to control vibrations and noises in a desired manner.

SUMMARY OF THE INVENTION

It is a first object of the invention to provide a vibration/noise control system for a vehicle, which is capable of properly performing very accurate adaptive control of periodic or semi-periodic vibrations and noises occurring from vibration/noise sources in the vehicle at an improved converging speed, and at the same time capable of coping with incessantly changing vibrations and noises.

It is a second object of the invention to provide a vibration/noise control system for a vehicle, which is capable of vibration/noise control in a manner suitable for the aural sense of the driver or the occupant(s).

It is a third object of the invention to provide a vibration/noise control system for a vehicle, which is capable of properly performing very accurate adaptive control of vibrations and noises at a high converging speed even when characteristics of the vibrations and noises are drastically changed due to a sudden change in the operating condition of the vehicle.

To attain the first object of the invention, according to a first aspect of the invention, there is provided a vibration/noise control system for a vehicle having a chassis, a compartment, and a power plant for driving the vehicle, periodic or semi-periodic vibrations and noises being generated from at least one vibration/noise source including the power plant, arranged at at least one predetermined location on the chassis or in the compartment, the system including:

first filter means for generating a control signal for changing a transfer characteristic of at least one vibration/noise-transmitting path formed between the at least one source and the at least one predetermined location by filtering a predetermined input signal supplied thereto, the first filter means having a filter coefficient on which it operates;

driving signal-forming means for converting the control signal into a driving signal;

electromechanical transducer means responsive to the driving signal for controlling the vibrations and noises;

error signal-forming means for forming an error signal indicative of residual vibrations and noises remaining after the vibrations and noises have been reduced by an output from the at least one electromechanical transducer means through addition of vectors;

second filter means for representing a transfer characteristic of a vibration/noise-transmitting path formed between the driving signal-forming means and the error signal-forming means, and generating a reference signal; and control signal-renewing means for renewing the filter coefficient of the first filter means such that the error signal assumes the minimum value, based on the error signal, the reference signal from the second filter means, and the filter coefficient of the first filter means.

The vibration/noise control system according to the invention is characterized by comprising:

first driving repetition period signal-forming means for forming a first pulse signal indicative of a driving repetition period of the at least one vibration/noise source per a predetermined very small angle;

second driving repetition period signal-forming means for dividing the first pulse signal to form a plurality of kinds of second pulse signals which are synchronous, respectively, with repetition periods of components of the vibrations and noises inherent to respective component parts of the at least one vibration/noise source;

tap length-changing means responsive to a time interval between adjacent pulses of each of the second pulse signals formed by the second driving signal-forming means for changing a tap length (number of taps) of the first filter;

the first filter means having a plurality of adaptive digital filters, and the second filter means having a plurality of correcting digital filters corresponding, respectively, to the adaptive digital filters; and means for supplying the second pulse signals formed by the second driving repetition period signal-forming means as the predetermined input signal, respectively, to the adaptive digital filters and the correction digital filters.

With the above arrangement, the first pulse signal is frequency-divided into the second pulse signals corresponding, respectively, to particular repetition periods of vibrations and noises from the vibration/noise sources at different locations, and the pulse signals are supplied to the respective digital filters so that control signals are supplied from the respective digital filters, which each have a value corresponding to the time interval between adjacent pulses of a corresponding one of the second pulse signals. As a result, complicated computation of convolution can be largely reduced, to greatly enhance the computing speed as well as improve the accuracy and speed of the adaptive control.

Preferably, the vibration/noise control system includes external signal-generating means for generating an external signal indicative of operating conditions of the power plant, and wherein the control signal-renewing means includes renewal amount-changing means for continuously changing an amount of renewal of the control signal in response to the external signal.

As a result, even when the transfer characteristic of vibrations and noises varies with an incessant change in the operating condition of the engine, the adaptive control can be carried out in response to the varying transfer characteristic with improved converging speed and increased rate of reduction in the vibrations and noises as desired.

To attain the second object, according to the invention, the error signal-generating means comprises a plurality of error signal-generating means arranged at a plurality of predetermined locations as the at least one predetermined location for generating respective error signals corresponding, respectively, to the predetermined locations. The vibration/noise control system includes operating condition-detecting means for detecting operating conditions of the power plant, and weighting means for weighting the error signals in dependence on the operating conditions of the power plant detected by the operating condition-detecting means in dependence on the operating conditions of the power plant.

With this arrangement, the weighting means weights the error signals in dependence on operating conditions of the power plant, and renewal of the filter coefficients is effected based upon the weighted error signals, the reference signals from the second filter means, and the filter coefficients of the first filter means. In other words, residual errors detected by the error signal-detecting means are weighted in dependence on operating conditions of the power plant, so that the "weights" of the residual errors which contribute to the renewal of the filter coefficients can be varied in dependence on operating conditions of the power plant, e.g. an engine. This can realize effective reduction of vibrations and noises in a manner appropriate to the sense of the driver and occupants.

To attain the third object, the vibration/noise control system according to the invention is characterized by comprising:

first driving repetition period signal-forming means for forming a first pulse signal indicative of a driving repetition period of the at least one vibration/noise source per a predetermined very small angle;

second driving repetition period signal-forming means for dividing the first pulse signal to form a plurality of kinds of second pulse signals which are synchronous, respectively, with repetition periods of components of the vibrations and noises inherent to respective component parts of the at least one vibration/noise source;

sampling interval-determining means for determining a sampling interval governing sequential operations of outputting and renewing the filter coefficient of the first filter means, based upon timing of detection of the first pulse signal detected by the first driving repetition period signal-forming means;

transfer characteristic-correcting means for correcting a transfer characteristic of the second filter means according to the sampling interval determined by the sampling interval-determining means;

memory means for storing the transfer characteristic of the second filter means corrected by the transfer characteristic-correcting means;

means for setting a tap length of the first filter means to a value substantially equal to a ratio of a frequency of the second pulse signal to a frequency of the first pulse signal;

the first filter means having a plurality of adaptive digital filters, and the second filter means having a plurality of correcting digital filters corresponding, respectively, to the adaptive digital filters; and means for supplying the second pulse signals formed by the second driving repetition period signal-forming means, as the predetermined input signal, respectively, to the adaptive digital filters and the correction digital filters.

With the above arrangement, the sampling interval governing sequential operations of outputting and renewing the filter coefficient of the first filter means is determined, based upon timing of detection of the first pulse signal detected by the first driving repetition period signal-forming means. The second pulse signals thus based upon the sampling interval are inputted to the digital filters. As a result, even upon a change in the time interval of generation of the first pulse signal due to a change in the rotational speed of the engine, the sampling interval is varied correspondingly, so that the adaptive control is carried out in quick response to the change in the rotational speed, thus enabling highly accurate adaptive control. Besides, this reduces the frequency of interruption or termination of the program and can make it possible to design the system simple in structure and stable in control.

Preferably, the vibration/noise control system according to the invention includes:

third filter means interposed between the first filter means and the electromechanical transducer means for correcting a rate of change in the control signal from the first filter means, the third filter means having a filter coefficient on which it operates;

corrected signal-renewing means for renewing the filter coefficient of the third filter such that the error signal indicative of residual vibrations and noises assumes the minimum value, based on the error signal and the filter coefficient of the third filter means;

change rate-calculating means for calculating a rate of change in the driving repetition period detected by the first driving repetition period signal-forming means;

determining means for determining whether or not the rate of changed calculated by the change rate-calculating means is larger than a predetermined value; and means for causing the corrected signal-renewing means to operate while inhibiting the control signal-renewing means from operating when it is determined by the determining means that the rate of change calculated is larger than the predetermined value, and for causing the control signal-renewing means to operate while setting the filter coefficient of the third filter means to a fixed value and inhibiting the corrected signal-renewing means from operating.

With this arrangement, even in the case where the vibration/noise transfer characteristic drastically changes due to a sudden change in the operating condition so that the adaptive control cannot fully follow up such a drastic change in the transfer characteristic merely by changing the sampling interval, the control signal is suitably corrected by the third filter means to thereby enable reduction in the vibrations and noises to a desired extent.

Further, to realize more effective and more accurate adaptive control of vibrations and noises, it is required to determine the transfer characteristic of the transmitting paths of vibrations and noises in a quick and easy manner. To meet this requirement, the vibration/noise control system according to the invention comprises:

first driving repetition period signal-forming means for forming a first pulse signal indicative of a driving repetition period of the at least one vibration/noise source per a predetermined very small angle;

second driving repetition period signal-forming means for dividing the first pulse signal to form a plurality of kinds of second pulse signals which are synchronous, respectively, with repetition periods of components of the vibrations and noises inherent to respective component parts of the at least one vibration/noise source;

random signal-generating means for a random signal having a small amplitude which is superposed on the control signal from the first filter means; and sampling interval-determining means for determining a sampling interval governing sequential operations of outputting and renewing the filter coefficient of the first filter means;

the second filter means comprising:

periodic signal component-eliminating means for forming a residual component signal by eliminating a periodic signal component ascribed to the at least one vibration/noise source which is large in amplitude from the error signal formed by the error signal-forming means;

transfer characteristic-determining means for determining a transfer characteristic of a path through which the vibrations and noises are transmitted, based on the random signal generated by the random signal-generating means, the residual component signal formed by the periodic signal component-eliminating means, and the filter coefficient of the second filter means: and memory means for storing the transfer characteristic determined by the transfer characteristic-determining means.

With this arrangement, the transfer characteristic, i.e. the transfer function of the vibration/noise-transmitting path is determined based on the random signal, the residual component signal, and the filter coefficient of the second filter means, it is possible to determine the transfer characteristic of the vibration/noise-transmitting path while at the same time the vibration/noise control is carried out. Besides, the vibration/noise control system can easily and quickly adapt itself to aging changes in characteristics of a system to which the present system is applied, such as a change in the ambient temperature, as well as to the specification and optional equipment of the vehicle, and further to the driving manner by the driver.

The above and other objects, features and advantages of the invention will become more apparent from the ensuing detailed description taken in conjunction with the accompanying drawings.

BRIEF DESCRIPTION OF THE DRAWINGS

FIG. 10a to FIG. 10e collectively form a timing chart which is useful in explaining kinds (frequency orders) of vibrations in which:

FIG. 10a shows a basic pulse signal;
FIG. 10b shows a first order pulse signal;
FIG. 10c shows a 1.5th order pulse signal;
FIG. 10d shows a second order pulse signal; and
FIG. 10e shows a third order pulse signal;

FIG. 11a to FIG. 11c collectively form a timing chart which is useful in explaining a state in which a pulse of the basic pulse signal fails to be generated, in which;

FIG. 11a shows the basic pulse signal;
FIG. 11b shows the third order pulse signal; and
FIG. 11d shows a reference-position signal;

FIG. 13a to FIG. 13c collectively form a timing chart which is useful in explaining the relationship between a waveform of vibrations and noises and a point number N, in which;

FIG. 13a shows a waveform of vibrations and noises;
FIG. 13b shows a timing pulse signal X; and
FIG. 13c shows sampling clock pulses;

FIG. 14a to FIG. 14c are graphs which are useful in explaining how a pseudo-period train of a reference signal R is formed, in which;

FIG. 14a shows the relationship of a number J of taps of a C filter and the point number N;

FIG. 14b shows a manner of forming the pseudo-period train of the reference signal R in a case where the number J of taps of the C filter is larger than the point Number N; and FIG. 14c shows a manner of forming the pseudo-period train of the reference signal R in a case where the number J of taps of the C filter is smaller than the point Number N;

FIG. 22 shows an EON map;
FIG. 23 shows an EOF map;
FIG. 24 shows an EOS table;

FIG. 30a to FIG. 30c collectively form a timing chart which is useful in explaining how the transfer characteristic of the C filter is determined, in which;

FIG. 30a shows clock pulses;
FIG. 30b shows a filter coefficient Cr (used when a sampling frequency Fr is used); and
FIG. 30c shows a filter coefficient Cs (used when a sampling frequency Fs is used);

FIG. 39a to FIG. 39c are graphs which are useful in explaining how a pseudo-period train of a random reference signal L′ or a residual component signal η is made, in which:

FIG. 39a shows an annular train of a plurality of storages;

FIG. 39b shows a manner of forming the pseudo-period train of the signal L′ or η; and FIG. 39c shows the signal L′ or η.

DETAILED DESCRIPTION

The invention will now be described in detail with reference to FIG. 5 to FIG. 39 showing embodiments thereof.

Figure 1:
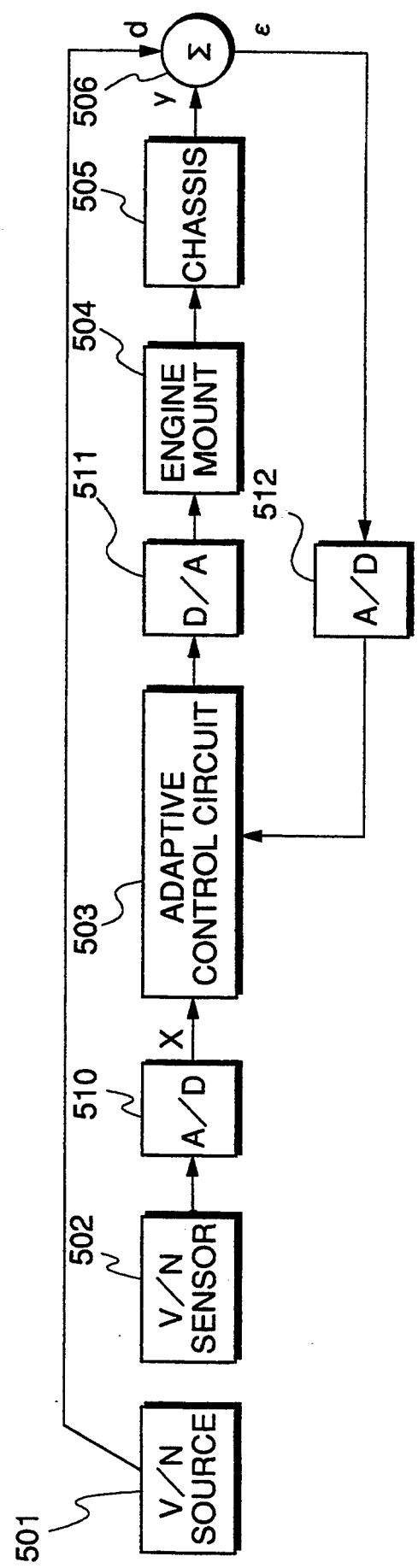
FIG. 1 is a block diagram schematically showing the whole arrangement of a conventional vibration/noise control system.
Figure 2:
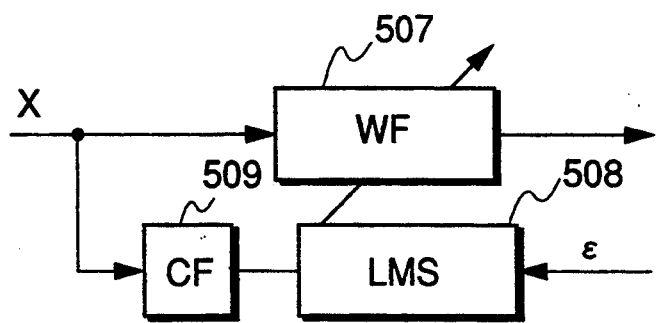
FIG. 2 is a block diagram showing the arrangement of a conventional adaptive control circuit (Filtered-X-LMS) appearing in FIG. 1.
Figure 3:
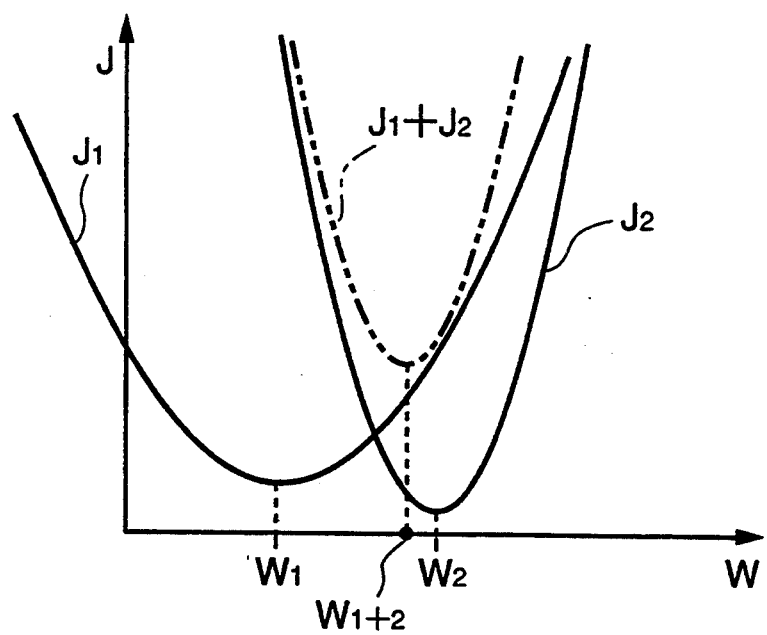
FIG. 3 is a graph showing operating curves which are useful in explaining the operating principle of the conventional Error Scanning Algorithm.
Figure 4:
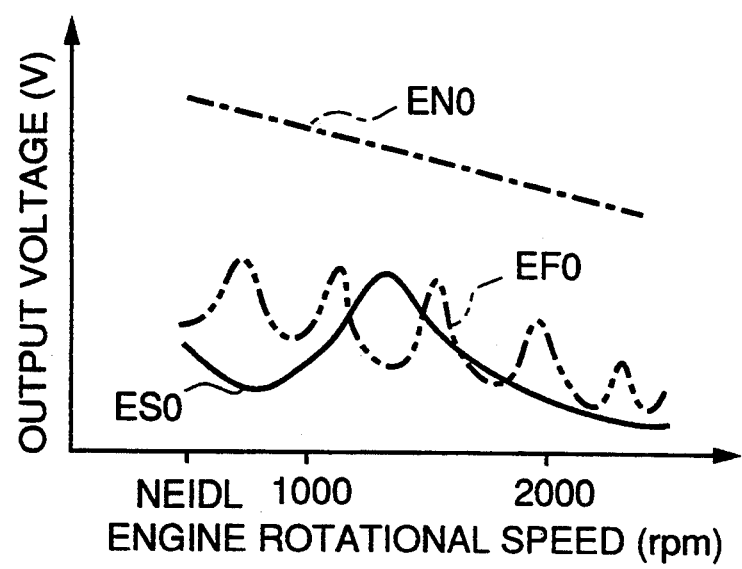
FIG. 4 is a graph showing characteristics of error signals of a conventional vibration/noise control system.
Figure 5:
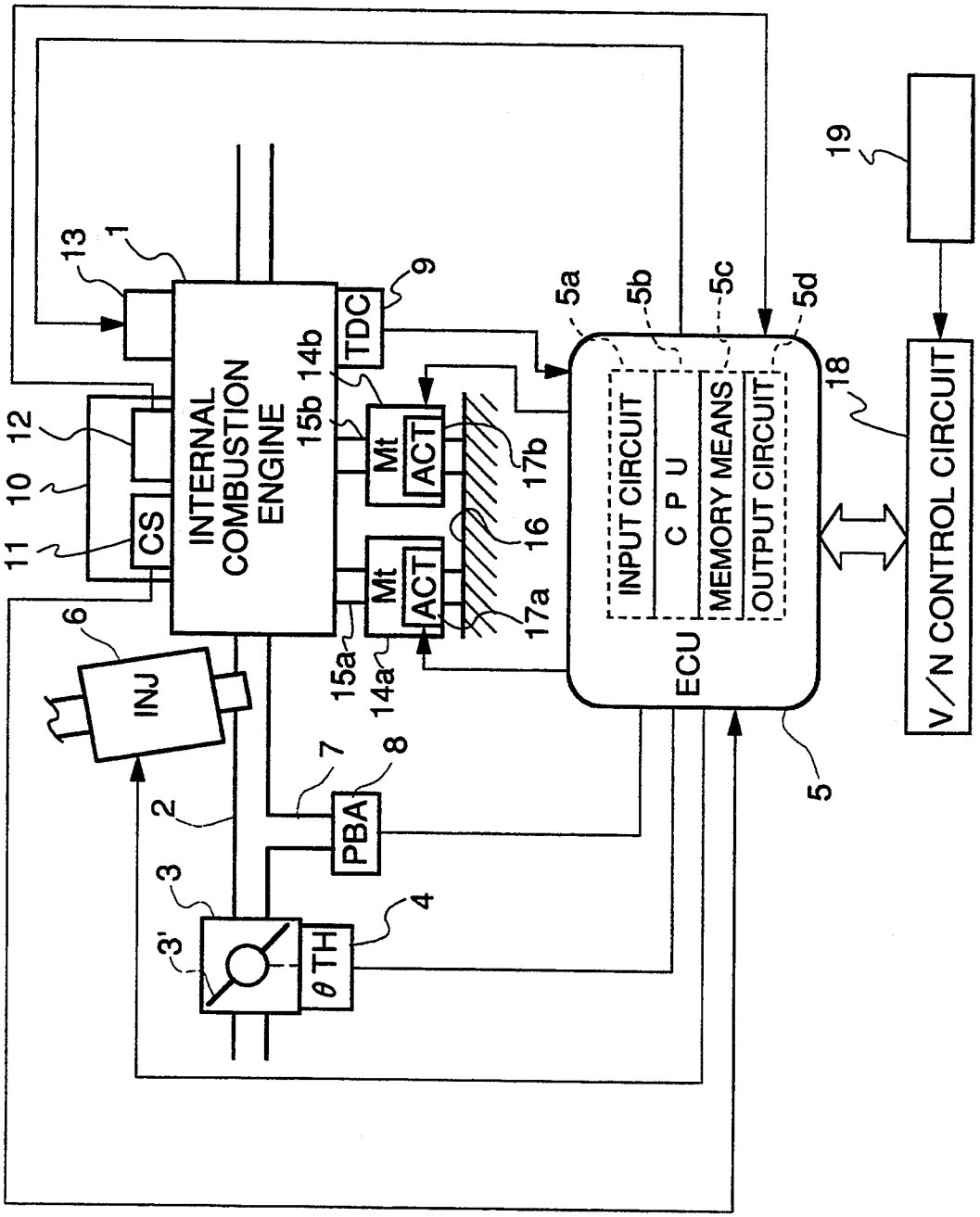
FIG. 5 is a block diagram showing the whole arrangement of a vibration/noise control system for an automotive vehicle, according to a first embodiment of the invention.

Referring first to FIG. 5, there is shown the whole arrangement of a vibration/noise control system for an automotive vehicle according to the invention. In the figure, reference numeral 1 designates a four-cycle engine of a power plant for driving an automotive vehicle, which has six cylinders (hereinafter simply referred to as "the engine"). In an intake pipe 2 of the engine 1, there is arranged a throttle body 3 accommodating a throttle valve 3′ therein. A throttle valve opening (θTH) sensor 4 is connected to the throttle valve 3′ for generating an electric signal indicative of the sensed throttle valve opening and supplying same to an electronic control unit (hereinafter referred to as "the ECU") 5.

Fuel injection valves 6 are each provided for each cylinder and arranged in the intake pipe 2 between the engine 1 and the throttle valve 3′, and at a location slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is mounted at an end of a branch conduit 7 branching off from the intake pipe 2 at a location immediately downstream of the throttle valve 3′ for sensing absolute pressure (PBA) within the intake pipe 2, and is electrically connected to the ECU 5 for generating an electric signal indicative of the sensed absolute pressure PBA and supplying same to the ECU 5.

A TDC sensor 9 is arranged in facing relation to a crankshaft of the engine 1.

The TDC sensor 9 generates a pulse as a TDC signal pulse at each of predetermined crank angles whenever the crankshaft rotates through 180 degrees, and supplies the TDC signal pulse to the ECU 5.

TDC signal pulses indicate predetermined reference crank angle positions of each cylinder. More specifically, each TDC signal pulse is generated at a predetermined crank angle position before TDC (the top dead center position) of the cylinder (#1 to #6 cylinder) at which the compression stroke terminates, e.g. at 10° BTDC. The ECU 5 measures the time interval of generation of TDC signal pulses to determine the reciprocal of the engine rotational speed NE.

Further, a valve-operating system 10 is provided at the top of the cylinder head of the engine 1 for each cylinder, which includes a pair of exhaust valves and a pair of intake valves. A camshaft sensor 11 and a reference position signal senor 12 are mounted in facing relation to the camshaft of the valve-operating system 10.

The camshaft sensor 11 generates 24 pulses of a basic pulse signal at regular intervals (i.e. every 30° of rotation of the crankshaft) every two rotations of the crankshaft, and supplies the pulses to the ECU 5.

Further, the reference position signal sensor 12 generates a pulse as a reference position signal pulse at a predetermined crank angle position of a particular cylinder every two rotations of the crankshaft, and supplies the pulses to the ECU 5. A pulse of the reference position signal is generated at the predetermined crank angle position in synchronism with a pulse of the basic pulse signal.

A spark plug 13 of each cylinder of the engine is electrically connected to the ECU 5 to have spark ignition timing thereof controlled by a signal supplied therefrom.

Further, a pair of self-expanding engine mounts 14a, 14b as electromechanical transducer means are arranged at a front portion of the engine. More specifically, the self-expanding engine mounts 15a, 15b have their upper ends connected to the engine via elastic rubbers 15a, 15b, and their lower ends supported by a chassis 16 of the vehicle.

Further, the self-expanding engine mounts 14a, 14b have respective actuators 17a, 17b incorporated therein, which are formed of voice coil motors (VCM), piezoelectric elements, or magnetostrictive elements, and controls transmission of vibrations of the engine by signals from the ECU 5 responsive to vibrations of the engine. More specifically, the self-expanding engine mounts 14a, 14b are formed therein with respective liquid chambers, not shown, which are filled with liquid, and operate to prevent vibrations from being transmitted from a vibration source (i.e. the engine 1) to the chassis, by means of antiphase vibrations of the elastic rubbers 15a, 15b fixed to the vibration source.

Further electrically connected to the ECU 5 is a vibration/noise control circuit 18 for forming a control signal for controlling vibrations and noises in response to a signal supplied from the ECU 5, the control signal being supplied via the ECU 5 to the electromechanical transducer means. Further, in the vicinity of a flywheel rigidly fitted on the crankshaft, there is arranged a rotation-detecting sensor 19 formed e.g. of a magnetic sensor for detecting rotation of the flywheel and supplying a signal indicative of the sensed rotation of the flywheel to the vibration/noise control circuit 18.

The ECU 5 comprises an input circuit 5a having the functions of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed by the CPU 5b, and various maps and tables, referred to hereinafter, and a RAM for storing results of calculations therefrom, etc., an output circuit 5d which outputs driving signals to the fuel injection valves 6, the spark plugs 13, the electromechanical transducer means, i.e. the engine mounts 14a, 14b, and the vibration/noise control circuit 18.

The CPU 5b calculates, based upon engine operating conditions, a valve opening period or fuel injection period TOUT over which the fuel injection valves 6 are to be opened, by the use of the following equation (1) in synchronism with generation of TDC signal pulses:

$$TOUT = TiM \times K1 + K2 \quad (1)$$

where TiM represents a basic fuel injection amount determined according to the engine rotational speed NE and the intake pipe absolute pressure PBA. TiM maps are used for determining the value of TiM, which are stored in the ROM of the memory means 5c.

K1 and K2 represent correction coefficients and correction variables, respectively, which are calculated based on various engine parameter signals to such values depending on engine operating conditions as to optimize characteristics of the engine such as fuel consumption and accelerability.

Figure 6:
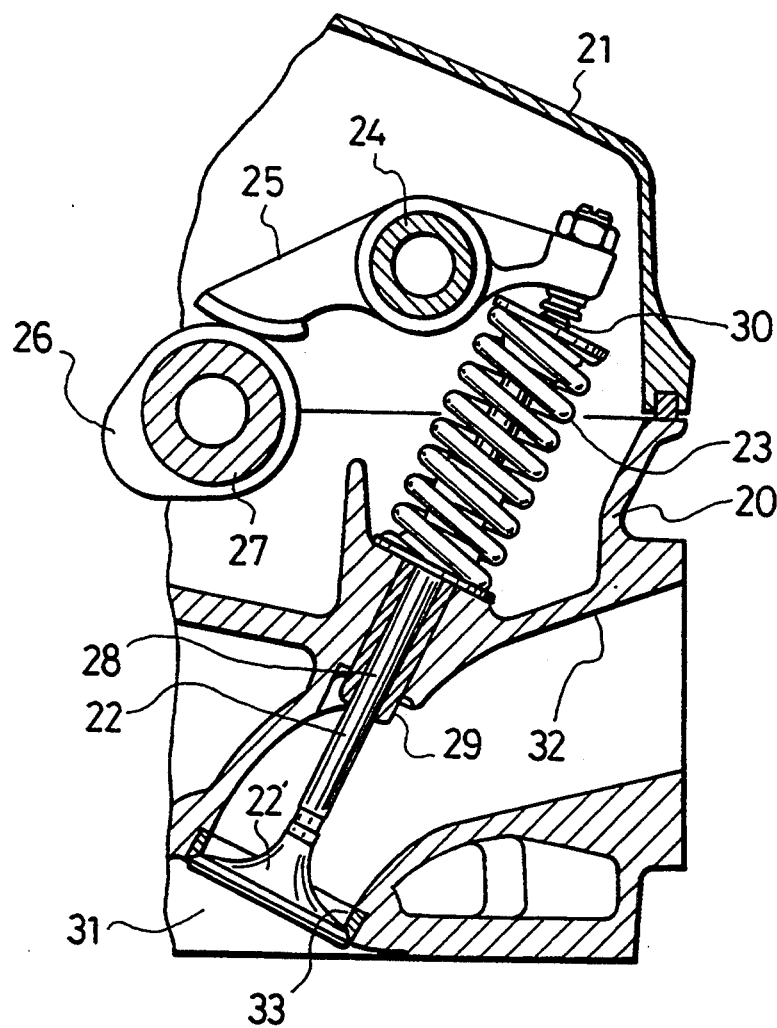
FIG. 6 is a cross-sectional view showing essential parts of a valve-operating system used in an engine in FIG. 5.

Next, reference is made to FIG. 6, which shows details of the valve-operating system 10. The valve-operating system 10 is arranged inside a cylinder head cover 21 which is rigidly mounted on the top of the cylinder head 20. The system 10 is mainly comprised of an intake (or exhaust) valve 22, a valve spring 23, a rocker arm 25 adapted to make a seesaw motion about a shaft 24, a cam 26 against which the rocker arm 15 abuts, and a camshaft 27 on which the cam 26 is fitted.

The intake (or exhaust) valve 22 has a valve stem 28 extending through a valve guide 29, while being resiliently urged in a valve-closing direction by the valve spring 23 fitted on the valve stem 28 between a surface of the cylinder head and a spring seat 30 formed on a rear portion of the valve stem 28. Further, a valve head 22' is integrally formed on a front end of the valve stem 28. The valve head 22' is disposed to abut on an opening 33 of an intake (or exhaust) port 32 to close the port 32, for establishing and interrupting communication between a combustion chamber 31 formed within the cylinder head and the intake (or exhaust) port 32.

In the valve-operating system 10, the cam 26 rotates in unison with the camshaft 27, and the rocker arm 26, which is in sliding contact with the rotating cam 26, repeatedly makes a seesaw motion against the urging force of the resilient valve spring 23 to move the intake (or exhaust) valve 22 upward and downward alternately.

Figure 7:
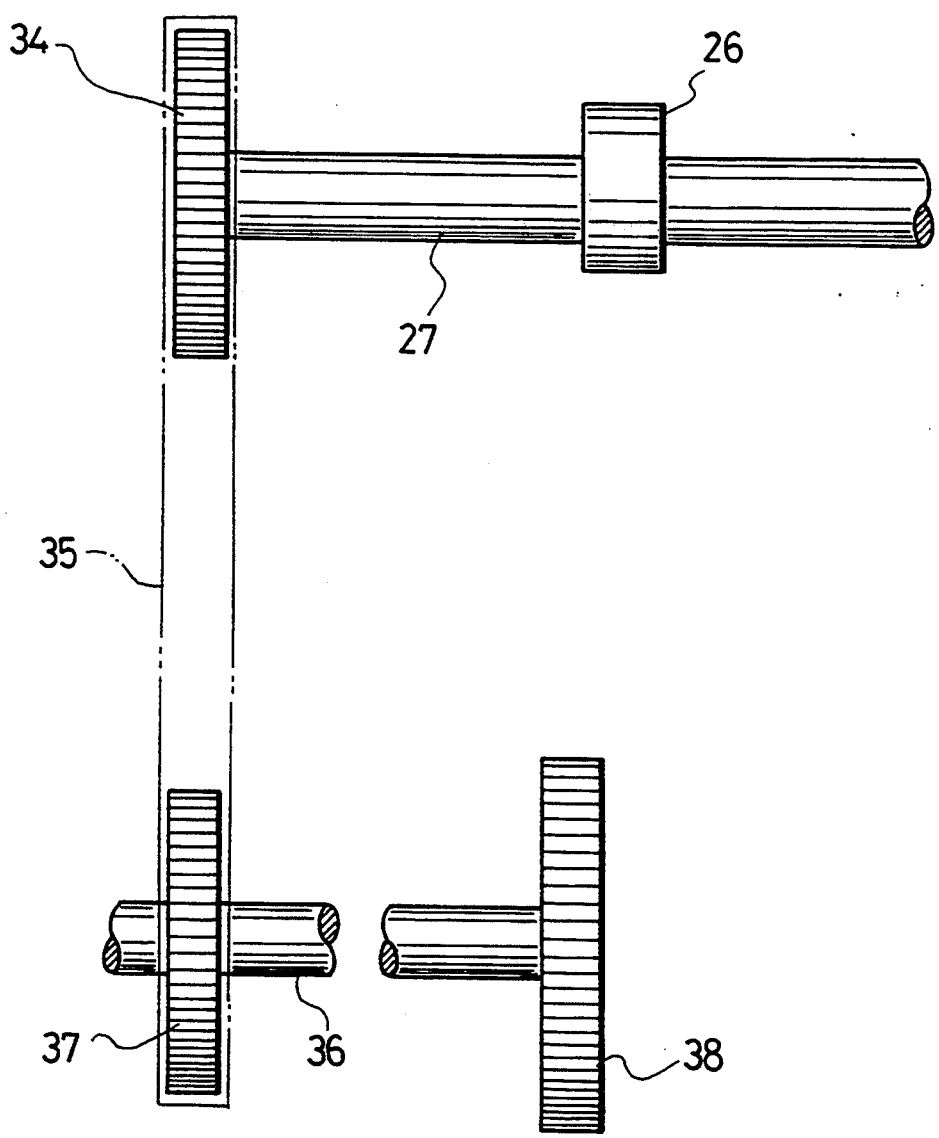
FIG. 7 is a side view showing the relationship between a camshaft and a crankshaft.

Further, as shown in FIG. 7, a camshaft pulley 34 is rigidly fitted on one end of the camshaft 27. The camshaft pulley 34 is connected via a timing belt 35 to a crankshaft pulley 37 rigidly fitted on one end of the crankshaft 36 to be rotatively driven thereby. Further, rigidly fitted on the other end of the crankshaft 36 is a flywheel 38 having a number of starter gear teeth formed on a peripheral surface thereof.

Figure 8:
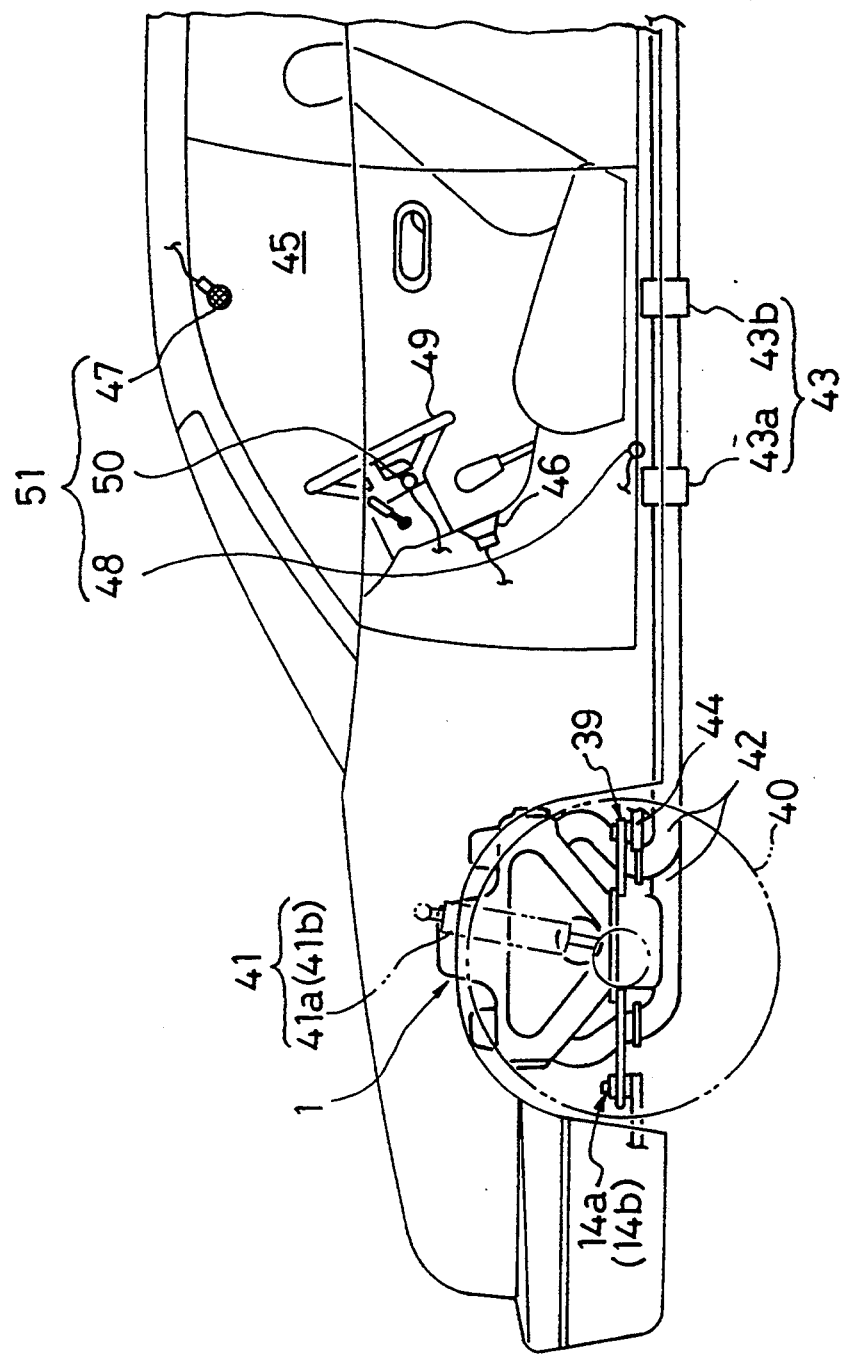
FIG. 8 is a schematic view showing how an engine is mounted on the vehicle, and where error sensors are provided.

FIG. 8 shows how the engine 1 is installed on the chassis of the vehicle, and at which locations in the compartment are arranged various error sensors.

The engine 1 is supported on the chassis 44 via the self-expanding engine mounts 14a, 14b which are capable of changing their own vibration transfer characteristics, a conventional engine mount 39 which is not capable of changing its own vibration transfer characteristics, a suspension unit 41 for front (driving) wheels, and a support 43 for an exhaust pipe 42.

The suspension unit 41 is comprised of a suitable number of self-expanding suspensions 41a which are capable of changing their own vibration transfer characteristics and a suitable number of conventional suspension devices 41b which are not capable of changing their own vibration transfer characteristics. The support 43 is comprised of a suitable number of self-expanding supports 43a which are capable of changing their own vibration transfer characteristics and a suitable number of conventional supports 43b which are not capable of changing their own vibration transfer characteristics. The self-expanding suspensions 41a and supports 43a each have an actuator incorporated therein, similarly to the self-expanding engine mounts 14a, 14b, and act to control the transmission of vibrations from the engine in response to respective signals supplied from the ECU 5 and depending upon vibrations of the engine. Further, a loud speaker 46 is arranged at a suitable location in a dashboard of the compartment 45 for controlling noises from the engine 1. The self-expanding engine mounts 14a, 14b, the suspensions 41a, the supports 43a and the loud speaker 46 cooperate to form the electromechanical transducer means.

A noise error sensor 47 formed e.g. of a microphone is arranged on a central portion of a ceiling of the compartment 45, while a floor vibration error sensor 48 is arranged on the floor of same. Further, a steering wheel 49 carries a steering vibration error sensor 50. The noise error sensor 47, the floor vibration error sensor 48, and the steering vibration error sensor 50 will be collectively referred to as an error sensor 51 hereinafter.

Figure 9:
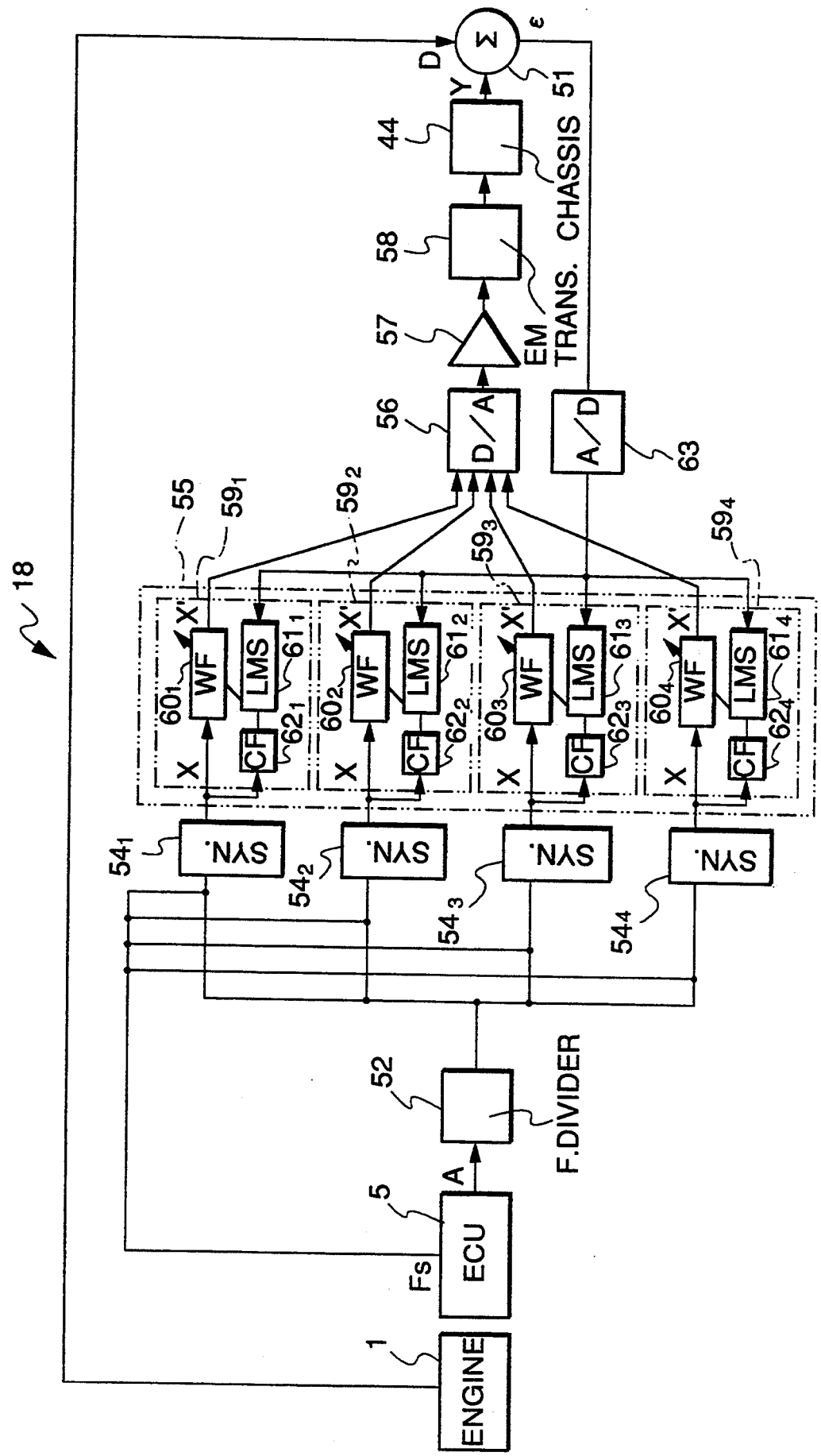
FIG. 9 is a block diagram showing the whole arrangement of the vibration/noise control circuit appearing in FIG. 5.
Figure 10:
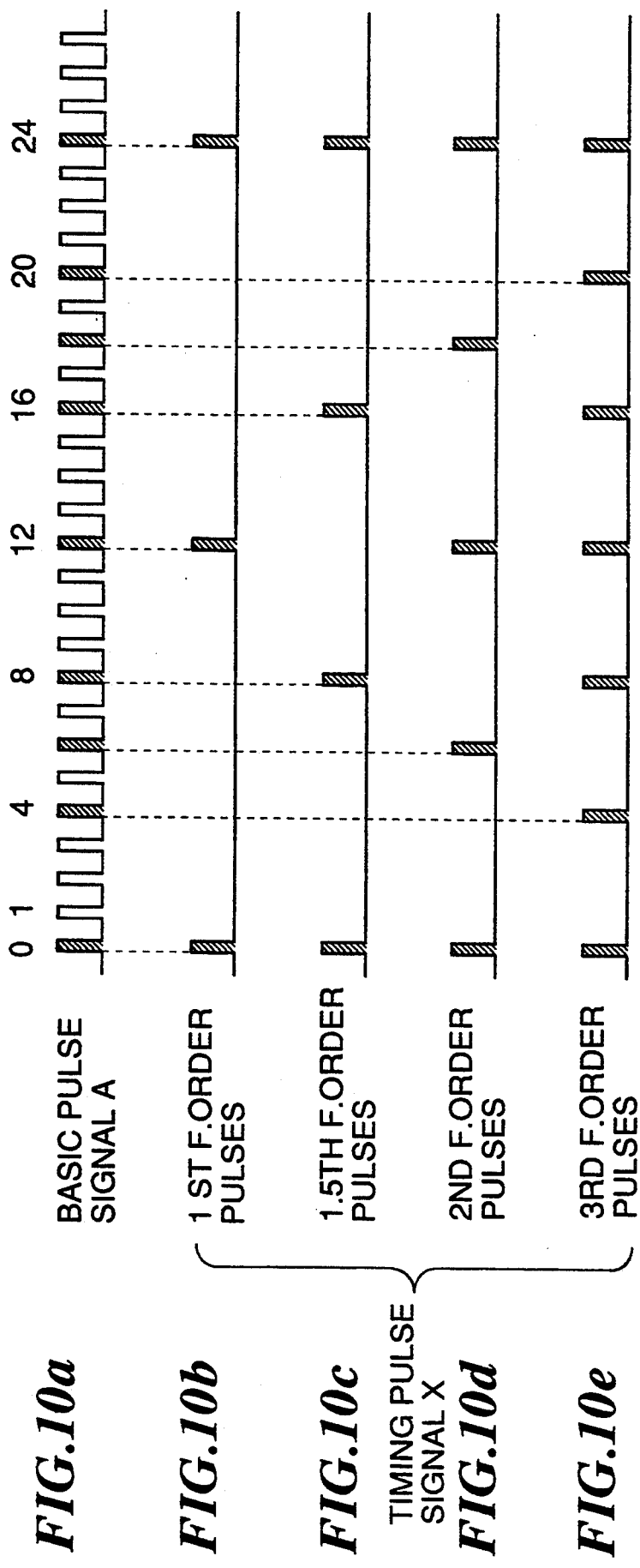
Figure 11:
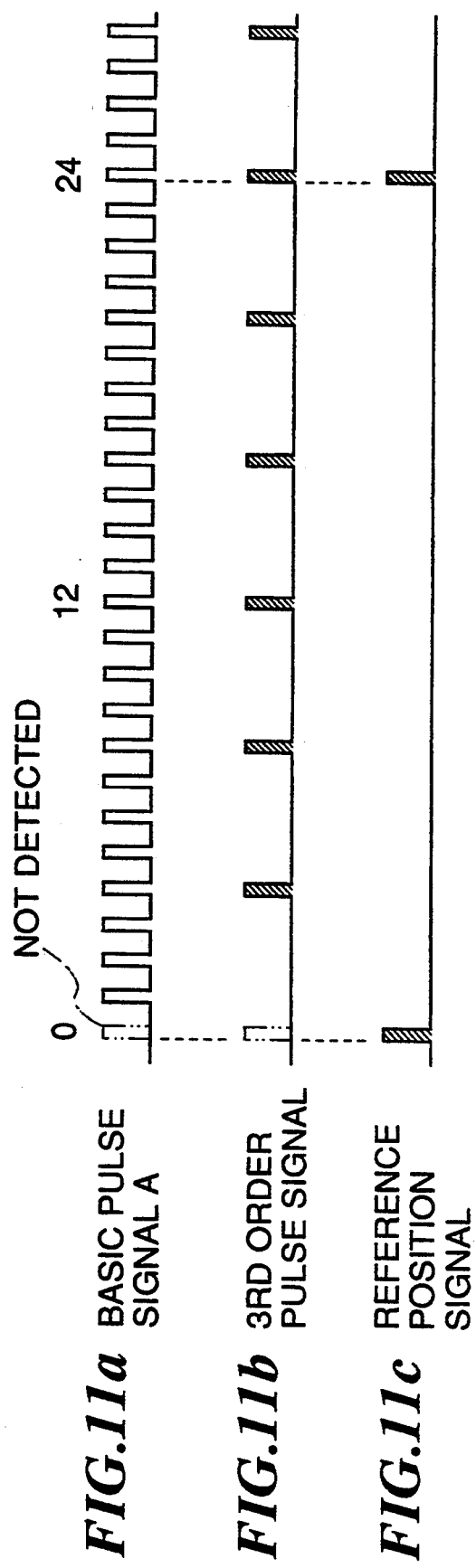

FIG. 9 shows, in a simplified manner, the internal construction of the vibration/noise control circuit 18 and its related component parts of the vibration/noise control system, according to the present embodiment. In this embodiment, a so-called fixed sampling method is used in which the driving frequency (frequency of clock pulses) for driving the ECU 5, e.g. 10 MHz, is used as a sampling frequency Fs to perform predetermined adaptive control. In the present embodiment, pulses generated from the camshaft sensor 11 are used as pulses of the basic pulse signal A mentioned hereinabove.

The vibration/noise control circuit 18 is mainly comprised of a frequency divider 52 for dividing the frequency of the basic pulse signal A supplied from the ECU 5 to form a plurality of kinds of timing pulse signals (input signals) X, synchronizing circuits $54_1$ to $54_4$ for monitoring synchronism between the basic pulse signal A and the respective timing pulse signals X, a digital signal processor (hereinafter referred to as "the DSP") 55 which is supplied with the timing pulse signals X from the frequency divider 52 through the synchronizing circuits $54_1$–$54_4$ and capable of making high-speed calculations to perform adaptive control, a D/A converter 56 for converting control signals (digital signals) outputted from the DSP 55 into an analog control signal, an amplifier 57 for amplifying the analog control signal supplied from the D/A converter 56, and the aforementioned error sensor 51 including the floor vibration error sensor 48 arranged on the floor of the compartment, etc. The vibration/noise control circuit 18 supplies the control signals to the electromechanical transducer means 58 including the self-expanding engine mounts 14a, 14b arranged in paths through which vibrations and noise are transmitted, etc.

The frequency divider 52 divides the frequency of the basic pulse signal A into a plurality of timing pulse signals X according to characteristics of vibrations and noises inherent, respectively, to component parts (the crankshaft 36 and parts associated therewith, the valve-operating system 10, the combustion chambers 31, etc.) as their sources. In the case of the six-cylinder engine according to the present embodiment, four types of timing pulse signals X are formed. More specifically, in the case of a power plant for driving a vehicle, which comprises a four-cycle engine as used in the present embodiment, excitation forces occurring within the four-cycle engine, which cause generation of vibrations and noises, can be classified into the following three groups:

(1) Excitation forces produced by reciprocation of the mass of each piston, including those produced from rotation of the crankshaft;

Excitation forces of this group are in the form of an inertia force, a couple of inertia, inertial torque, etc.

(2) Excitation forces produced by reciprocation of the mass of each (intake or exhaust) valve of the valve-operating system;

Excitation forces of this group are in the form of inertia, moment, etc.

(3) Excitation forces produced by explosion occurring within each cylinder;

Excitation forces of this group result from variations in the state of combustion within the cylinder.

In the present embodiment, the vibrations and noises are classified into four components: three components thereof ascribed to the movements of the pistons, the valve-operating system, etc. which will cause vibrations and noises having regular characteristics synchronous with the rotation of the engine, and one component thereof ascribed to explosive pressure (excitation forces) which will cause vibrations and noises having irregular characteristics. Therefore, the aforementioned four kinds of timing pulse signals X are formed. More specifically, the three components having regular characteristics are indicated by corresponding three kinds of timing pulse signals X having a first frequency order, a 1.5th frequency order, and a second frequency order, respectively, while the last one component having irregular characteristics is indicated by one kind of timing pulse signal X having a third frequency order. In this connection, reference is made to a timing chart formed by FIGS. 10a to 10e, in which is shown the relationship between the basic pulse signal A and the timing pulse signals X having the first frequency order, the 1.5th frequency order, the second frequency order, and the third frequency order. The timing pulse signal X having the first frequency order shown in FIG. 10b is formed by pulses each generated whenever the crankshaft makes one rotation (corresponding to 12 pulses of the basic pulse signal A). The timing pulse signal X having the 1.5th frequency order shown in FIG. 10c is formed by pulses each generated whenever the crankshaft makes ⅔ rotations (corresponding to 8 pulses of the basic pulse signal A). The timing pulse signal X having the second frequency order shown in FIG. 10d is formed by pulses each generated whenever the crankshaft makes 0.5 rotations (corresponding to 6 pulses of the basic pulse signal A). Further, the timing pulse signal having the third frequency order shown in FIG. 10e is formed by pulses each generated whenever the crankshaft makes ⅓ rotations (corresponding to 4 pulses of the basic pulse signal A).

The four kinds of timing pulse signals X thus formed make it possible to carry out adaptive control of vibrations and noises having complicated characteristics. More specifically, the timing pulse signals X having lower frequency orders (first, 1.5th, and second frequency orders) are for controlling components of the vibrations and noises regularly produced from rotation of the crankshaft, etc. By performing the adaptive control responsive to each of these components, it is possible to efficiently control vibrations and noises ascribed to inertia forces etc., generated according to rotation of the engine, etc.

On the other hand, the explosion stroke takes place once in each cylinder per every two rotations of the crankshaft. Accordingly, in the case of a six-cylinder engine, six explosions occur per every two rotations of the crankshaft, and the timing pulse signal X having the third frequency order is generated to control the component of the vibrations and noises related to the explosive pressure. By controlling this component related to the explosive pressure which has an irregular characteristic by the timing pulse signal X having the third frequency order, separately from the other regular components, it is possible to more efficiently control the vibrations and noises.

The synchronizing circuits $54_1$ to $54_4$ are each comprised of synchronism-detecting means for detecting synchronism of the reference position signal from the reference position sensor 12, a pulse of which is generated per every two rotations of the crankshaft, with a corresponding one of the timing pulse signals X, and synchronizing means for synchronizing a pulse of the reference position signal generated the next time with the corresponding one of the timing pulse signals X, when the synchronism between the signals is not detected.

More specifically, it is considered that vibrations and noises of the engine are generated by excitation forces caused by movements of the pistons and parts associated therewith, the valve-operating system, and explosive forces occurring within the cylinders. The pistons each make one reciprocation per one rotation of the crankshaft, and hence the vibrations (excitation forces) are produced whenever the crankshaft makes one rotation. Further, in the case of a four-cycle engine, the intake stroke and the exhaust stroke each take place once in each cylinder per one rotation of the camshaft, i.e. per two rotations of the crankshaft, so that excitation forces ascribed to the valve-operating system are generated once per one rotation of the camshaft, i.e. once per two rotations of the crankshaft.

Similarly, the explosion stroke is executed once per one rotation of the camshaft, i.e. once per two rotations of the crankshaft, and hence excitation forces ascribed to the explosive forces occurring within the cylinder are generated once per two rotations of the crankshaft. Namely, in the case of the four-cycle engine, all the characteristics of the vibrations and noises can be expressed or determined based on the fact that the excitation forces thereof occur once per two rotations of the crankshaft. In short, all the vibrations and noises occurring from the engine can be expressed with reference to the half frequency order of the vibrations and noises.

However, when a pulse of the basic pulse signal A fails to be detected, as shown in FIG. 11a, due to some external cause, and hence the timing pulse signal X fails to be generated as shown in FIG. 11b, the control signal from the DSP 55 cannot have desired transfer characteristics, and further, such errors in phase of the control signal are accumulated ever after, which prevents the vibration/noise control from being properly performed. To eliminate this inconvenience, in the present embodiment, the synchronizing circuits $54_1$ to $54_4$ each having the synchronism-detecting means and the synchronizing means operate to avoid errors in phase of the control signal.

More specifically, the synchronizing circuits $54_1$ to $54_4$ monitor the reference position signal from the reference position signal sensor 12, and an AND circuit, not shown, is incorporated therein, which generates a high level signal "1" when the reference position signal and the timing pulse signal X inputted to the AND circuit are synchronized, i.e. when the two inputs are both at "1" level. On the other hand, when the reference position signal and the timing pulse signal X are not synchronized, the AND circuit outputs a low level signal "0", which means failure of synchronism between the reference position signal and the corresponding timing pulse signal X. Accordingly, the frequency divider 52 interrupts generation of the timing pulse signals X, and then in synchronism with the next generation of the reference position signal, generation of the timing pulse signal X is resumed.

The DSP 55 (shown in FIG. 9) has four kinds of adaptive control circuits $59_1$ to $59_4$ which are separately supplied with the timing pulse signals X having first, 1.5th, second, and third frequency orders indicative of the respective components of the vibrations and noises to be controlled. Further, the adaptive control circuits $59_1$ to $59_4$ are comprised of W filters $60_1$ to $60_4$ as ADF's, which are each variable in the number of taps (tap length) depending upon the time interval between adjacent pulses of the corresponding timing pulse signal X, synchronized filtered-X-LMS (hereinafter referred to as "LMS") processors $61_1$ to $61_4$ which perform calculations to renew filter coefficients of the W filters $60_1$ to $60_4$, and C filters $62_1$ to $62_4$ for correcting changes in transfer characteristics of the control signal including changes in phase and amplitude thereof ascribed to a transfer function of the signal-transmitting path including the electromechanical transducer means 58 and the chassis 16.

In the vibration/control system for an automotive vehicle constructed as above, the timing pulse signals X formed by the frequency divider 52 are supplied to the respective adaptive control circuits $59_1$ to $59_4$. Then, control signals (digital signals) X' outputted from the adaptive control circuits $59_1$ to $59_4$ are each converted into an analog control signal, which is then amplified by the amplifier 57, and supplied to the electromechanical transducer means 58. The resulting controlled vibrations and noises are detected and supplied as a driving signal Y to the error sensor 51.

On the other hand, the error sensor 51 is supplied with a vibration/noise signal D from the engine 1 directly transmitted to the sensor 51, and outputs an error signal $\epsilon$ indicative of the difference between the vibration/noise signal D and the driving signal Y. The error signal s is supplied to an A/D converter 63, where it is converted into a digital signal and supplied to the adaptive control circuits $59_1$ to $59_4$ in a feedback manner.

Figure 12:
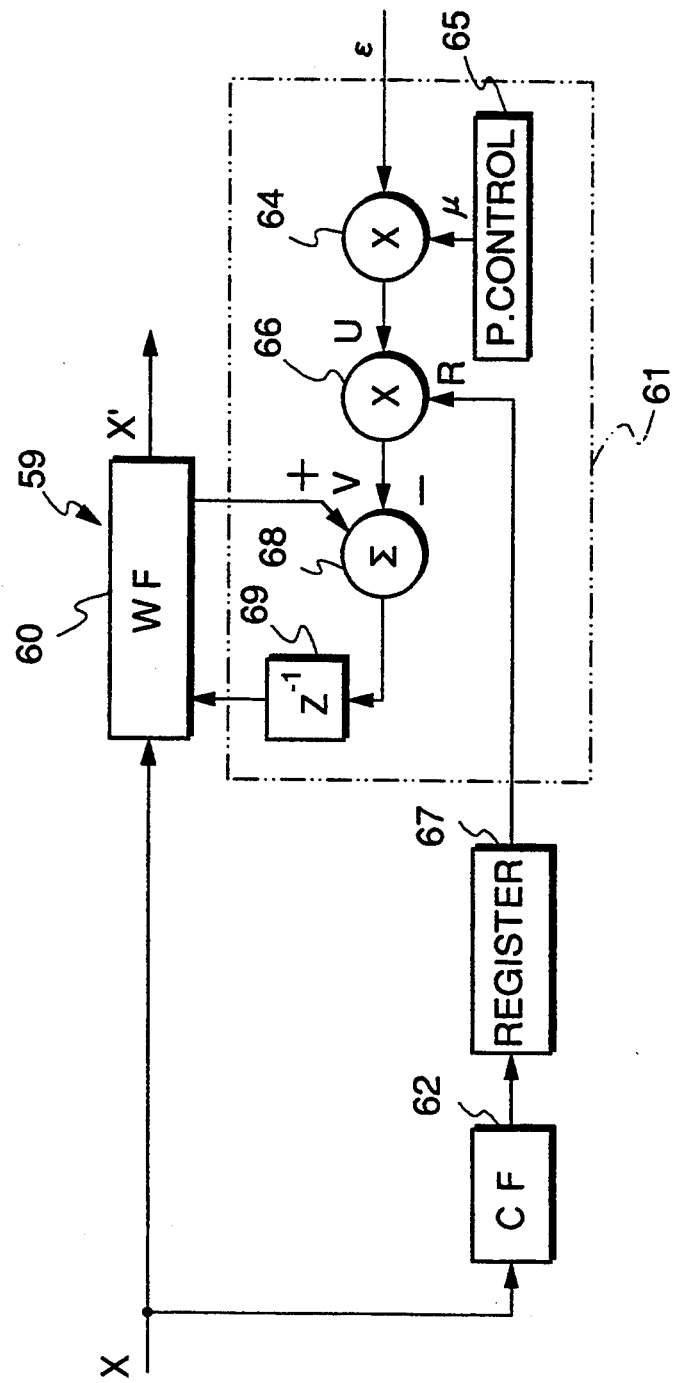
FIG. 12 is a block diagram showing details of the internal arrangement of an adaptive control circuit appearing in FIG. 9.

FIG. 12 shows details of the internal arrangement of one of the adaptive control circuits 59.

The timing pulse signal X from the synchronizing circuit 52 having a predetermined frequency order of vibrations and noises to be controlled is supplied to the W filter 60, where the filter coefficient of the W filter is renewed per each sampling interval (1/Fs). The W filter 60 generates a control signal X' responsive to the time interval between adjacent pulses of the timing pulse signal X supplied thereto, which is inverse in phase to a component of the vibration/noise signal D, and having a predetermined transfer characteristic.

On the other hand, the error signal $\epsilon$ generated by the error sensor 51 is supplied to a first multiplier 64, which is also supplied with a step-size parameter $\mu$ for controlling a renewed correction amount for each supply of the error signal $\epsilon$ from parameter control means 65. In this connection, the step-size parameter $\mu$ is set to a predetermined value which optimizes the converging speed and the control amount obtained after the error has been converged, depending on a system to which the vibration/noise control system is applied.

Then, the first multiplier 64 performs convolution of the error signal $\epsilon$ and the step-size parameter $\mu$ to form an output signal U, which is supplied to a second multiplier 66. The second multiplier 66 is also supplied with a reference signal R from the C filter 62 via a register 67 for the C filter 62. The C filter 62 is provided for the purpose of correcting changes in the transfer characteristic of the control signal X', i.e. phase, amplitude, etc. (which changes correspond to the transfer function of a path through which the control signal X' is transmitted while it is transformed into actual vibrations, through the electromechanical transducer means 58, the chassis 44, etc., and supplied as the driving signal D to the error sensor 51).

More specifically, the C filter 62 is supplied with the timing pulse signal X at a predetermined sampling frequency Fs, and generates, without convolution, the reference signal R having a predetermined transfer characteristic, which signal is formed based on a filter coefficient corresponding to the transfer function of the above-mentioned path through which the control signal X' passes. The reference signal R is supplied to the register 67, and thereafter to the second multiplier 66.

The second multiplier 66 multiplies the reference signal R by the aforementioned output signal U, and converts the resulting product into an output signal V having a negative value. The output signal V is supplied to a first adder 68.

Then, an output signal from the first adder 68 is stored into a delay circuit 69, which supplies an output signal per every sampling interval to renew the filter coefficient of the W filter 60.

The filter coefficient of the W filter 60 is thus renewed per every sampling interval, which enables to reduce the vibrations and noises having the aforementioned periodicity and pseudo-periodicity.

More specifically, the C filter 62 has the following function: It has a pseudo-period train-forming means for forming a pseudo-period train (C~) of the filter coefficient (CA) of the C filter 62 in order to adapt an output therefrom to the number of taps (tap length) of the W filter 60, which tap length varies according to the time interval between each pair of adjacent pulses of the timing pulse signal X supplied thereto. A manner of forming the pseudo-period train of the filter coefficient will now be described.

FIG. 13a to FIG. 13c show the relationship between a periodical waveform indicative of a component of the vibrations and noises to be controlled, and a point number N indicative of the ratio of the vibration/noise repetition period T (determined by the time interval between adjacent pulses of the timing pulse signal X supplied thereto, as described above) to the sampling interval $\tau$. The number of taps (tap length) of the W filter 60 is determined by the repetition period T.

More specifically, FIG. 13a shows a periodic waveform of the component of the vibrations and noises to be controlled, while FIG. 13b shows the timing pulse signal X supplied to both of the W filter 60 and the C filter 62 in synchronism with the repetition period of the waveform, more specifically, with generation of every predetermined number of pulses of the basic pulse signal, determined by a particular one of the frequency orders described hereinabove, and FIG. 13c shows sampling clock pulses generated by the ECU 5.

As is apparent from FIGS. 13a and 13b, since the vibration/noise repetition period T is detected by measuring the time interval between adjacent pulses of the timing pulse signal X generated, the point number N (=T/$\tau$) is calculated by dividing the vibration/noise repetition period T by the sampling interval $\tau$.

FIG. 14a to FIG. 14c show how the pseudo-period train of the filter coefficient (CΛ) of the C filter is formed. The point number N is made to correspond to the tap length I, i.e. number of taps, of the W filter, and as shown in FIG. 14a, a tap length J, i.e. the number of taps of the filter coefficient (CΛ), which corresponds to the aforementioned transfer function of the path through which the control signal passes while being transformed into actual vibrations, is compared with the point number N. When the tap length J, i.e. number of taps, of the filter coefficient (CΛ) is longer than the point number N, a calculation is made by the use of the following equation (2), by sequentially adding up values of the filter coefficient (CΛ) divided by the point number N, to form a pseudo-period train (C~) of the filter coefficient (C Λ) , as shown in FIG. 14b:

$$C\sim = \sum_{a=0}^{JdivN} C\Lambda(n - aN) \quad (2)$$

$(n = 0, 1, 2, \ldots, n - 1)$
$(a = 0, 1, 2, \ldots, JdivN)$ wherein C~ represents the pseudo-period train, CΛ the filter coefficient of the C filter, J the tap length, i.e. number of taps, of the C filter, N the point number, and JdivN an integer obtained by omitting fractions of J/N.

On the other hand, when the number of taps J of the filter coefficient (CΛ) is smaller than the point number N, a calculation is made by the use of the following equation (3), i.e. as shown in FIG. 14c, a number (N−J) of "0" are added to form the pseudo-period train of the filter coefficient (CΛ):

$$C = [C\Lambda j\ (j=0, 1, \ldots, J-1), 0 \ldots, 0] \quad (3)$$

wherein the number of 0 in the portion of (0 . . . , 0) is (N−J).

Thus, the pseudo-period train of the filter coefficient (CΛ) of the C filter can be calculated by comparing between the tap length J of the filter coefficient (CΛ) and the point number N, and making the calculation by the use of either the equation (2) or the equation (3) depending on the result of the comparison. The pseudo-period train (C~) of the filter coefficient (CΛ) calculated as above is stored into the register 67, and then supplied as the reference signal R to the second multiplier 66.

Figure 15:
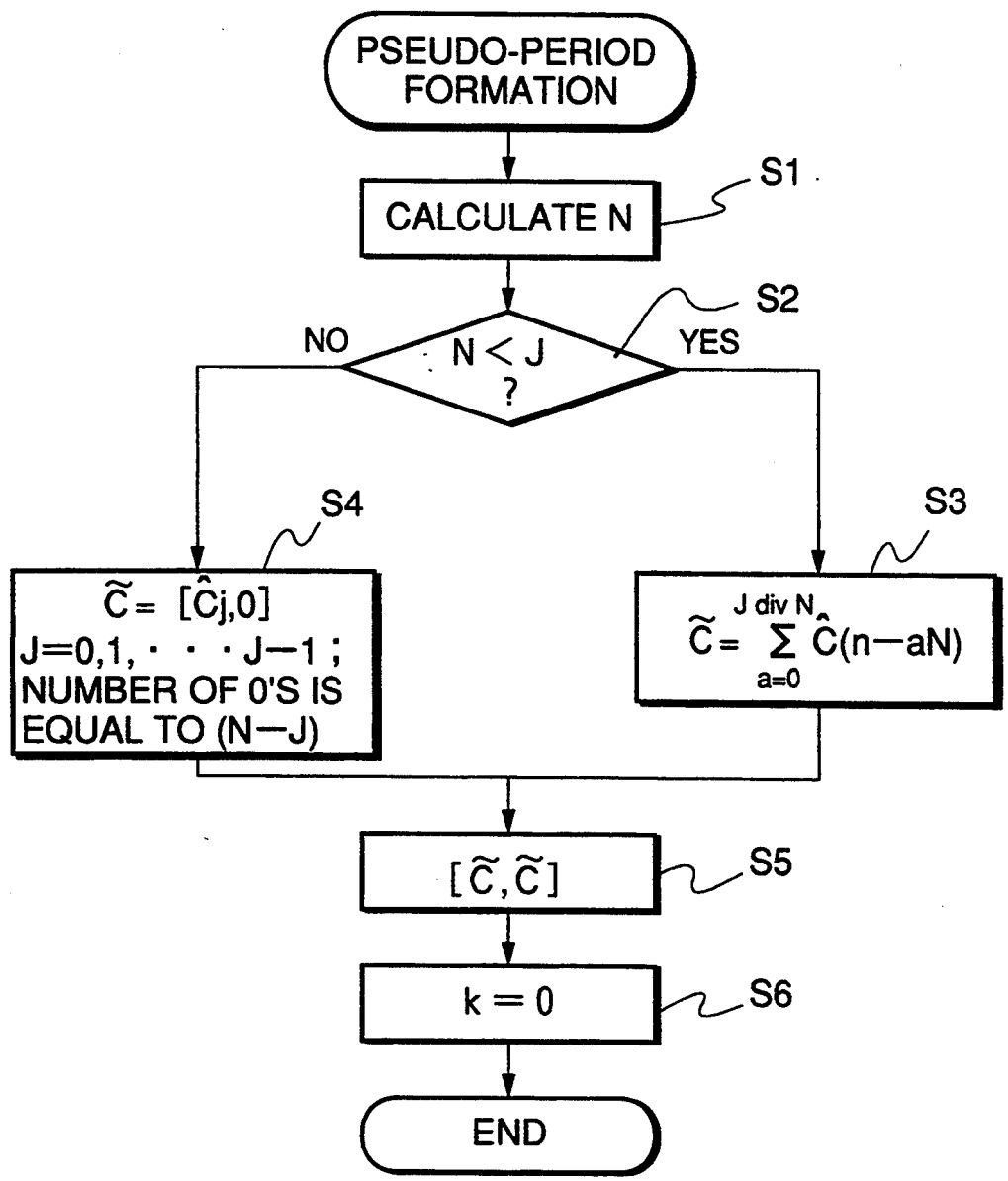
FIG. 15 is a flow chart showing a routine for forming the reference signal R.

FIG. 15 shows a program for forming the pseudo-period train of the filter coefficient of the C filter, which is executed in synchronism with inputting of each pulse of the timing pulse signal X to the C filter 62.

First, at a step S1, the point number N is calculated. More specifically, the vibration/noise repetition period T corresponding to the time interval between adjacent pulses of the timing pulse signal X generated is divided by the sampling interval $\tau$ to calculate the point number N (=T/$\tau$).

The point number N is equal to the tap length I of the W filter 60, since the same timing pulse signal X is supplied to the W filter 60. Then, it is determined at a step S2 whether or not the point number N is smaller than the tap length J of the filter coefficient (CΛ), stored in the C filter 62, which corresponds to the aforementioned transfer function of the path through which the control signal is transmitted.

If the answer to this question is affirmative (YES), i.e. if N<J, a calculation of the pseudo-period train (C~) is made from the filter coefficient (CΛ) stored in the C filter 62 by the use of the above equation (2) at a step S3, whereas if N≧J, by the use of the above equation (3) at a step S4.

After two identical sets of each period of the thus-formed new pseudo-period train (C) are stored into the register 67 for the C filter 62, at a step S5, a count value k of a counter, not shown, for counting the number of clock pulses after a pulse of the timing pulse signal X has been supplied to the C filter 62, is set to a value of 0, i.e. from this time point the counter starts operating so as for the newly supplied pulse of the timing pulse signal X to cause the adaptive control circuit 59 to operate based on the count value, followed by terminating the program.

Figure 16:
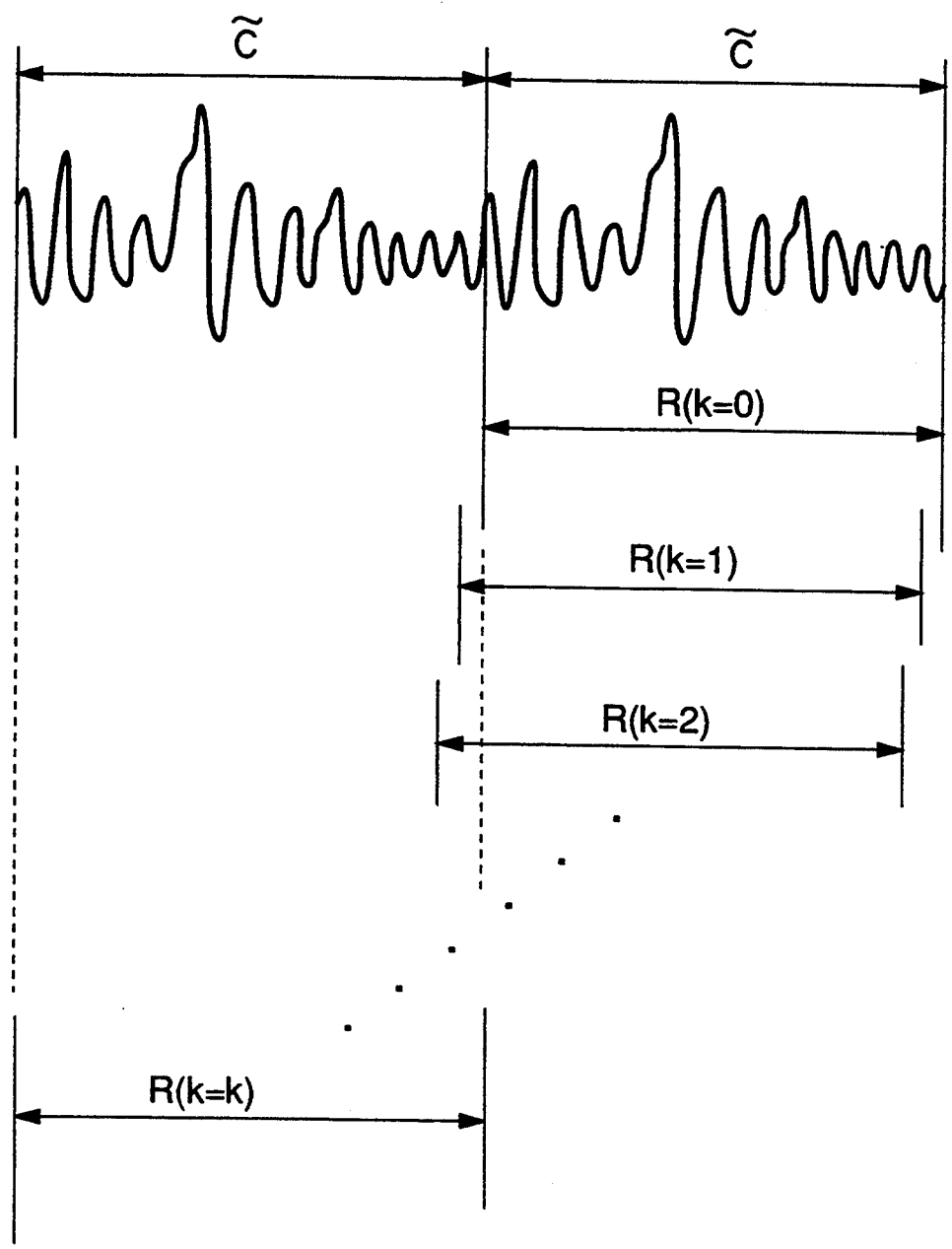
FIG. 16 is a diagram which is useful in explaining how the reference signal R is outputted.

By the use of the identical two sets of each period of the pseudo-period train (C~) of the filter coefficient stored in the register 67 for the C filter 62, the reference signal R is outputted from the register 67 by shifting a reading range of the reference signal corresponding to one period of the pseudo-period train, as shown in FIG. 16. More specifically, with reference to a time point (k=0) at which a pulse of the timing pulse signal X is supplied to the C filter, the reading range of the reference signal R is shifted, to output one form of the reference signal R based on the same pseudo-period train whenever a kth sampling clock is supplied thereto.

Alternatively, the reference signal R may be outputted from the register 67 by shifting the reading range of the reference signal R every sampling interval, although detailed description thereof is omitted.

Thus, according to the embodiment, the timing pulse signal X is directly supplied to the adaptive control circuit 59 as a trigger, which reduces complicated operation of convolution, to thereby enhance the converging speed of the adaptive control for reducing the vibrations and noises. Further, according to the embodiment, the timing pulse signal X is supplied at time intervals depending on operating conditions of the engine, and the number of taps (tap length) of the W filter 60 is varied according to the time intervals. Further, the pseudo-period train (C~) of the filter coefficient of the C filter 62 is formed according to the tap length of the W filter 60 to form the reference signal R. Therefore, the adaptive control is carried out in response to operating conditions of the engine, which makes it possible to control vibrations and noises in a proper and very accurate manner.

Furthermore, the pseudo-period train of the coefficient of the C filter is calculated by the use of the predetermined equations, according to the tap length J of the predetermined filter coefficient stored in the C filter and the point number N, which makes it possible to easily form the desired reference signal R by simple program calculation.

Figure 17:
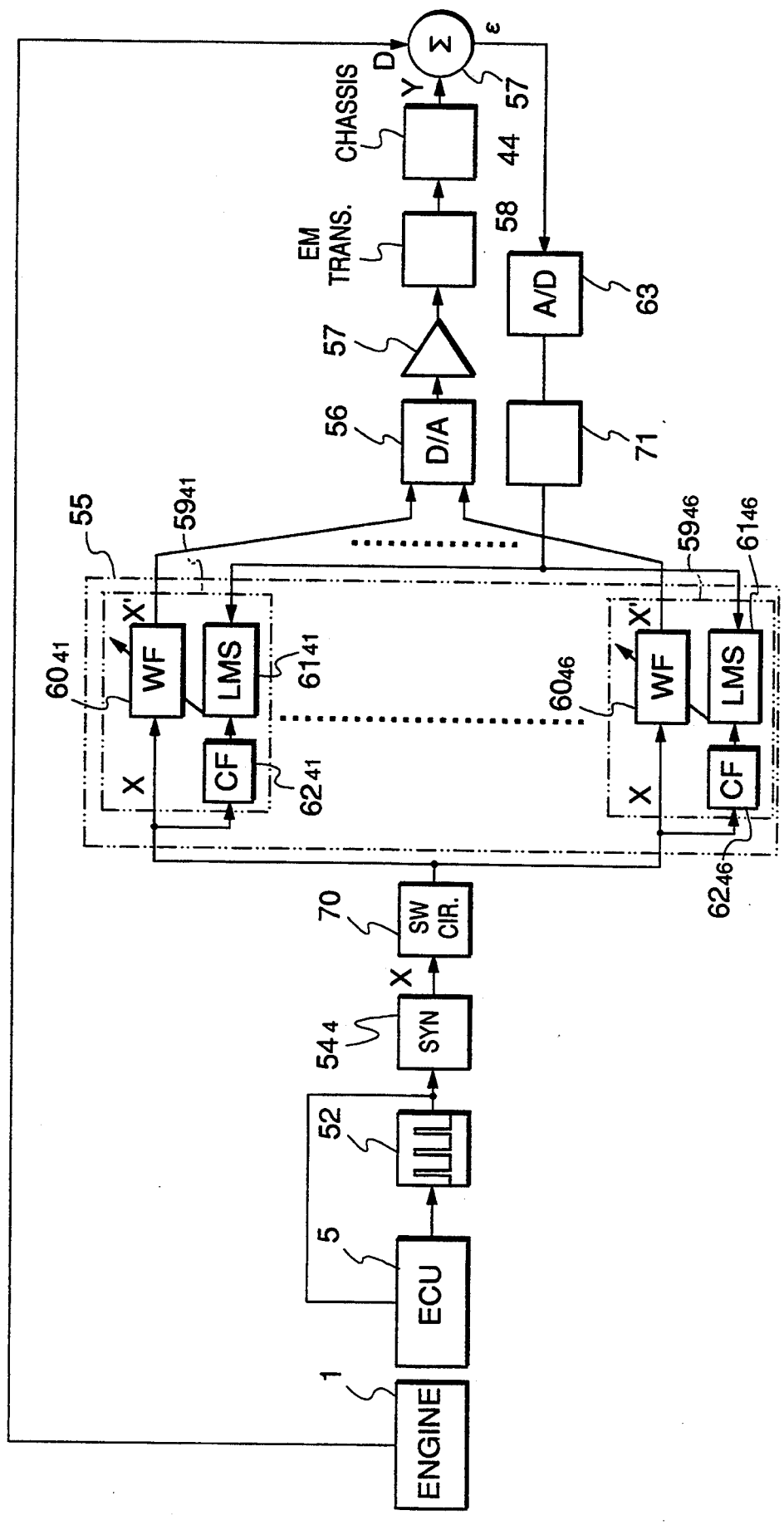
FIG. 17 is a block diagram showing the whole arrangement of a vibration/noise control system for an automotive vehicle, according to a second embodiment of the invention.

Further, although components of vibrations and noises to be controlled corresponding to the frequency order ascribed to the explosion pressure generated in a plurality of cylinders are collectively subjected to the adaptive control in the above described embodiment, different adaptive control circuits $59_{41}$ to $59_{46}$ may be provided, instead, for respective cylinders to control the components of vibrations and noises, as will be described hereinbelow with reference to FIG. 17 showing a second embodiment of the invention.

In the second embodiment of the vibration/noise control system, the timing pulse signal X formed by dividing the basic pulse signal A is supplied to a first switching circuit 70. The first switching circuit 70 is comprised of a counter which is incremented by a value of 1 whenever a pulse of the timing pulse signal X is supplied thereto. Whenever the counter counts up, the timing pulse signal is sequentially supplied to a W filter $60_{41}$, W filter $60_{42}$, ..., and W filter $60_{46}$, outputs from the W filters $60_{41}$ to $60_{46}$ are sequentially supplied via the predetermined signal-transmitting path described above, as the driving signal Y, to the error sensor 51. Then, the error signal $\epsilon$ indicative of the difference between the driving signal Y and the vibration/noise signal D is generated by the error sensor 51, and supplied to the A/D converter 63, where it is converted into a digital signal. Then, the digital signal is supplied to a second switching circuit 71 which counts up in synchronism with the counting by the first switching circuit 70, to be sequentially supplied, respectively, to corresponding adaptive control circuits $59_{41}$ to $59_{46}$ in a feedback manner. A corresponding one of LMS processors $61_{41}$ to $61_{46}$ generates the optimum control signal suitable to the physical arrangement of a corresponding one of cylinders to perform the desired adaptive control. That is, if a component of the vibrations and noises having such a particular frequency order mentioned above is governed by inertia, a difference in physical arrangement between the cylinders causes a small difference in the component since it is represented by the resultant of forces. However, a component in the vibrations and noises resulting from excitation forces generated by combustion within each cylinder largely varies with a difference in physical arrangement between the cylinders.

Therefore, in the second embodiment, the W filters $60_{41}$ to $60_{46}$ are provided for respective cylinders, and the filter coefficients of the filters are sequentially renewed by operation of the first and second switching circuits 70 and 71 to thereby compensate for a difference in contribution of combustion between the cylinders to the resulting component of vibrations and noises. Thus, it is possible to reduce the vibrations and noises without the influence of differences in physical arrangement between the cylinders.

Further, although, in the above described embodiments, the pulse signal generated in synchronism with rotation of the camshaft 27 is used as the basic pulse signal A, this is not limitative, but any other pulse signal may be used insofar as it is generated in synchronism with rotation of the engine. For instance, a crank angle sensor (CRK sensor) may be provided in facing relation to the crankshaft, and an output signal from the CRK sensor may be used as the basic pulse signal A. Further, one of factors causing changes in the engine torque, which results from differences in state of combustion between the cylinders, may be represented by a sparking pulse signal for igniting the cylinders, and this signal may be used as the basic pulse signal A. Further, a combination of these signals may be used as the basic pulse signal A, instead.

Figure 18:
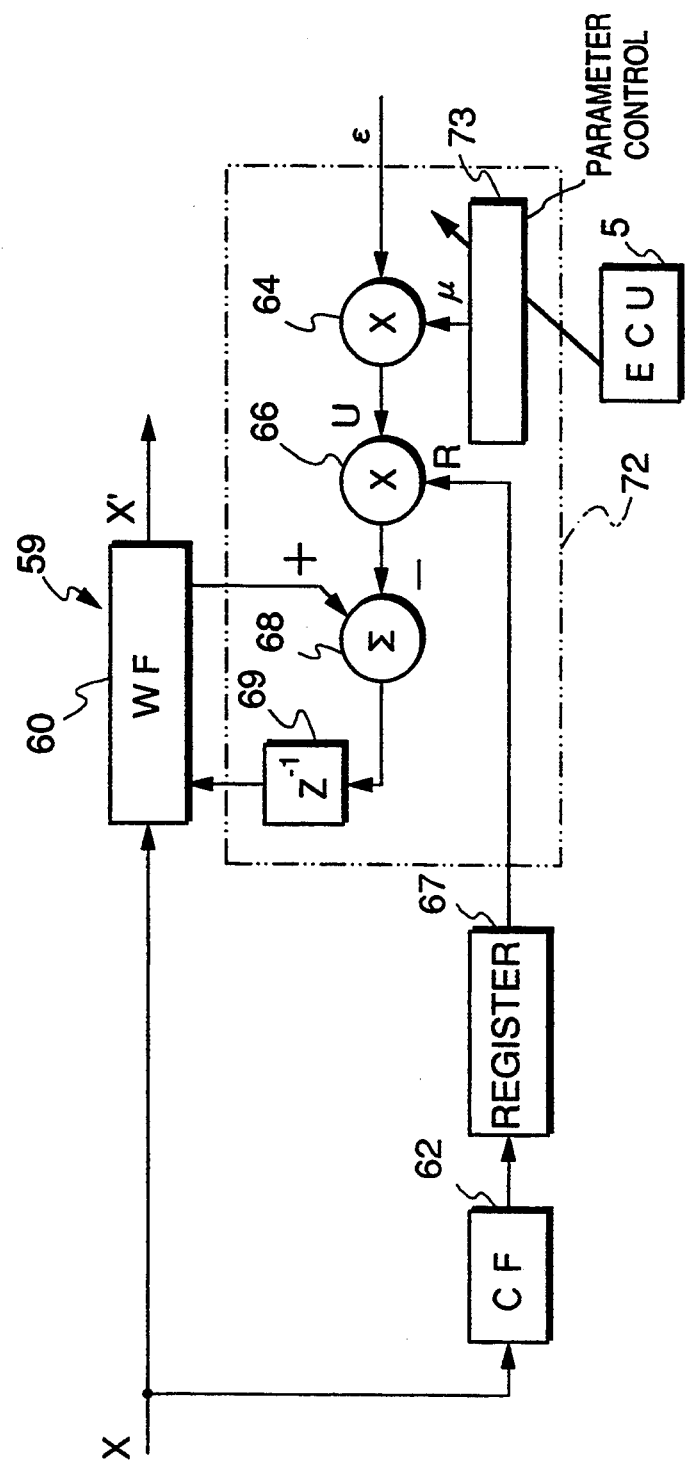
FIG. 18 is a block diagram showing essential parts of a vibration/noise control system according to a third embodiment.

FIG. 18 shows essential parts of a vibration/noise control circuit according to a third embodiment of the invention. In this embodiment, a LMS processor 72 has parameter control means 73 which has parameter changing means for continuously changing the step-size parameter $\mu$ according to an external signal supplied from the ECU 5. The parameter changing means has calculating means for calculating an amount of change of the step-size parameter $\mu$ based on the external signal and the error signal $\epsilon$.

More specifically, the CPU incorporated in the ECU 5 reads detection signals indicative of engine parameters (the engine rotational speed NE, the intake pipe absolute pressure PBA, the fuel injection period TOUT, the throttle valve opening $\theta$TH) and calculates change rate signals (once-differentiated signals) indicative of change rates in the detected parameters, i.e. dNE/dt, dPBA/dt, dTOUT/dt and d$\theta$TH/dt, change acceleration signals (twice-differentiated signals) indicative of accelerations of change in the detected parameters, i.e. $d^2$NE/$dt^2$, $d^2$PBA/$dt^2$, $d^2$TOUT/$dt^2$, and $d^2\theta$TH/$dt^2$, and at least one of these detection signals, change rate signals, and change acceleration signals or a combination of the signals is/are supplied as the external signal to the parameter control means 73. The parameter control means 73 sets the step-size parameter $\mu$ to values suitable to always changing operating conditions of the engine.

Factors reducing the vibrations and noises, include the converging speed for converging the control signal to a desired value, and a reducing effect which minimizes the error signal indicative of a residual error in the control signal. One way to enhance the converging speed and the reducing effect would be to reduce the number of taps of the filter coefficient of the W filter 60 to be renewed for generating a suitable control signal X'. However, in the case where a system to which the vibration/noise control system is to be applied always or constantly varies in operative state, it is required to provide a large number of taps of the filter coefficient for renewal in order to attain a satisfactory reducing effect, and hence it is difficult to improve the converging speed by reducing the number of taps of the filter coefficient for renewal. Further, as the adaptive algorithm, it is considered that the conventional LMS method in wide use is most preferable. Further, although the computing speed of computers has been markedly increased recently along with technical development in the computer field, it is difficult to achieve a desired increase in the converging speed even by the present increased computing speed of a computer used.

In contrast, as to setting the value of the step-size parameter, it is known that there exists a mathematical limitation which is expressed by the following equation (4) (disclosed e.g. by Haruo Hamada in "Fundamentals (No. 2) of the Adaptive Filter", Journal of Japanese Acoustics Association, Vol. 45, No. 9 (1989)):

$$0 < \mu < 1/\lambda\text{max} \quad (4)$$

where λmax represents the maximum eigenvalue of a correlation matrix based on a mean square value of tap inputs to the W filter 60 and a correlation function between the tap inputs. If the step-size parameter μ is set to a larger value, the converging speed increases accordingly, but the stability in the control of vibrations and noises generated by the applied system is lost, whereas if it is set to a smaller value, the stability is secured, but the converging speed decreases. Further, in actual application of the step-size parameter μ, it is set to a value much smaller than a value of 1/λmax and even close to "0", to thereby attain stability of the applied system. Particularly, it is known that if an error due to signal noise is detected when the filter coefficient of the W filter 60 reaches the optimum value, there occurs a phenomenon of so-called "fluctuation". Therefore, if the step-size parameter μ is set to a large value, the "fluctuation" also becomes large, and hence the reducing effect after convergence decreases. On the other hand, for automotive vehicles, it is preferable to set the step-size parameter μ to a small value to preferentially achieve desired stability of the applied system when the operating condition of the engine is steady, while it is preferable to set the step-size parameter μ to a large value when the operating condition of the engine largely changes, so as to follow up a sudden change in the operating condition. The third embodiment of the invention contemplates the step-size parameter μ having the above described influence on the control of vibrations and noises. According to the embodiment, by the use of external signals indicative of operating conditions of the engine, the step-size parameter μ is continuously changed to form the control signal X' in response to incessantly changing conditions of the system to which the vibration/control system is applied.

Figure 19:
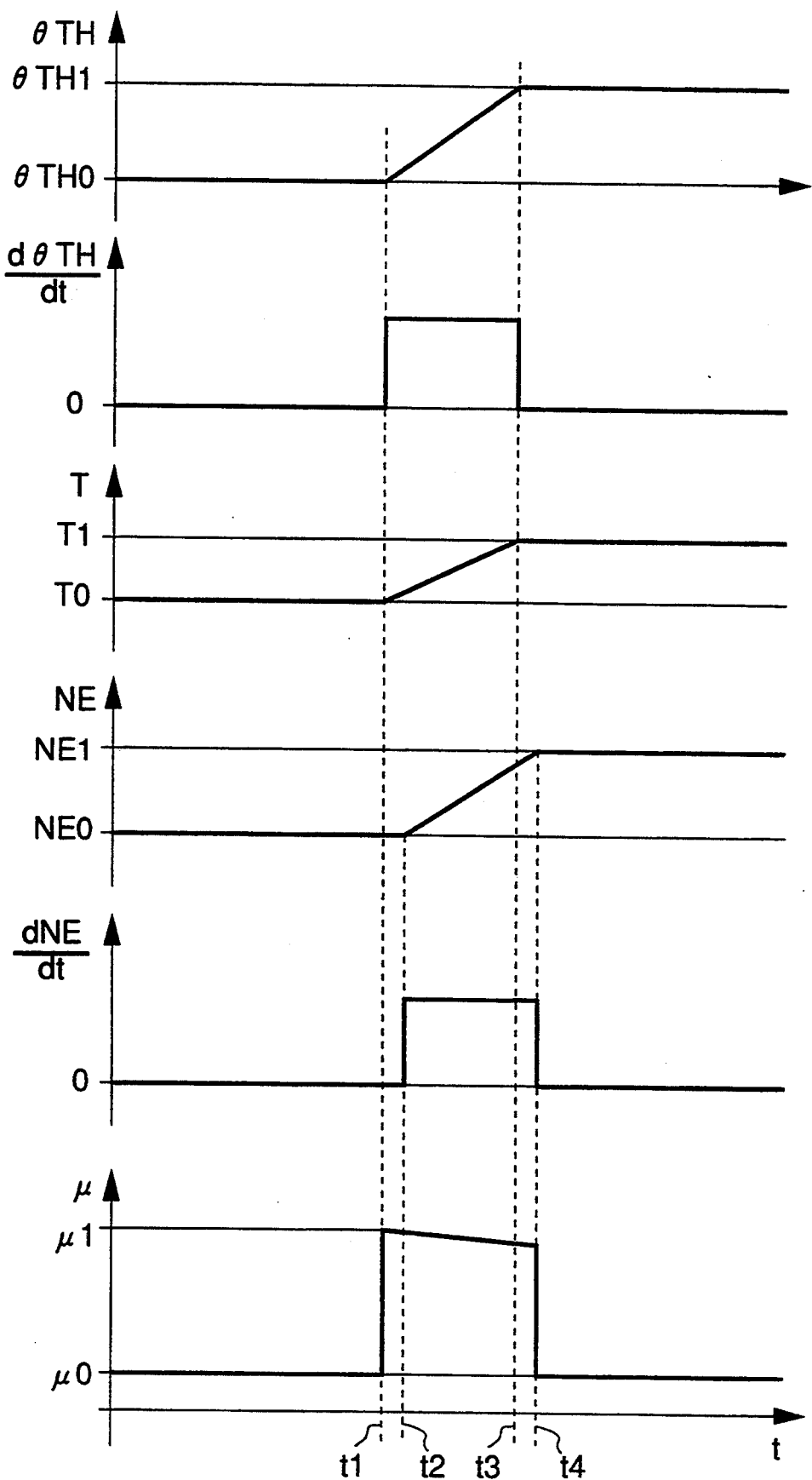
FIG. 19 is a timing chart which is useful in explaining how a step-size parameter $\mu$ is set.

FIG. 19 shows timing of various external signals, which is useful in explaining an example of the parameter changing means. In this example, as the external signals, there are used signals indicative of the throttle valve opening θTH and the engine rotational speed NE, change rate signals thereof indicative of dθTH/dt and dNE/dt, for changing the step-size parameter μ.

More specifically, when the operating condition of the engine undergoes a sudden transient change, e.g. if the throttle valve opening θTH of the throttle valve 3' is drastically changed (from θTH to θTH1), the fuel injection amount (fuel injection period TOUT) immediately increases to cause the output torque T to change with almost no delay (from T0 to T1), and hence the step-size parameter μ is increased simultaneously with the change in the throttle valve opening θTH, as indicated by t1 in FIG. 19.

On the other hand, the engine rotational speed NE starts to change with a slight delay after the throttle valve opening θTH starts to be changed, as indicated by t2 in the figure. Then, upon the lapse of a predetermined time period after the completion of change of the throttle valve opening θTH, as shown by t3 in the figure, the change in the engine rotational speed NE is completed, as indicated by t4 in the figure. Accordingly, it is required that the step-size parameter μ should be maintained at a predetermined value of μ1 until the change in the engine rotational speed NE is completed.

To this end, the parameter control means 73 is adapted to perform a calculation such that the step-size parameter μ is increased at the time point t1 (before t2) the throttle valve opening θTH starts to be suddenly changed, and it is decreased at the time point t4 (after t3) the change in the engine rotational speed NE is completed.

More specifically, according to the present embodiment, the step-size parameter μ is calculated based on the following equations (5) and (6) depending on the changing speeds (change rates) of the throttle valve opening TH and the engine rotational speed NE in order to sensitively respond to changes in phase and amplitude of the transfer characteristics of the vibrations and noises:

In the case of $\beta_1 \left| \frac{d\theta TH}{dt} \right| > \beta_2 \left| \frac{dNE}{dt} \right|$, $$\mu = \mu_0 \left\{ 1 + \alpha \left( \frac{NE - NEIDL}{NEmax} \right) \right\} \times \left\{ 1 + \beta_1 \left| \frac{d\theta TH}{dt} \right| \right\} \quad (5)$$

and in the case of $\beta_1 \left| \frac{d\theta TH}{dt} \right| \leq \beta_2 \left| \frac{dNE}{dt} \right|$, $$\mu = \mu_0 \left\{ 1 + \alpha \left( \frac{NE - NEIDL}{NEmax} \right) \right\} \times \left\{ 1 + \beta_2 \left| \frac{dNE}{dt} \right| \right\} \quad (6)$$

where α(−1<α<0) represents a correction coefficient (e.g. −0.50, NEIDL a value of frequency (e.g. 10 Hz) corresponding to the idling rotational speed of the engine (e.g. 600 rpm), and NEmax a value of frequency (e.g. 100 Hz) corresponding to the maximum engine rotational speed (e.g. 6000 rpm). Further, $\mu_0$ represents a value of the step-size parameter μ (e.g. 0.05) assumed when the engine is idling.

Further, $\beta_1$ represents a coefficient (e.g. 1.51 to 15.8) which is determined based on the step-size parameter μ and the maximum value of the changing speed of the throttle valve opening θTH, and $\beta_2$ represents a coefficient (e.g. 0.03 to 0.33) which is determined based on the step-size parameter μ and the maximum value of the changing speed of the engine rotational speed NE.

As is apparent form FIG. 19, from the time point t1 to the time point t2, the relationship of $(\beta_1|d\theta TH/dt|) > (\beta_2|dNE/dt|)$ holds, and accordingly, the step-size parameter μ is calculated by the use of the equation (5); from the time point t2 to the time point t3, the step-size parameter μ is calculated by the equation (5) or the equation (6) depending upon the relationship in value between $(\beta_1|d\theta TH/dt|)$ and $(\beta_2|dNE/dt|)$; and from the time point t3 to the time point t4, the relationship of $(\beta_1|d\theta TH/dt|) \leq (\beta_2|dNE/dt|)$ holds, and accordingly, the step-size parameter μ is calculated by the use of the equation (6).

In this manner, when the engine rotational speed NE is low, and hence the repetition period of the waveform of the vibrations and noises generated in synchronism with the rotation of the engine is large, the step-size parameter μ can be set to a larger value than when the engine rotational is high, which enables to prevent the converging speed from being lowered even when the engine rotational speed NE is low.

Further, according to the vibration/noise control system for automotive vehicles according to the invention, the ECU performs calculations for detecting the engine operating parameters based on external signals supplied thereto, while the parameter control means 73 within the LMS processor 72 of the DSP calculates the step-size parameter $\mu$, which makes it possible to maintain the amount of lowering in the computing speed at the minimum.

Thus, according to the third embodiment, it is possible to perform the adaptive control with excellent converging capability and hence can promptly respond to changes in phase, amplitude, etc. in waveforms indicative of incessantly changing vibration/noise characteristics, to thereby attain a marked reduction of vibrations and noises over a wide range of operating conditions of the engine. More specifically, when the operating condition of the engine changes slightly, the step-size parameter $\mu$ is set to a small value, whereas when the operating condition of the engine changes drastically, the step-size parameter $\mu$ is set to a large value, whereby it is possible to attain a converging speed and a vibration/noise-reducing effect suitable for changes in the engine operating condition. Moreover, since the computing operations for forming external signals are carried out within the ECU 5, a large increase can be prevented in the amount of computation within the LMS processor 72. Further, according to the present embodiment, the throttle valve opening $\theta$TH is used as an engine operating parameter indicative of a change in load on the engine in calculating the step-size parameter $\mu$. However, it goes without saying that the throttle valve opening $\theta$TH may be replaced by or may be used in combination with the intake pipe absolute pressure PBA detected by PBA sensor 8.

Further, although, in the third embodiment, the step-size parameter $\mu$ is continuously varied based on changing speeds of engine operating parameters such as the throttle valve opening $\theta$TH and the engine rotational speed NE, this is not limitative, but preferably change accelerations of these parameters ($d^2\theta TH/dt^2$, $d^2NE/dt^2$, $d^2\theta TH/dt^2$, etc.) may be used as external signals, to adapt the vibration/noise control to more promptly respond to changes in phase, amplitude, etc. of the waveform of the vibrations and noises. Further, signals indicative of these operating parameters, changing speeds thereof, and change accelerations may be used in combination with each other to form external signals, based on which the step-size parameter $\mu$ is calculated, whereby the converging speed and the vibration/noise reducing effect can be further enhanced.

Figure 20:
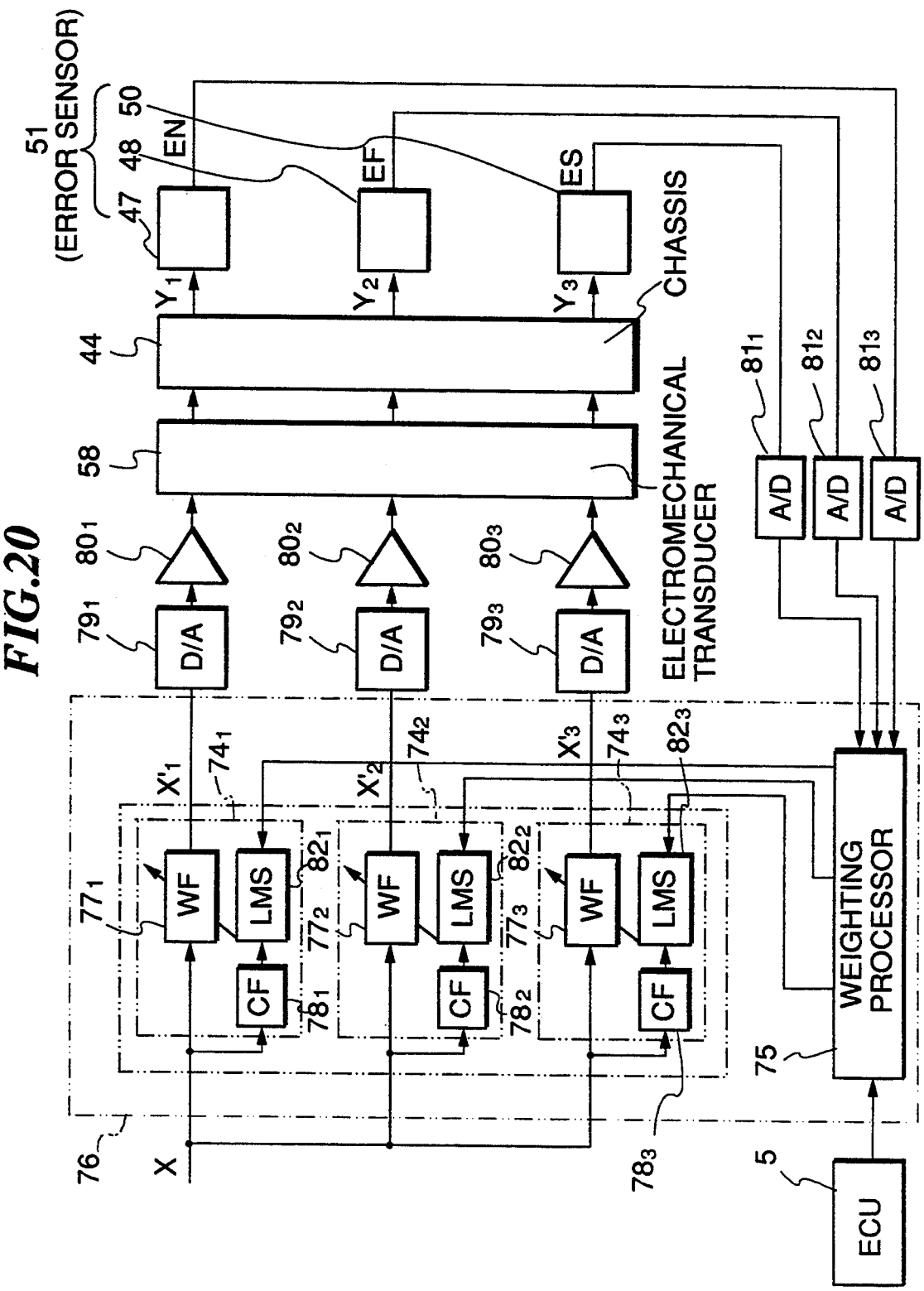
FIG. 20 is a block diagram showing a vibration/noise control circuit according to a fourth embodiment of the invention.

FIG. 20 shows the arrangement of a vibration/noise control circuit of a vibration/noise control system according to a fourth embodiment of the invention, in which a noise error sensor 47, a floor vibration sensor 48 and a steering vibration error sensor 50 are provided on the ceiling, the floor, and the steering wheel in the compartment of the vehicle, respectively, to detect respective errors, and based on the results of detection, weighting processing is carried out depending on operating conditions of the engine 1.

More specifically, in the vibration/noise control system according to the fourth embodiment, the DSP 76 has three adaptive control circuits $74_1$ to $74_3$ provided for separately carrying out the adaptive control in response to outputs from the three error sensors, collectively indicated by 51 (individually, 47, 48, and 50), and a weighting processor 75 for performing weighting operation based on results of detection by the error sensors 51 and depending on operating conditions of the engine. The weighting processor 75 includes an input circuit, a CPU, and memory means, as does the ECU 5.

In the vibration/noise control system according to the fourth embodiment, the basic pulse signal from the ECU 5 is divided to form the timing pulse signals X, which are supplied to the DSP 76, i.e. to W filters $77_1$ to $77_3$ and C filters $78_1$ to $78_3$ of the adaptive control circuits $74_1$ to $74_3$. Then, control signals $X_1'$ to $X_3'$ generated by the W filters $77_1$ to $77_3$ are supplied to D/A converters $79_1$ to $79_3$, where they are converted into digital signals, which in turn are supplied to amplifiers $80_1$ to $80_3$ to be amplified. The amplified. The amplified control signals are supplied to the electromechanical transducer means 58 provided across the vibration/-noise-transmitting paths, and the resulting vibrations and noises transmitted through the chassis 44, etc., are detected and supplied as driving signals $Y_1$ to $Y_3$ to the respective error sensors (the noise error sensor 47, the floor error sensor 48 and the steering error sensor 50). These three error sensors 51 generate error signals EN, EF, ES, respectively, which are supplied via A/D converters $81_1$ to $81_3$ to the weighting processor 75.

On the other hand, signals from the TDC sensor 9, the PBA sensor 8 and an atmospheric pressure (PA) sensor, not shown, are supplied via the ECU 5 to the weighting processor 75. The weighting processor 75 performs predetermined weighting processing for the error signals EN, EF, ES depending on data obtained from the operating condition parameter signals. Outputs from the weighting processor 75 are supplied to the adaptive control circuits $74_1$ to $74_3$ corresponding to respective control regions (evaluating points) where the error sensors are arranged, specifically to the LMS processors $82_1$ to $82_3$, respectively.

Next, there will be described in detail a manner of the weighting processing carried out by the weighting processor 75.

Figure 21:
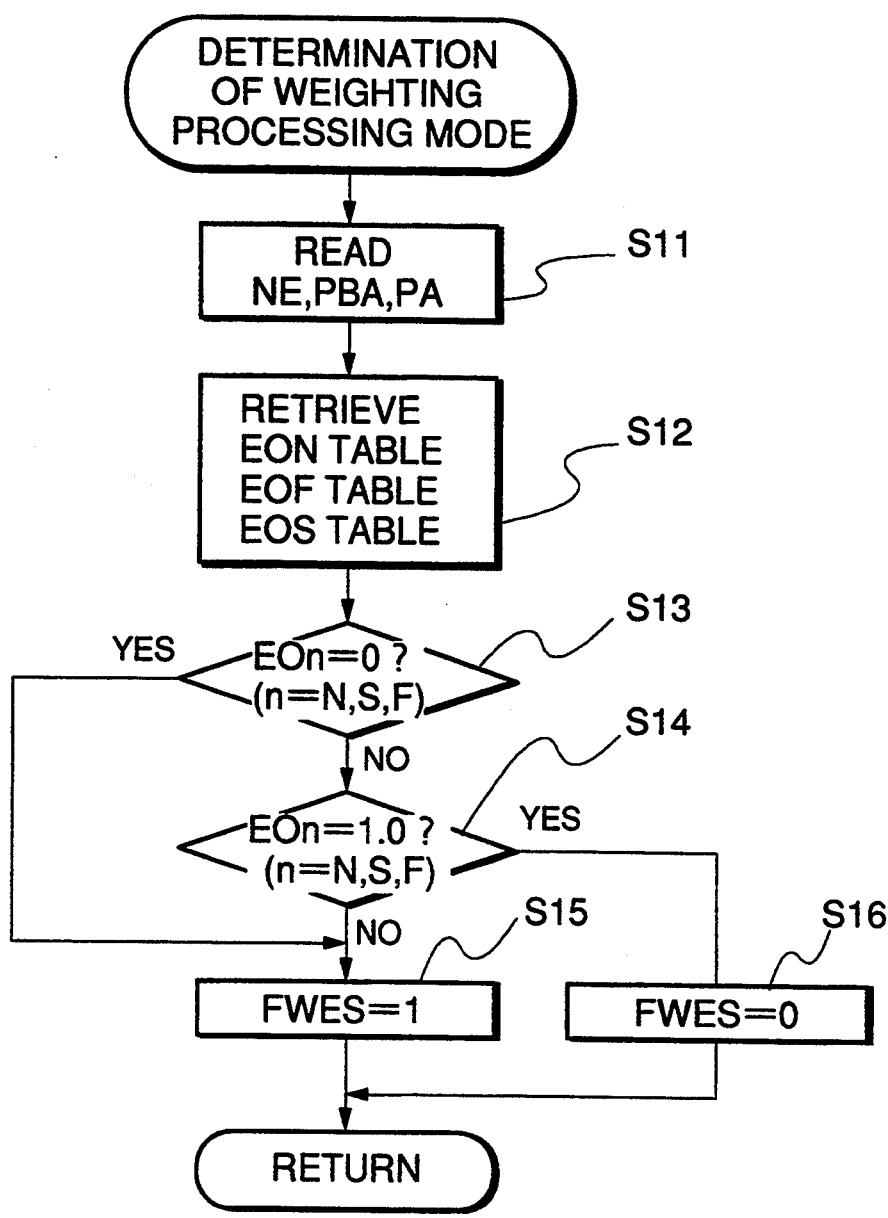
FIG. 21 is a flowchart of a routine for determining a weighting mode to be used.

FIG. 21 shows a program for determining a mode of weighting processing to be performed, which is executed by background processing.

First, at a step S11, a value of the engine rotational speed NE detected by the NE sensor 9, a value of the intake pipe absolute pressure detected by the intake pipe absolute pressure PBA detected by the PBA sensor 8, and a value of the atmospheric pressure PA detected by the PA sensor are supplied via the ECU 5 to the weighting processor 75, to be stored into the memory means (RAM) therein.

Then, at a step S12, weighting coefficients EOS, EOF, and E0S are determined by retrieving an E0N map, an E0F table, and an E0S table, stored in memory means (ROM) of the weighting processor 75, according to the detected value of the engine rotational speed, etc.

More specifically, the E0N map is set, e.g. as shown in FIG. 22, such that predetermined values of the weighting coefficient E0N for correcting an error detected in respect of noises correspond to predetermined values of the engine rotational speed NE and values of the intake pipe negative pressure PB (=PBA−PA), shown in the form of a matrix, and a value of the weighting coefficient E0N is determined by reading one of the map values according to the engine rotational speed NE and the intake pipe negative pressure PB, and by interpolation, if required.

Further, the E0F table is set, e.g. as shown in FIG. 23, such that predetermined values of the weighting coefficient E0F for correcting an error detected in respect of vibrations of the floor of the vehicle compartment correspond to predetermined values of the engine rotational speed NE, and a value of the weighting coefficient E0F is determined by reading one of the map values according to the engine rotational speed NE, and by interpolation, if required. In this connection, if a value of the weighting coefficient E0F obtained by interpolation is smaller than 0.2, the value is adjusted to 0.

Further, the E0S table is set, e.g. as shown in FIG. 24, such that predetermined values of the weighting coefficient E0S for correcting an error detected in respect of vibrations related to steering of the vehicle correspond to predetermined values of the engine rotational speed NE, and a value of the weighting coefficient E0S is determined by reading one of the map values according to the engine rotational speed NE, and by interpolation, if required. In this connection, if a value of the weighting coefficient E0S obtained by interpolation is smaller than 0.2, the value is adjusted to 0, similarly to the E0F value.

Then, at a step S13, it is determined whether or not the weighting coefficients E0N, E0F, and E0S calculated at the step S12 are equal to 0.

If the answer to each of these questions concerning the respective evaluating points is affirmative (YES), a corresponding FWES flag is set to "1" at a step S15, followed by terminating the program. For instance, if the engine rotational speed NE assumes a value of 500 rpm, and the intake pipe negative pressure PB assumes a value of $-700$ mmHg, the value of the weighting coefficient E0N is determined to be equal to 0 based on the E0N map shown in FIG. 22, and accordingly a FWES flag for control of noises in the compartment is set to "1", followed by terminating the program.

On the other hand, if the answer to each of these questions concerning the respective evaluating points is negative (NO), the program proceeds to a step S14, where it is determined whether or not the weighting coefficient E0n (n=N, S, E) is equal to 1.0. For example, in the above exemplified case, since the weighting coefficient E0N has already been determined to be equal to 0 at the step S13, it is determined at the step S14 whether or not the weighting coefficients E0F and E0S are equal to 1.0, respectively. If the answer to this question is negative (NO) for any of the evaluating points, a corresponding FWES flag is set to "1" at the step S15, followed by terminating the program, whereas if the answer is affirmative (YES), the corresponding FWES flag is set to "0" at a step S16, followed by terminating the program. For example, in the above exemplified case, since the engine rotational speed NE is equal to 500 rpm, E0F=1.0 and E0S=1.5, so that a FWES flag for control of vibrations of the compartment floor is set to 0 and a FWES flag for control of vibrations related to steering is set to "1". In short, in this case, no weighting processing is carried out on the error signal detected on vibrations of the compartment floor to thereby perform ordinary error scanning.

Figure 25:
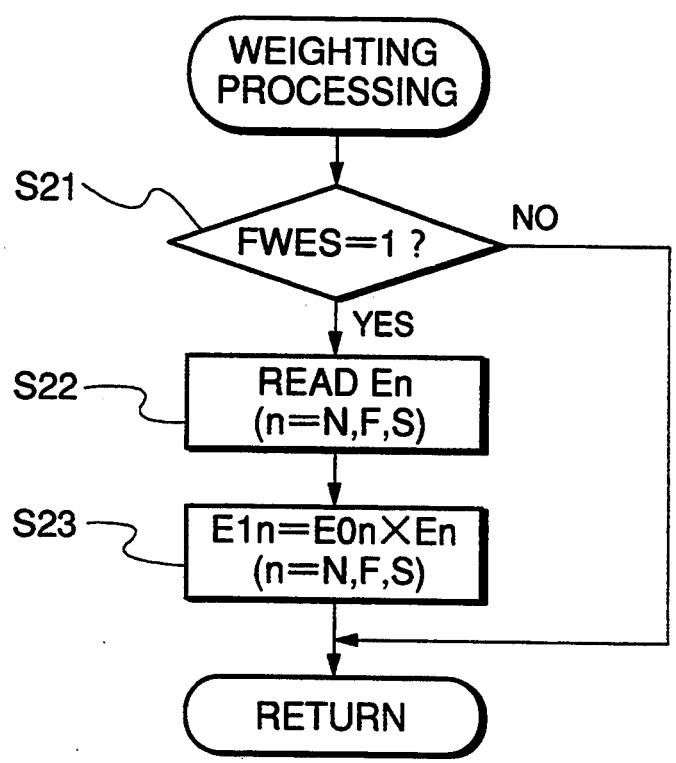
FIG. 25 is a flowchart of a routine for carrying out weighting processing.

FIG. 25 shows a program for carrying out the weighting processing. This program is executed in synchronism with inputting of the timing pulse signal X to the adaptive control circuits $74_1$ to $74_3$.

First, at a step S21, it is determined whether or not the FWES flag for each evaluating point is equal to "1".

If the answer to this question is negative (NO), the program is immediately terminated, whereas if the answer is affirmative (YES), the program proceeds to a step S22, where the corresponding one of the error signals EN, EF and ES from the error sensors 51 is read and stored in the memory means. Then, at a step S23, the weighting of the corresponding error signal is carried out to calculate a corrected error signal (E1N, E1F, or E1S), followed by terminating the program.

$$E1N = E0N \times EN \qquad (7)$$

$$E1F = E0F \times EF \qquad (8)$$

$$E1S = E0S \times ES \qquad (9)$$

Consequently, e.g. in the case where the engine rotational speed nE is 500 rpm, the intake pipe negative pressure PB is $-700$ mmHg, the E0N, E0F, E0S values are calculated from the above-mentioned map and tables, and hence E1N=0, E1F=EF, E1S=1.5ES. Therefore, as to noises in the compartment, no error scanning is carried out because E1N=0, while error scanning is carried out on vibrations of the compartment floor and those related to steering, based on the uncorrected error signal EF and the corrected error signal E1S.

Figure 26:
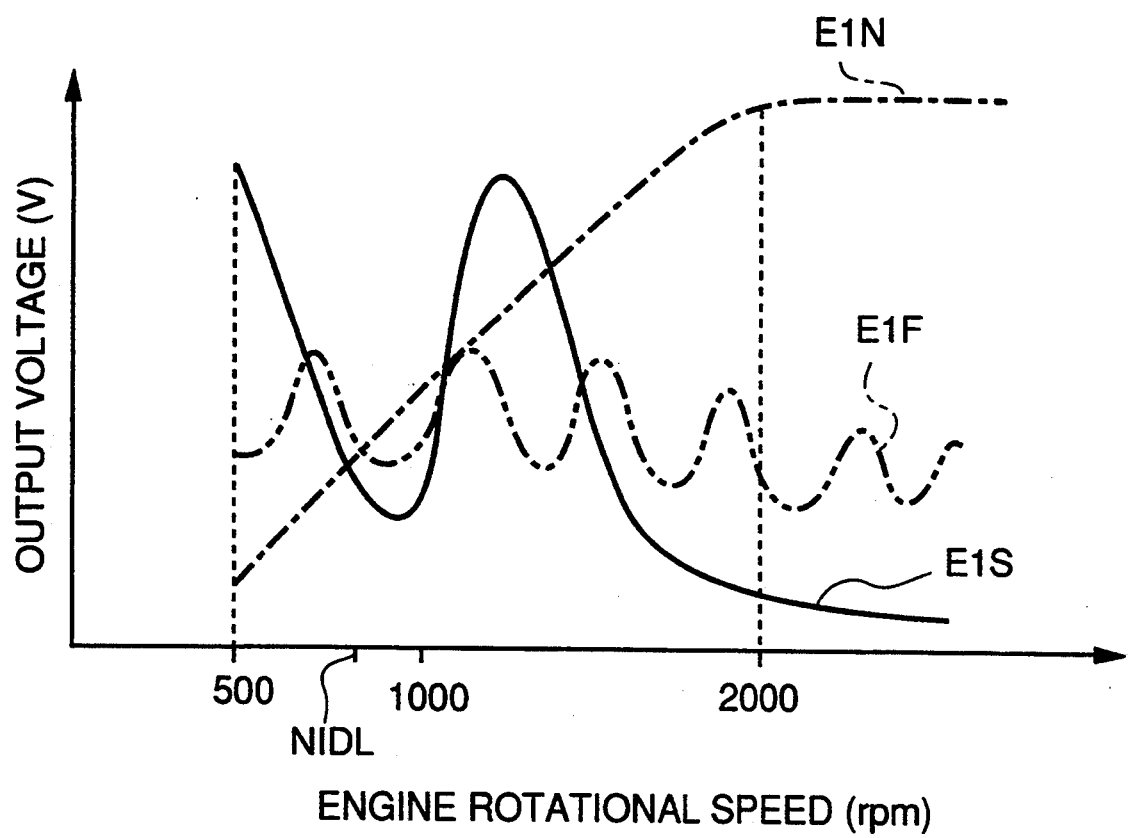
FIG. 26 is a graph showing output characteristics of correction error signals used for the weighting processing.

FIG. 26 shows results of the vibration/noise control which is carried out based on the corrected error signal obtained by the weighting processing describe above.

For example, when the engine rotational speed NE is 2000 rpm, and the intake pipe negative pressure PB is 0 mmHg, values of the weighting coefficients, E0N=1.5, E0F=1.3, and E0S=0.8, are read from the map and tables shown in FIGS. 22 to 24, and hence the corrected error signals are set such that E1N=1.5N, E1F=1.3 EF, and E1S=0.8 ES. As is apparent from FIG. 26, the E1N value is increased while the E1S value is decreased, whereby the vibration/noise control, which preferentially controls noises within the compartment, is carried out.

Further, for example, when the engine rotational speed NE is 500 rpm, and the intake pipe negative pressure PB is $-500$ mmHg, values of the weighting coefficients, E0N=0.2, E0F=1.0, and E0S=1.5, are read from the map and tables shown in FIGS. 22 to 24, and hence the corrected error signals are set such that E1N=0.2 EN, E1F=1.0 EF, and E1S=1.5 ES. Namely, the E1S value is set to a large value, and hence the vibration/noise control, which preferentially controls vibrations related to steering, can be carried out.

According to the vibration/noise control system according to the fourth embodiment, weighting is carried out on each of residual errors detected by the error sensors 51, depending on operating conditions of the engine, so that "weight" or importance on a particular kind of residual error which contributes to renewal of the filter coefficient of a W filter is varied according to operating conditions of the engine. This makes it possible to effectively reduce vibrations and noises in a manner suitable to the sense of the driver or occupants in the vehicle.

In addition, although, in the above described fourth embodiment, three error sensors are employed for detecting respective kinds of control errors and weighting is carried out on each of them, this is not limitative, but of course four or more error sensors may be employed to carry out weighting of each of errors detected thereby in a manner similar to that described above.

Figure 27:
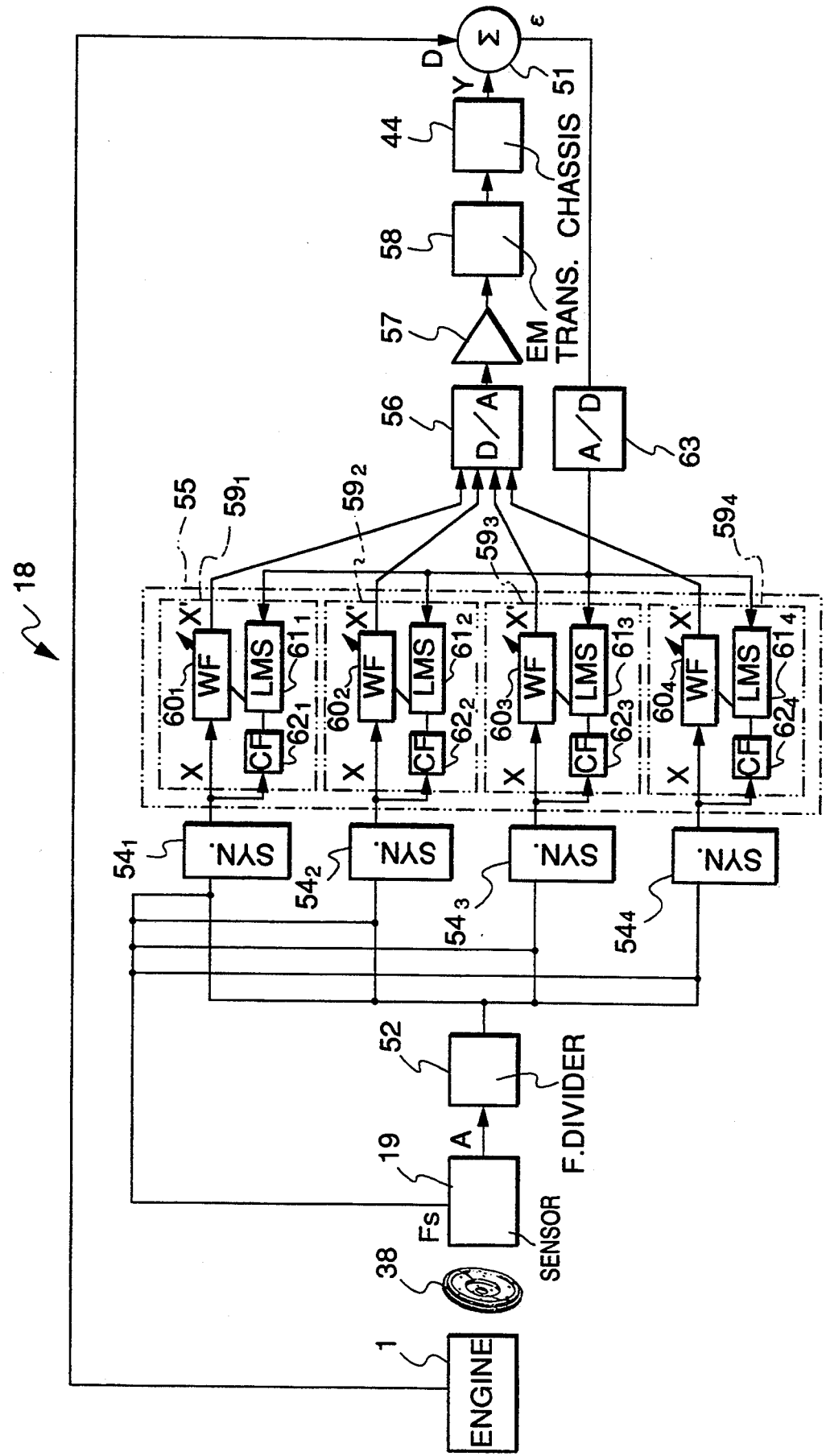
FIG. 27 is a block diagram showing a vibration/noise control circuit according to a fifth embodiment of the invention.

FIG. 27 schematically shows a vibration/noise control circuit 18 and its related component parts of the vibration/noise control system, according to a fifth embodiment of the invention. In this embodiment, a so-called variable sampling method is used in which the sampling frequency Fs is varied depending on operating conditions of the engine. More specifically, in this vibration/noise control circuit 18, the rotation-detecting sensor 19 formed e.g. of a magnetic sensor is arranged in the vicinity of the flywheel rigidly fitted on the crankshaft 36 shown in FIG. 7, referred to hereinbefore, for counting the number of starter gear teeth formed on the peripheral surface of the flywheel 38 in rotation, to thereby generate a pulse signal. In other words, according to this embodiment, the sampling frequency Fs is determined directly from the pulse signal indicative of the rotation of the crankshaft 36 which is obtained by counting the number of starter gear teeth passing the rotation-detecting sensor 19, while the pulse signal is used as the basic pulse signal A, which is divided by the frequency divider 52 into timing pulse signals X having predetermined frequency orders (e.g. first order, 1.5th order, second order, and third order). The timing pulse signals X are supplied to the respective adaptive control circuits $59_1$ to $59_4$ within the DSP 55, similarly to the first embodiment described hereinbefore, which control circuits output control signals X' at time intervals corresponding to time intervals which the timing pulse signals X are supplied thereto, respectively, to thereby perform the desired adaptive control. In the present embodiment, the sampling frequency Fs is variable according to the time interval between adjacent pulses of the basic pulse signal A, so that it is not necessary to adapt the numbers of taps (tap length) of the W filters $60_1$ to $60_4$ to the respective time intervals of adjacent pulses of the timing pulse signals X in following up the operating condition of the engine.

In the vibration/noise control circuit 18 of this embodiment, since the sampling frequency Fs is varied according to the time interval between adjacent pulses of the timing pulse signals X in a manner following up them, there is a fear that a reference signal R cannot be obtained in response to a change in the sampling frequency Fs if the filter coefficient CΛ stored in the C filter representing the transfer function of the signal-transmitting path or the vibration-transmitting path is set to a fixed value according to a system to which the present vibration/noise control system is applied.

Therefore, in the present embodiment, a plurality of filter coefficients C (Fn)(n=1, 2, ..., m) are stored in advance in the C filter 62, and a plurality of frequency band regions Fn (n=1, 2, 3, ..., m) are provided for selection according to the engine rotational speed Ne. And a desired filter coefficient CΛ (Fn) is selected depending on which region the engine rotational speed NE detected belongs to, whereby a desired reference signal R can be obtained even if the sampling frequency Fs changes.

Figure 28:
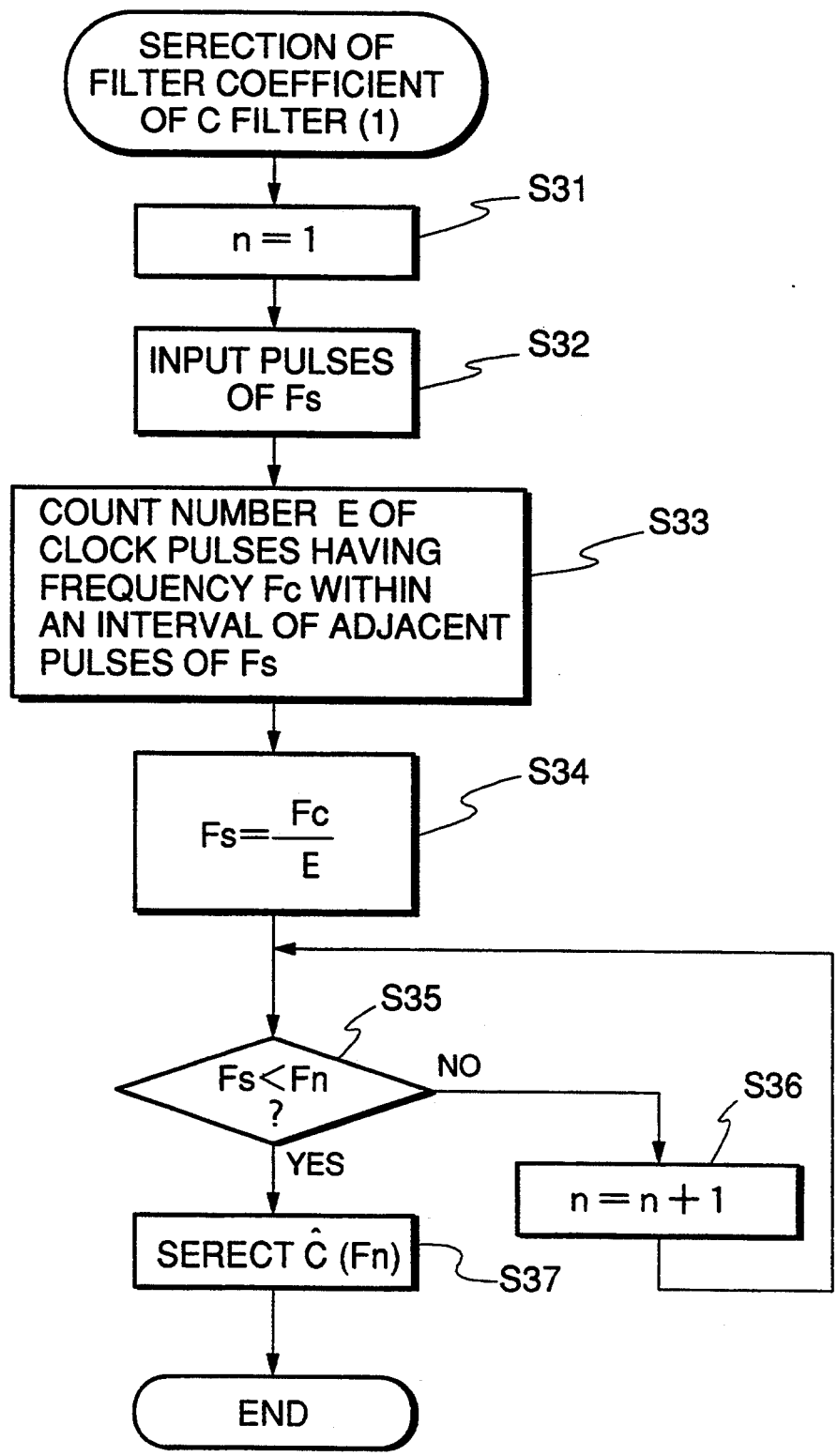
FIG. 28 is a flowchart showing a routine for selecting transfer characteristics of the C filter.

FIG. 28 shows a program for selecting a filter coefficient to be used in the C filter, which is carried out within the DSP 55 in synchronism with generation of pulses of the timing pulse signals X.

First, immediately after the start of the engine 1, the vibration-transmitting characteristic, i.e. the transfer function, of a system to which the present vibration/noise control system is applied is not known at all, and hence the variable n indicative of a selected filter coefficient is set to "1" at a step S31, and pulses having an optional sampling frequency Fs are inputted at a step S32. Then, the number E of driving clock pulses having a frequency Fc of e.g. 10 MHz for driving the ECU 5, which occur between adjacent pulses of the input optional sampling frequency Fs is measured by a counter, not shown, at a step S33.

Then, at a step S34, the sampling frequency Fs is calculated based on the following equation (10):

$$Fs = Fc/E \quad (10)$$

Then, at a step S35, it is determined whether or not the input sampling frequency Fs is smaller than the selected frequency region Fn (in the present case, n=1). The selected frequency region F1 is suitable for control to be carried out when the engine rotational speed NE is very low, and accordingly, the answer to the question of the step S35 is negative (NO), so that the variable n indicative of the selected frequency region and hence the selected filter coefficient is increased by an increment of 1 at a step S36, followed by the program returning to the step S35, where it is determined whether or not the sampling frequency Fs is smaller than the new selected frequency region F2. This process is repeatedly carried out until the sampling frequency Fs becomes smaller than the selected frequency region Fn, and if the answer to the question of the step S35 is affirmative (YES), it is judged that the selected frequency region Fn at this time is most close to the sampling frequency Fs, and the program proceeds to a step S37, where a filter coefficient CΛ, corresponding to the selected frequency region Fn is selected, followed by terminating the program.

In this manner, immediately after the start of the engine, it is possible to obtain the optimum filter coefficient of the C filter by comparing the sampling frequency Fs with low selected frequency regions.

Figure 29:
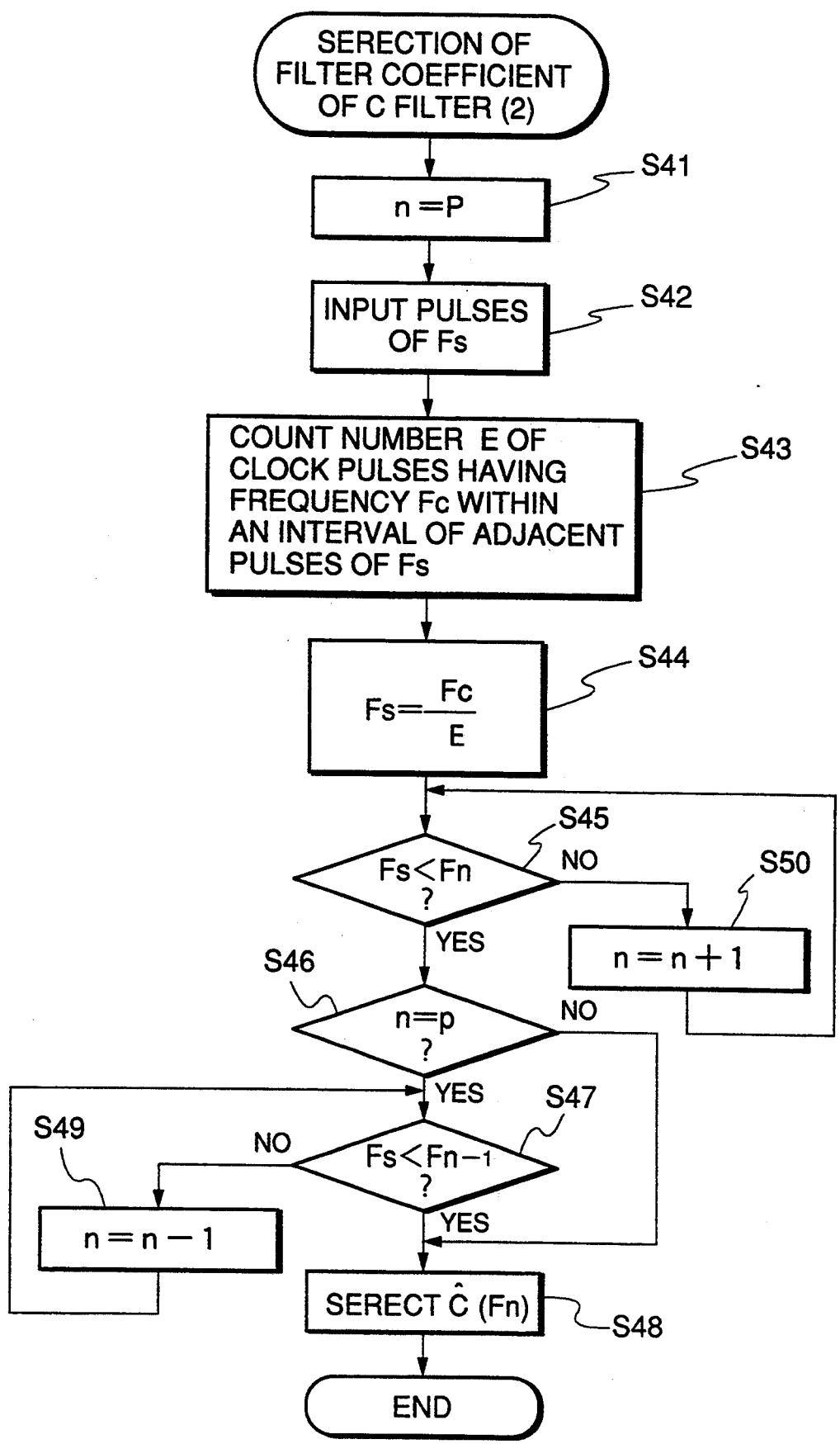
FIG. 29 is a flowchart showing another example of a routine for selecting transfer characteristics of the C filter.
Figure 30:
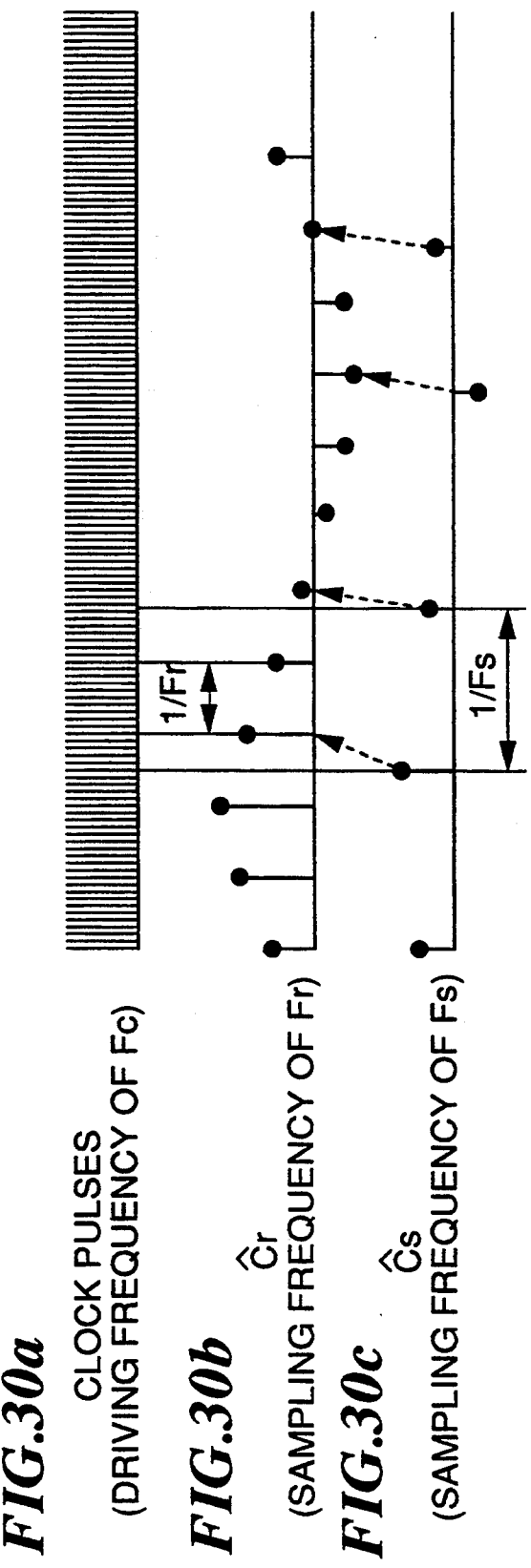

Further, after the engine rotational speed NE has reached a considerably large value, the filter coefficient CΛ (Fn) of the C filter is selected according to a program shown in FIG. 29, which will now be described below.

After n=p is established, i.e. after Fn is set to a medium frequency value Fp in a range of F1 to Fn at a step S41, the sampling frequency Fs is inputted at a step S42, similarly to the program shown in FIG. 28. Then, pulses having the sampling frequency Fs are inputted at a step S42, and then the number E of driving clock pulses (having the driving frequency Fc), which occur between adjacent pulses of the input unknown sampling frequency Fs, is counted by a counter, not shown, at a step S43, whereby the sampling frequency Fs is calculated by the use of the equation (10) at a step S44. Then, it is determined at a step S45 whether or not the input sampling frequency Fs is smaller than the selected frequency region Fn (in the present case, Fp). If the answer to this question is affirmative (YES), the program proceeds to a step S46 where it is determined whether or not the variable n is equal to p. In the present case, the answer is affirmative (YES), and hence the program proceeds to a step S47, where it is determined whether or not the sampling frequency Fs is smaller than a frequency region Fn−1 which is lower by one band region than the currently selected frequency region Fp. Namely, when both the answers to the questions of the steps S45 and S46 are affirmative (YES), it means that the engine is decelerating, and therefore it is determined whether or not the sampling frequency Fs is smaller than the frequency region Fn−1 which is lower by one band region than the currently selected frequency Fp. If the answer to the question of the step S47 is affirmative (YES), the filter coefficient CΛ (Fn) corresponding to the currently selected frequency Fn is selected at a step S48, followed by terminating the program.

Further, if the answer to the question of the step S47 is negative (NO), the variable n is decreased by a decrement of 1 at a step S49, and then at the step S47 a comparison is made between the sampling frequency Fs and a frequency region Fn−1 which is still lower by one band than the preceding one. If the answer to the question of the step S47 is affirmative (YES), the filter coefficient CΛ (Fn) corresponding to the currently selected frequency region Fn is selected at the step S48, followed by terminating the program.

Further, if the answer to the question of the step S45 is negative (NO), the variable n is increased by an increment of 1 at a step S50 until the answer to the question of the step S45 becomes affirmative (YES). If the answer to the question of the step S45 is affirmative (YES), the program proceeds to the step S46, but in the present case, the answer to the question of this step is negative (NO), and then the program immediately proceeds to the step S48, where the filter coefficient CΛ (Fn) corresponding to the currently selected frequency region Fn is selected, followed by terminating the program.

In the above described embodiment, the filter coefficient of the C filter is finally determined by selecting the optimum coefficient matching the engine rotational speed NE from a plurality of filter coefficients stored in advance in the C filter 62. However, this is not limitative, but the filter coefficient CΛ of the C filter 62 corresponding to the transfer function of the vibration-transmitting path may be determined by dividing a signal of a high frequency which is a proper number of times, e.g. tens of times as high as a frequency corresponding to the upper limit rotational speed of the engine (e.g. 6000 rpm).

More specifically, a high-frequency filter Cr having a high order transfer characteristic determined by a high sampling frequency Fr (e.g. several KHz) is stored in advance in the C filter 62. The high frequency filter has a number (M) of taps, and during a sampling interval (1/Fr) of the high-frequency filter Cr occur a number (L) of driving pulses having a driving frequency (e.g. 10 MHz) on which the ECU 5 operates. The number L is counted by a counter.

On the other hand, in the case of a filter Cs to be determined by a predetermined sampling frequency Fs (e.g. several hundreds Hz), if a number (S) (S>L) of driving pulses of the ECU 5 occur during a sampling interval (1/Fs) of the filter Cs, the number K of taps of the filter is calculated by the use of the following equation (11) (The number S is known, since the filter coefficient of the filter Cs has been determined by the predetermined sampling frequency Fs):

$$K = [M \times (L/S)]_{int} \qquad (11)$$

where int represents an integer obtained by omitting fractions, and for instance, if $M \times (L/) = 4.63$, then $[M \times (L/S)]_{int} = 4$.

In the present variation, as shown in FIG. 30b and FIG. 30c, as the filter coefficients CsΛ (j) of the filter Cs, the most close filter coefficients CrΛ (m) closely located on the right hand of the filter coefficients Cs Λ are selected as indicated by the arrows in the figures, to determine the transfer function of the vibration/noise-transmitting path.

Figure 31:
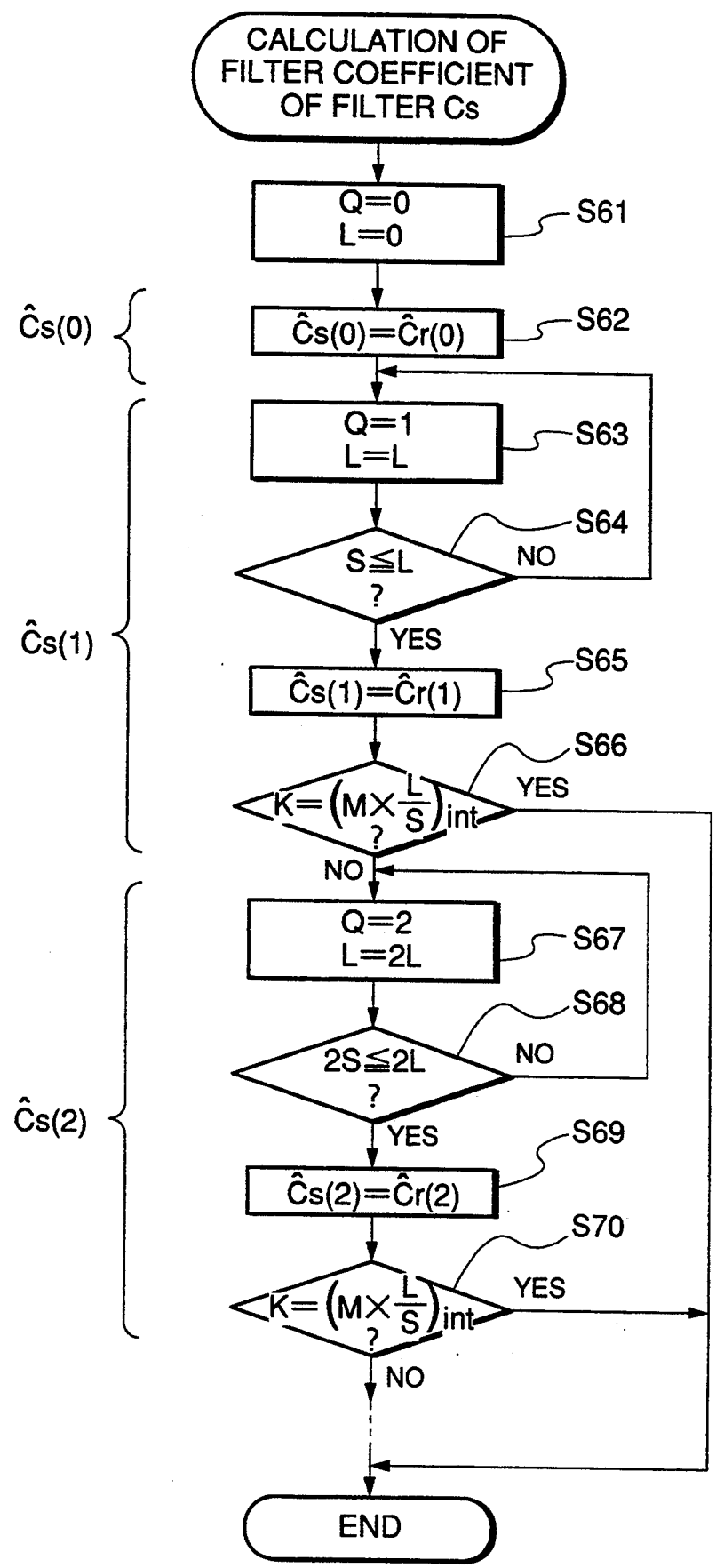
FIG. 31 is a flowchart showing a routine for determining the transfer characteristics of the C filter.

FIG. 31 shows a program for calculating a filter coefficient CsΛ (j) of the filter Cs.

First, at a step S61, a number Q of the driving pulses occurring during a sampling interval of the filter Cs and the number L of the driving pulses occurring during a sampling interval of the high-frequency filter Cr are both set to "0". Then, at a step S62, the first filter coefficient CsΛ (0) of the filter Cs is determined by making it equal to the first filter coefficient CrΛ (0) of the high-frequency filter Cr.

Then, at a step S63, the number Q of the driving pulses occurring for the filter Cs is increased by an increment of 1, and the number L of the driving pulses for the high frequency filter Cr is set to L. Then, it is determined at a step S64 whether the number S of the driving pulses occurring during a sampling interval (1/Fs) of the filter Cs is smaller than the number L of the driving pulses occurring during a sampling interval (1/Fr) of the high-frequency filter Cr. If the answer is negative (NO), the program returns to the step S63, whereas if the answer is affirmative (YES), the filter coefficient CsΛ (1) is set equal to the filter coefficient CrΛ (1) at a step S65, and then it is determined at a step S66 whether or not the aforementioned equation (11) is satisfied. If the answer to this question is affirmative (YES), the program is immediately terminated, while if the answer is negative (NO), the program proceeds to a step S67, where the tap position of the filter Cs is increased by an increment of 1, while the number L of the driving clock pulses occurring for the high-frequency filter Cr is set to 2L. Then, it is determined at a step S68 whether or not the number 2S of the driving pulses occurring during a sampling interval (½Fs) is smaller than the number 2L.

Then, if the answer to this question is negative (NO), the program returns to the step S67, whereas if the answer is affirmative (YES), it is set at a step S69 such that CsΛ (2)=CrΛ (2) to thereby determine the second filter coefficient CsΛ (2). Then, it is again determined whether or not the equation (11) holds. If the answer to this question is affirmative (YES), the program is immediately terminated, whereas if the answer is negative (NO), the program proceeds to a next step, not shown. Thereafter, calculations are made of CsΛ (3), CsΛ (4), . . . until the above equation (11) is satisfied. When the equation (11) becomes satisfied, all the filter coefficients CsΛ (m) have been determined, and when the equation (11) is not found to hold, the present program is terminated.

In this manner, by thinning out the filter Cr determined by the high-frequency sampling frequency Fr, the optimum filter coefficient of the C filter can be determined.

This makes it possible to correct the transfer characteristic of a control signal even if the sampling frequency is varied, achieving high-accuracy adaptive control, and avoiding problems caused by varied sampling frequencies when attempting to achieve a desired reduction in vibrations and noises.

Thus, according to the fifth embodiment, even if the frequency of the basic pulse signal A is varied, the sampling frequency is varied correspondingly, and a signal formed from the same number of taps is always generated. Therefore, the follow-up speed of the adaptive control is high and hence it is possible to perform high-accuracy adaptive control.

Further, in the fifth embodiment described above, the sampling frequency Fs is detected from the pulse signal indicative of the rotation of the crankshaft 36 formed by counting the number of starter gear teeth formed on the peripheral surface of the flywheel 38 during rotation. However, the means for determining the sampling frequency suitable for operating conditions of the engine is not limited to this, but signals generated by the camshaft sensor 11 or the CRK senor and representing the rotational speed thereof may be used, instead. However, in the case where the ECU 5 forms the basic pulse signal from output from the camshaft sensor 11, there may occur a variation, slight as it is, in the rotation of the camshaft due to elongation of the timing belt 35 connecting between the pulley 35 for the camshaft and the pulley 37 for the crankshaft (see FIG. 7), etc. Further, in the case of forming the basic pulse signal from output from the CRK sensor, there may also occur a variation in the rotation thereof due to torsional vibrations of the crankshaft 36. In contrast to these cases, the flywheel 38 has a large inertia moment and is almost free of fluctuation in rotation, which makes it possible to determine a desired sampling frequency in a much more simple and accurate manner. Moreover, a basic pulse signal formed by output from the camshaft sensor 11 or the CRK sensor has a longer pulse interval than that formed from the rotation of the flywheel, and therefore, in order to properly follow up changing operating conditions of the engine, the basic pulse signal has to be multiplied by a multiplying circuit. As the multiplying ratio of the multiplying circuit is larger, there may result a larger error in determining a desired sampling frequency due to fluctuation in the rotation.

Further, as the method of detecting the basic pulse signal A from output from the camshaft sensor 11 or the CRK sensor, and multiplying the signal A into a signal having a sampling frequency Fs, the following methods are known:

(1) Method of multiplying the basic pulse signal by a factor of K, by the use of a known logical multiplying circuit;

(2) Method of multiplying the basic pulse signal by a factor of K, by counting a number PECU of clock pulses generated by the ECU 5 (e.g. at 10 MHz) during a time interval between adjacent pulses of the basic pulse signal, and alternately outputting "0" level and "1" level at a repetition period of PECU/4K;

(3) Analog method of dividing the basic pulse signal into a frequency half as high as the former, integrating the divided signal, forming into a sinusoidal wave signal, multiplying the frequency of the sinusoidal wave signal by a factor of K, and then forming it into a square wave signal.

Further, in the fifth embodiment, similarly to fixed sampling method described above particularly in the first embodiment, a component having a particular frequency order related to combustion in the cylinders is separated from other components having different frequency orders to thereby separately perform adaptive control to the component. Further, the method of forming the pseudo-period train (C~) shown in FIG. 13 to FIG. 16 may be also employed.

Figure 32:
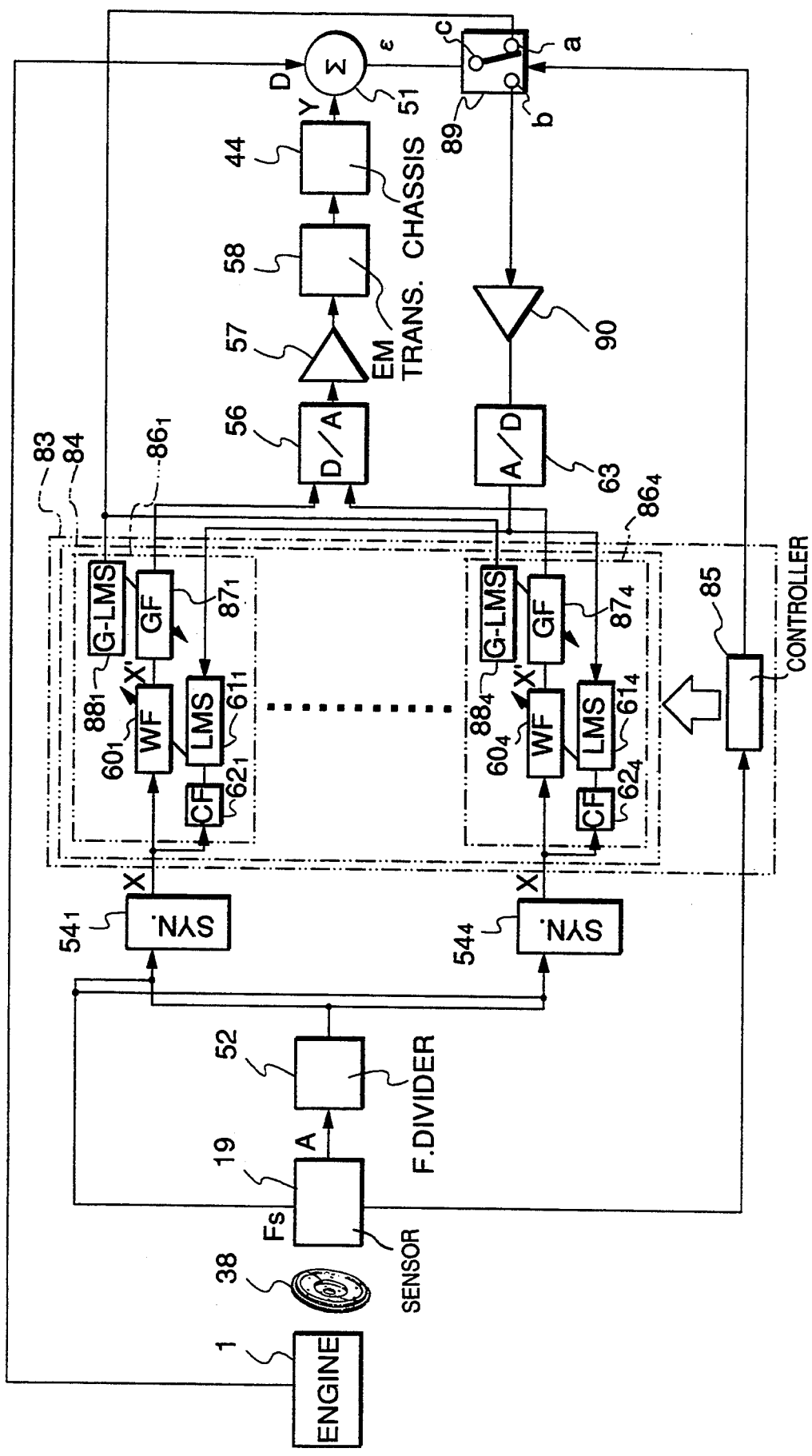
FIG. 32 is a block diagram showing a vibration/noise control circuit according to a sixth embodiment of the invention.

FIG. 32 schematically shows a vibration/noise control circuit 18 and its related component parts of the vibration/noise control system, according to a sixth embodiment of the invention. In this embodiment, similarly to the fifth embodiment, the variable sampling method is employed, and at same time it is constructed such that even if the timing pulse signal X is changed suddenly within a very short time period, the vibration/noise control system can perform adaptive control in a well follow-up manner.

More specifically, the DSP 83 is comprised of an adaptive control processor 84, and a controller 85 responsive to a signal supplied from the rotation-detecting sensor 19 for controlling the adaptive control processor 84 depending on operating conditions of the engine. Further, the adaptive control processor 84 has four adaptive control circuits $86_1$ to $86_4$ enabling adaptive control to be separately performed on components of vibrations and noises having different frequency orders described hereinabove. The adaptive control circuits $86_1$ to $86_4$ have the W filters $60_1$ to $60_4$, described hereinabove, LMS processors $61_1$ to $61_4$, C filters $62_1$ to $62_4$, and additionally gain filters $87_1$ to $87_4$ (hereinafter referred to as "the G filter") as an ADF having one tap, for correcting rates of change in the control signals X' outputted from the W filters $60_1$ to $60_4$, and G-LMS processors $88_1$ to $88_4$ for renewing the filter coefficients of the G filters $87_1$ to $87_4$.

In the vibration/noise control system constructed as above, the timing pulse signals X formed by the frequency divider 52 are sampled by a sampling frequency Fs determined according to the rotational speed of the engine by the use of the signal indicative of rotation of the flywheel 38, and supplied to the respective adaptive control circuits $86_1$ to $86_4$. Then, control signals X" (digital signals) generated by the adaptive control circuits $86_1$ to $86_4$ are each converted into an analog signal by the D/A converter 56, and the resulting analog signal is amplified by the amplifier 57, and then supplied to the electromechanical transducer means 58. The resulting controlled vibrations and noises are detected and supplied as a driving signal Y to the error sensor 51.

On the other hand, the error sensor 51 is supplied with a vibration/noise signal D from the engine 1, and the error sensor 51 generates an error signal ε indicative of the difference between the vibration/noise signal D and the driving signal Y, which in turn is supplied to a changeover switch 89.

When the changeover switch 89 makes connection between a common contact c thereof and a contact a thereof in response to an instruction signal from the controller 85, the error signal ε is supplied to the G-LMS processors $88_1$ to $88_4$ in feedback manner, whereas when the changeover switch 89 makes connection between the common contact c and a contact b in response to the instruction signal from the controller 85, the error signal ε is supplied via a compensating circuit 90 and an A/D converter 63 to the LMS processors $61_1$ to $61_4$ in feedback manner.

Figure 33:
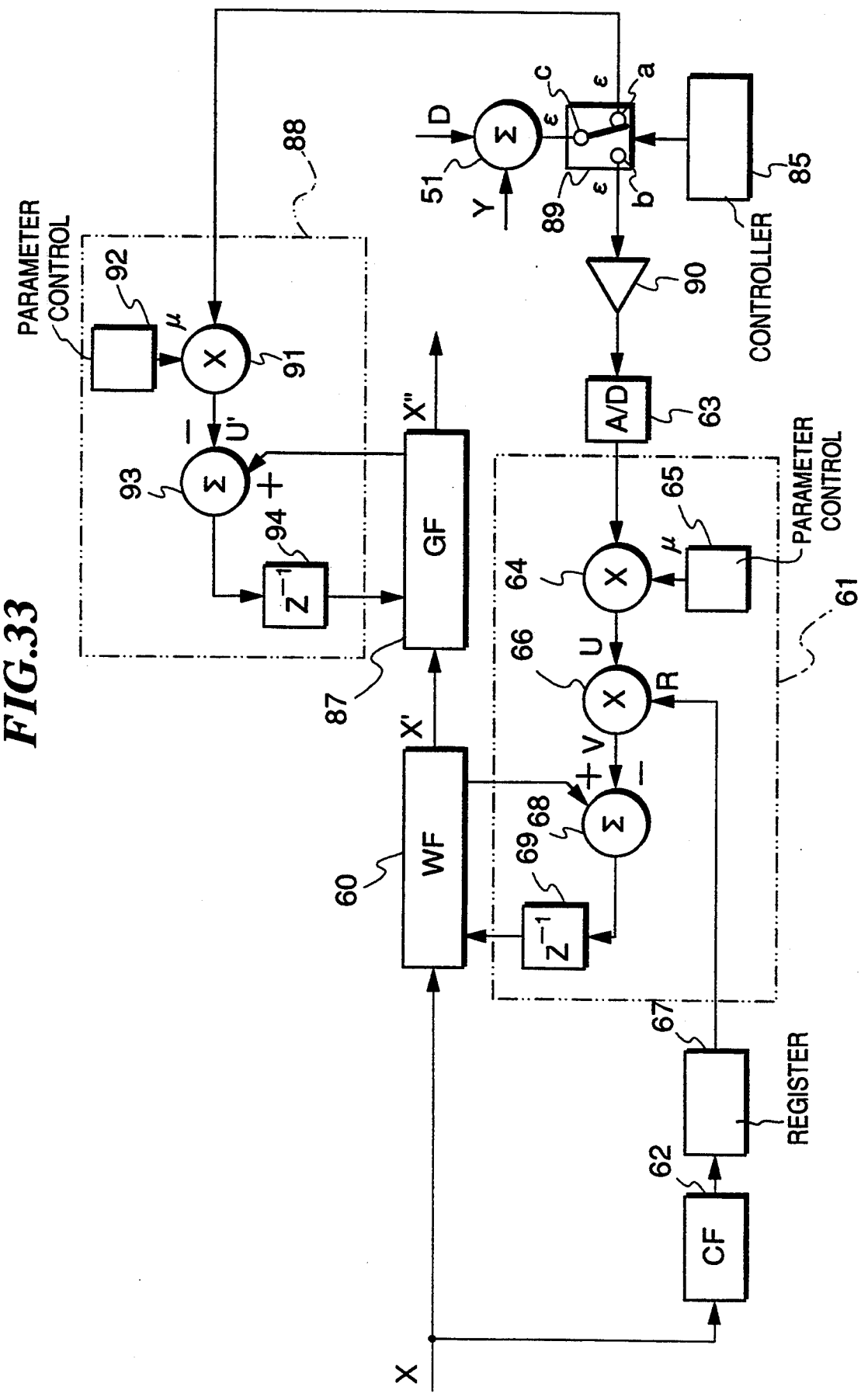
FIG. 33 is a block diagram showing details of an adaptive control circuit appearing in FIG. 32.

FIG. 33 shows the internal arrangement of one of the adaptive control circuits 86.

The timing pulse signals X, obtained by dividing output from the rotation-detecting circuit 52 into signals having predetermined frequency orders and supplied from the ECU 5, are supplied to the W filter 60 and the C filter 62 at a sampling frequency Fs (at a sampling interval τ (=1/Fs) determined depending on operating conditions of the engine. The W filter 60 generates a control signal X' having a predetermined transfer characteristic corresponding to the time interval of adjacent pulses of the timing pulse signal X.

Then, the control signal X' is supplied to the G filter 87, from which a control signal X" is outputted, and the control signal X" is transmitted through the vibration/-noise-transmitting path, detected and supplied as the driving signal Y to the error sensor 51.

The error sensor 51 generates an error signal ε indicative of the difference between the driving signal Y and the vibration/noise signal D, which is supplied to the changeover switch 89. Then, when a connection is made between the contact c and the contact a in the changeover switch 89 in response to the instruction signal from the controller 85, the error signal ε is supplied to the G-LMS processor 88 in feedback manner to renew the filter coefficient of the G filter 87. That is, in this case, renewal of the filter coefficient of the W filter by the LMS processor 61 is interrupted, and the G filter 87 is supplied with a signal having a fixed vibration/-noise transfer characteristic. The G filter 87 performs gain correction on this signal. On the other hand, when a connection is made between the common contact c and the contact b, the error signal is supplied via the compensating circuit 90 and A/D converter 63 to the LMS processor 61 in feedback manner, whereby renewal of the filter coefficient of them W filter 60 is carried out based on the error signal from the error sensor 51, the reference signal R from the C filter 62 and the current filter coefficient of the W filter 60.

More specifically, when a connection is made between the common contact c and the contact a in the changeover switch 89, the error signal ε is supplied to a third multiplier 91. On the other hand, the third multiplier 91 is supplied from parameter control means 92 with a step size parameter $\mu'$ for controlling the magnitude of a renewed correction amount of the filter coefficient of the G filter 87.

Then, the third multiplier 91 performs convolution of the error signal s and the step size parameter $\mu'$ to form an output signal U', which is converted into a negative value and then supplied to a second adder 93. The second adder 93 adds together the output signal U' and the output signal from the G filter 87, and the resulting signal is supplied to a delay circuit 94, and then to the G filter 87 in feedback manner to renew the filter coefficient of the G filter 87. When the G filter 87 is in this filter coefficient-renewing mode, the renewal of the filter coefficient of the W filter 60 is not carried out, as described above, but the signal having the fixed vibration/noise transfer characteristic is supplied to the G filter 87.

On the other hand, if a connection is made between the common contact c and the contact b, the filter coefficient of the G filter 87 is set to a fixed value (e.g. 1.0) and at the same time renewal of the filter coefficient of the G filter 87 is interrupted. Then, the error signal ε is supplied to the compensating circuit 90 to compensate for changes in amplitude and gain of the control signal X' due to the G filter, and then to the A/D converter 63, where the analog error signal is converted into a digital signal. The digital error signal ε is supplied to the first multiplier 64, which is, on the other hand, supplied with the step size parameter $\mu$ from the parameter control means 65.

The first multiplier 63 multiplies the error signal ε by the step-size parameter $\mu$ to form the output signal U, and the resulting product is supplied to the second multiplier 66. The second multiplier 66 is also supplied with the reference signal R via the register 67 from the C filter 62.

The second multiplier 66 multiplies the reference signal R by the output signal U and the resulting product is converted into a negative value to form the output signal V, which is then supplied to the first adder 68.

Output from the first adder 68 is supplied to the delay circuit 69, and then to the W filter 60 in feedback manner to renew the filter coefficient of the W filter 60.

In this manner, the correction in gain by the G filter 87 is carried out only on a particular occasion, e.g. when a marked change has occurred in the period of vibrations and noises to be controlled, due to a drastic change in the engine rotational speed NE, even while the control signal X' is being outputted in response to inputting of the latest timing pulse signal X, to thereby avoid the problem of a delay in follow-up or response to changes in the system to which the vibration/control system is applied.

Figure 34:
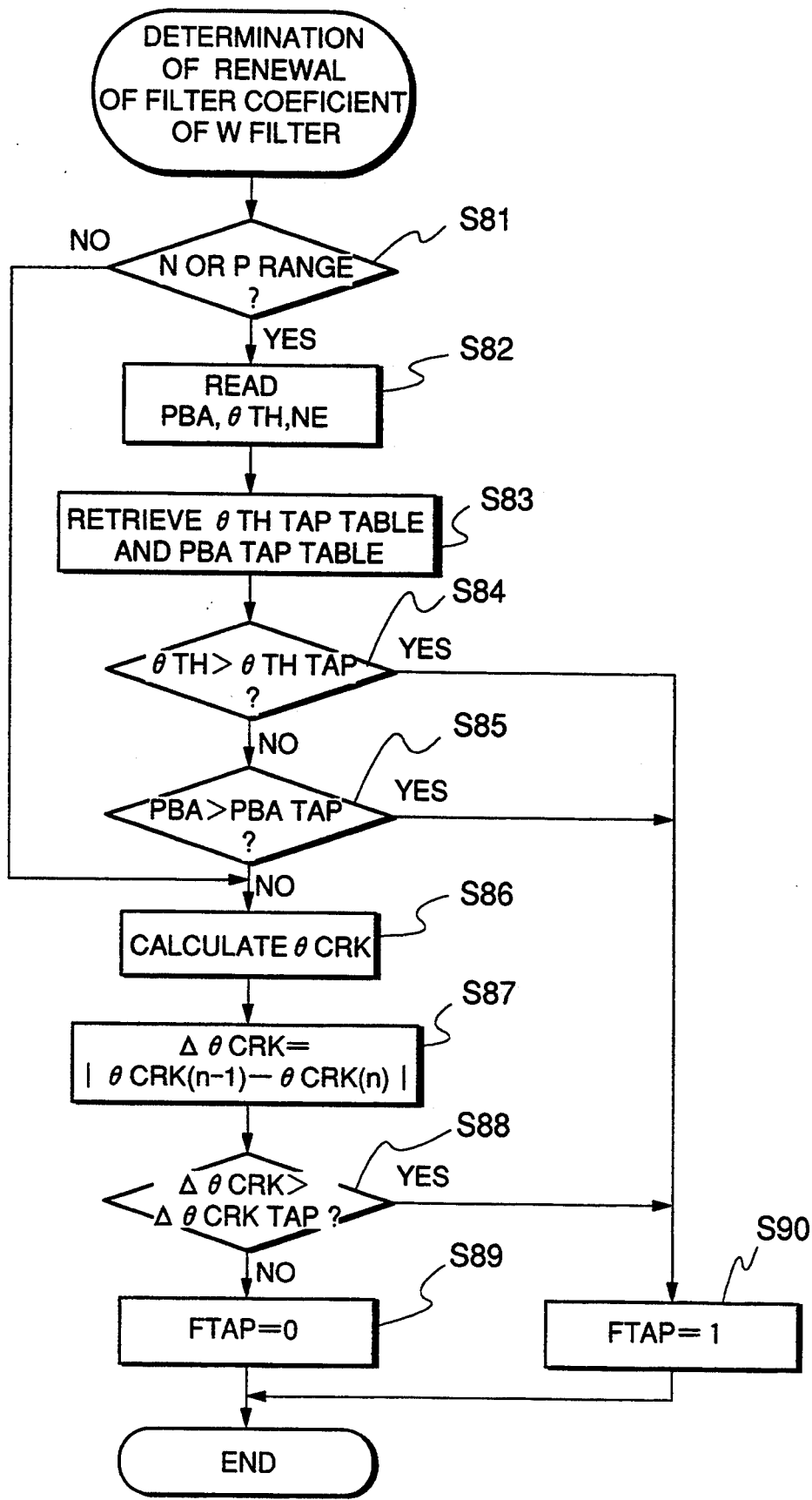
FIG. 34 is a flowchart showing a routine for determining a renewing mode.

FIG. 34 shows a program for determining whether the filter coefficient of the W filter 60 is to be renewed or the filter coefficient of the G filter 87 is to be renewed, which is executed in synchronism with generation of the basic pulse signal A by the controller 85.

First, at a step S81, the gear shift position of the automotive vehicle is read in and it is determined whether the read gear shift position is in a neutral range or in a parking range. If the answer to this question is negative (NO), the program proceeds to a step S86, whereas if the answer to this question is affirmative (YES), the intake pipe absolute pressure PBA detected by the PBA sensor 8, the throttle valve opening detected by the $\theta$TH sensor 4, and the engine rotational speed NE detected by the TDC sensor 9 are read at a step S82. Then, a PBATAP table and a $\theta$THTAP table are retrieved at a step S83 to obtain a lower limit value PBATAP of the intake pipe absolute pressure PBA and a lower limit value $\theta$THTAP of the throttle valve opening $\theta$TH for determining whether the vibration/noise control circuit is to be set to the G 87 filter coefficient-renewing mode in which the filter coefficient of the G filter 87 is renewed.

Figure 35:
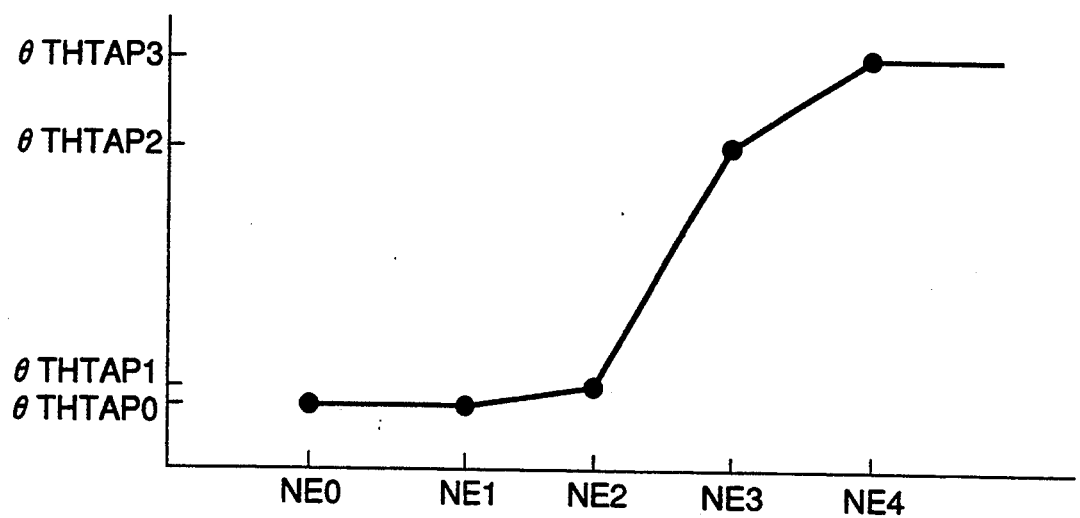
FIG. 35 shows a θTHTAP table.

The $\theta$THTAP table is set, as shown in FIG. 35, such that predetermined values $\theta$THTAP0 to $\theta$THTAP3 of $\theta$THTAP are provided correspondingly to predetermined values NE0 to NE4 of the engine rotational speed NE, and a value of the lower limit throttle valve opening $\theta$THTAP is determined by reading from the $\theta$THTAP table, and by interpolation, if required.

Figure 36:
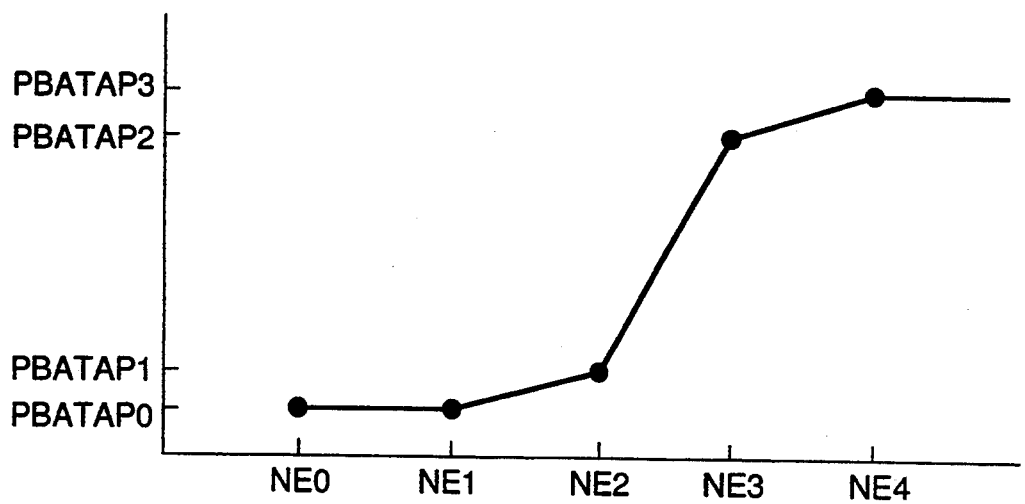
FIG. 36 shows a PBATAP table.

The PBATAP table is set, as shown in FIG. 36, such that predetermined values PBATAP0 to PBATAP3 of PBATAP are provided correspondingly to predetermined values NE0 to NE4 of the engine rotational speed NE, and a value of the lower limit throttle valve opening PBATAP is determined by reading from the PBATAP table, and by interpolation, if required.

Then, at a step S84, it is determined whether or not the throttle valve opening $\theta$TH is larger than the $\theta$THTAP value obtained at the step S83.

If the answer to this question is affirmative (YES), it is judged that the accelerator pedal is stepped on by a large amount to largely increase the throttle valve opening $\theta$TH and accordingly the operating condition of the engine has suddenly changed, so that a flag FTAP indicative of a selected operative mode of the vibration/noise control system is set to "1" at a step S90, thus setting the vibration/noise control circuit to the G87 filter coefficient-renewing mode, followed by terminating the program.

On the other hand, if the answer to the question of the step S84 is affirmative (YES), it is determined at a step S85 whether or not the intake pipe absolute pressure PBA is larger than the lower limit value PBATAP. If the answer to this question is affirmative (YES), it is determined that the operating condition of the engine has drastically changed, and hence similarly to the above, the mode indicative flag FTAP is set to "1" at the step S90, followed by terminating the program.

Further, if the answer to the question of the step S81 is negative (NO) or if both the answers to the questions of the steps S84 and S85 are negative (NO), a time interval $\theta$CRK (sampling interval $\tau$) between adjacent sampling pulses having the sampling frequency Fs is calculated at a step S86, and then at at a step S87 the absolute value $\Delta\theta$CRK of the difference between the immediately preceding value $\theta$CRK(n−1) and the present value $\theta$CRK(n) of the time interval $\theta$CRK. At the following step S88, it is determined whether or not the absolute value $\Delta\theta$CRK is larger than a predetermined limit value $\Delta\theta$CRKTAP. If the answer to this question is affirmative (YES), the mode indicative flag FTAP is set to "1" at the step S90, while if the answer is negative (NO), the mode indicative flag FTAP is set to "0" at a step S98, followed by terminating the program.

Thus, according to the sixth embodiment described above, it is possible to reduce the vibrations and noises to a satisfactory degree by correcting the control signal X' by means of the G filter 87, even when it is impossible for ordinary adaptive control to follow up a change in the system due to a sudden change in the vibration/noise transfer characteristic caused e.g. by a sudden change in the operating condition of the engine, merely by varying the sampling frequency.

Further, the G filter 87 is formed by an ADF, and the number of taps thereof is set to "1", it is possible to quickly carry out correction of the vibration/noise transfer characteristic even when the engine is in a transient operating condition.

Figure 37:
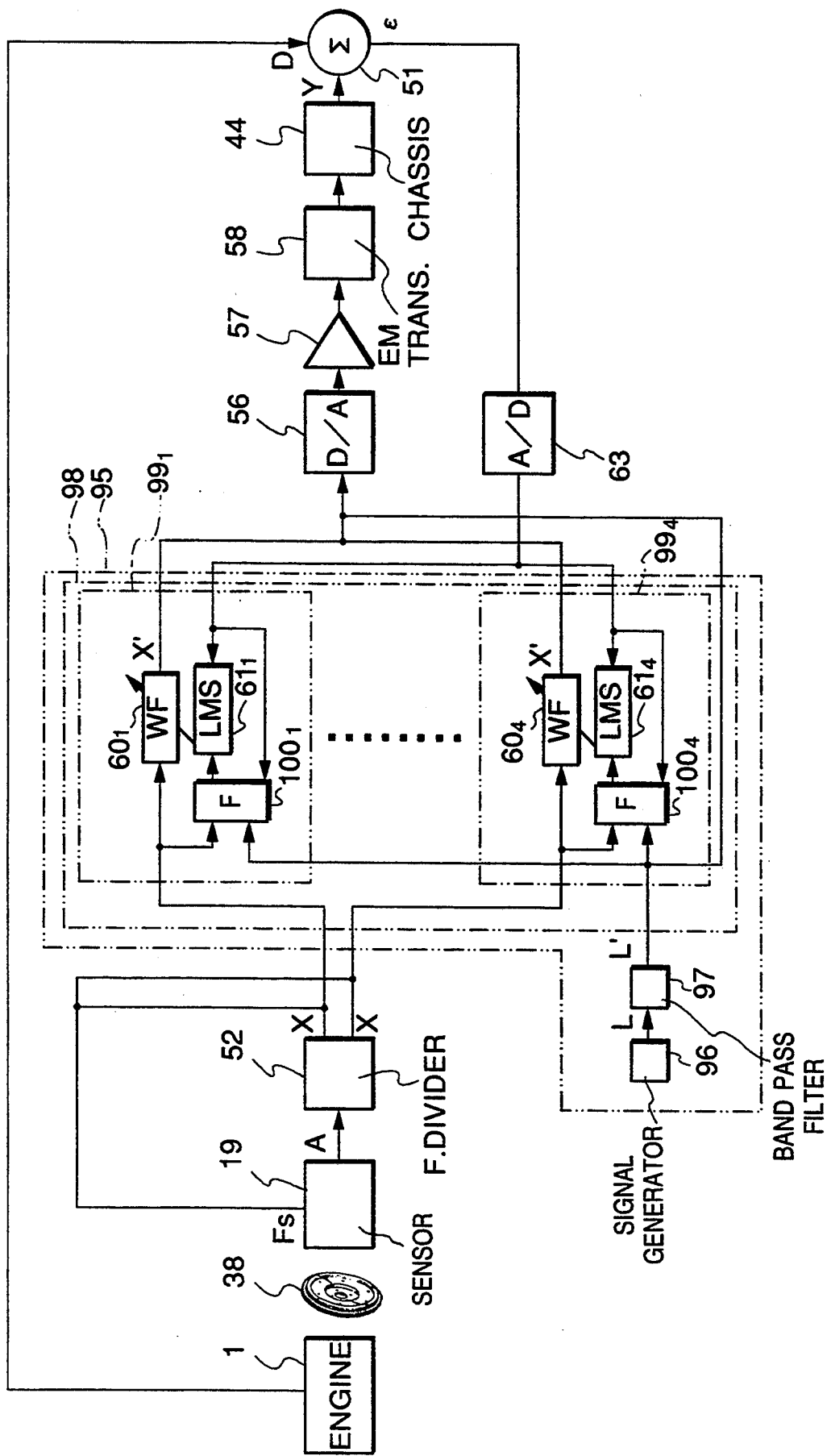
FIG. 37 is a block diagram showing a vibration/noise control circuit according to a seventh embodiment of the invention.

FIG. 37 schematically shows a vibration/noise control circuit 18 and its related component parts of the vibration/noise control system, according to a seventh embodiment of the invention. As shown in the figure, a DSP 95 is used, which is comprised of random signal-generating means 96 for generating a random signal L which is low in amplitude (e.g. lower than 20 dB in terms of noise level), a band-pass filter 97 for removing a predetermined frequency band component from the random signal L from the random signal-generating means 96 to output a random reference signal L', and an adaptive control processor 98 which is supplied with the timing pulse signal X and the random reference signal L' to perform predetermined adaptive control.

More specifically, the rotation-detecting sensor 19 counts the number of starter gear teeth on the flywheel 38 having passed it to generate the basic pulse signal A, which is then supplied to the frequency divider 52.

On the other hand, a pulse signal having a sampling frequency Fs variable with rotation of the flywheel, i.e. the engine rotational speed NE is directly formed from the basic pulse signal A, and then supplied to the DSP 95 to govern sequential operations executed within the DSP 95. Further, a control signal X' is generated by the DSP 95 and supplied via the D/A converter 56 and the amplifier 57 to the electromechanical transducer means 58, and the resulting controlled vibrations and noises are transmitted through the chassis 44 of the vehicle, etc. and detected and supplied as a driving signal Y to the error sensor 51. On the other hand, a vibration/noise signal D from the engine 1 is supplied to the error sensor 51. The error sensor 51 generates an error signal $\epsilon$, which is supplied via the A/D converter 63 to the DSP 95 in a feedback manner. The DSP performs the predetermined adaptive control to reduce vibrations and noises occurring in the vehicle.

The adaptive control processor 98 is comprised of four adaptive control circuits $99_1$ to $99_4$ to perform adaptive control on respective components of the vibrations and noises having different frequency orders in a separate manner, similarly to the previous embodiments. The adaptive control circuits $99_1$ to $99_4$ are comprised of W filters $60_1$ to $60_4$ for generating control signals X' and LMS processors $61_1$ to $61_4$. Further, instead of the C filters used in the previous embodiments, the adaptive control circuits $99_1$, to $99_4$ also include correction filters $100_1$ to $100_4$ as means for correcting changes in phase of the control signals X' from the W filters $60_1$ to $60_4$ due to the presence of electromechanical transducer means 58, etc. arranged in the vibration/noise-transmitting paths.

Figure 38:
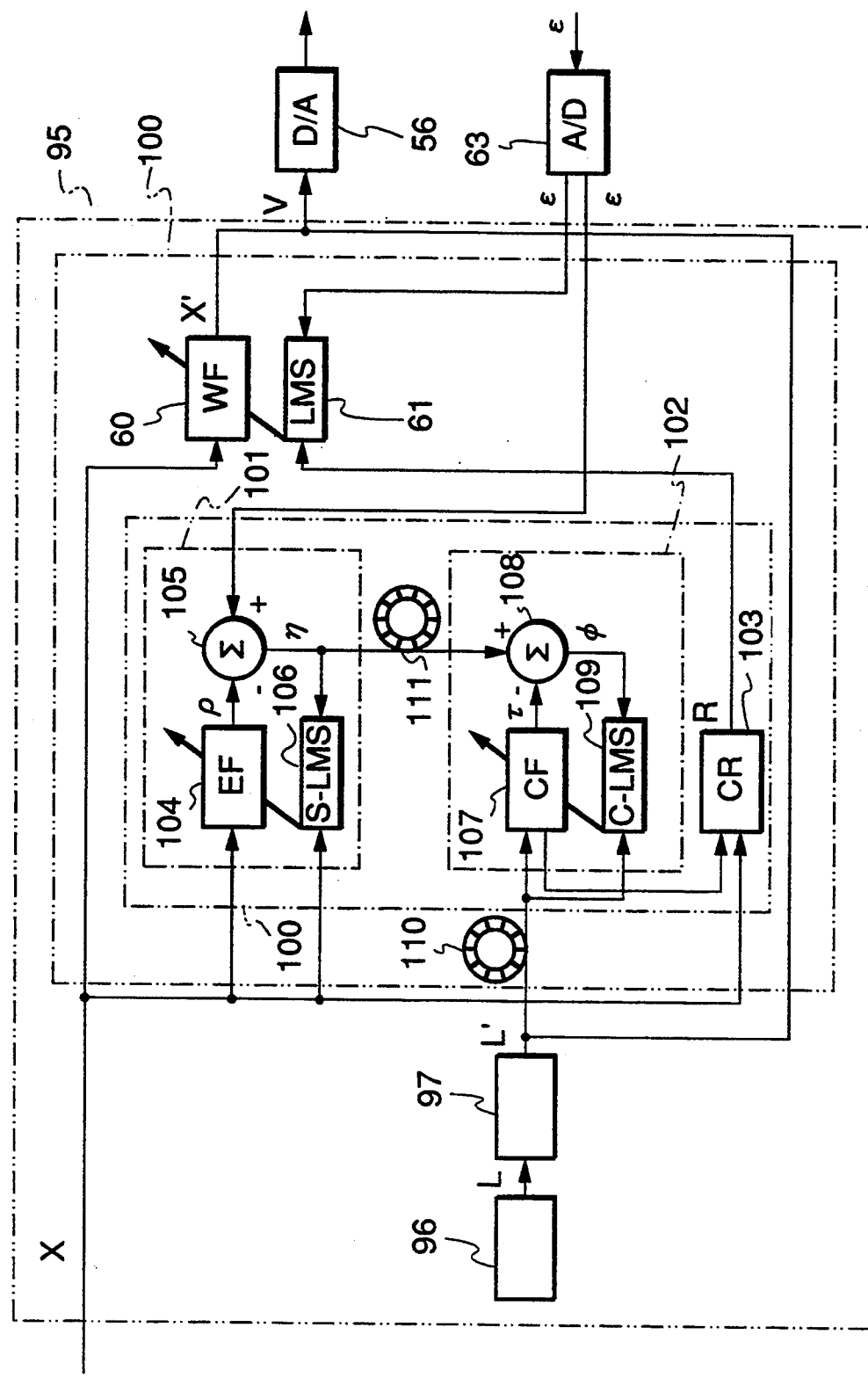
FIG. 38 is a block diagram showing details of an adaptive control circuit appearing in FIG. 37.

As shown in FIG. 38, the correction filter 100 is formed, e.g. of periodic component-eliminating means 101 which generates a first residual component signal $\eta$ free of periodic components based on the timing pulse signal X and the error signal $\epsilon$ from the A/D converter 63, transfer characteristic-determining means 102 for determining a transfer characteristic corresponding to a transfer function of the vibration/noise-transmitting path, i.e. the path through which the control signal is transmitted while being transformed into mechanical vibrations, and a register 103 for storing the transfer characteristic determined by the transfer characteristic-determining means 102.

The periodic component-eliminating means 101 is formed, e.g. of an echo-canceling filter (EF) 104 (hereinafter referred to as "the E filter") formed by an ADF, which is supplied with the timing pulse signal X to generate a canceling signal $\rho$ which is inverse in phase relative to the waveform of a component of the vibrations and noises determined by the time interval between adjacent pulses of the timing pulse signal X, an adder 105 which is supplied with the canceling signal $\rho$ and the error signal $\epsilon$ from the A/D converter 63 for generating the first residual component signal $\eta$, and an S-LMS (Synchronized-LMS) processor 106 for performing computation for renewing the filter coefficient of the E filter 104. The filter coefficient of the E filter 104 is renewed based on the timing pulses signal X, the first residual component signal $\eta$, and the current filter coefficient of the E filter 104, to thereby determine the cancelling signal $\rho$.

Further, the transfer characteristic-determining means 102 is formed of a transfer characteristic-determining filter (C filter) 107 which is supplied with the random reference signal L' from the band-pass filter 97, an adder 108 which is supplied with an output signal $\tau$ (converted into a negative value) from the C filter 107 and the first residual component signal $\eta$ for generating a second residual component signal $\phi$, and a C-LMS processor 109 for performing computation for renewing the filter coefficient of the C filter 107. The filter coefficient of the C filter 107 is renewed based on the random reference signal L', the second residual component signal $\phi$ and the current filter coefficient of the C filter 107 to thereby set the filter coefficient of the C filter 107 to one which is identical to the transfer characteristic corresponding to the transfer function of the vibration/-noise-transmitting path.

Further, a first ring buffer 110 and a second ring buffer 111, each formed of an annular train of a plurality of storages formed according to the number of taps (tap length) of the W filter 60, are interposed between the band-pass filter 97 and the C filter 107, and between the adder 105 and the adder 108, respectively. The first and second ring buffers 110 and 111 are provided for making the number of taps (tap length) of the filter coefficient of the C filter 107 corresponding to the number of taps (tap length) of the W filter 60, to thereby form a pseudo-period train.

Figure 39A:
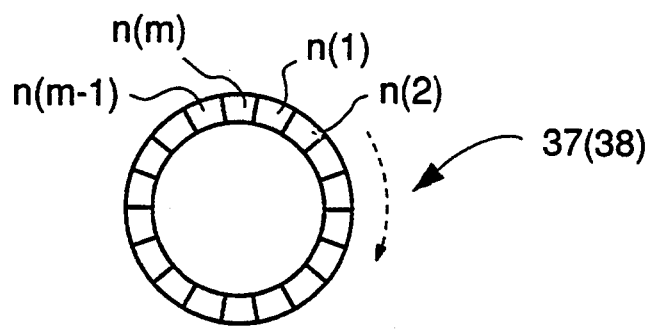
Figure 39B:
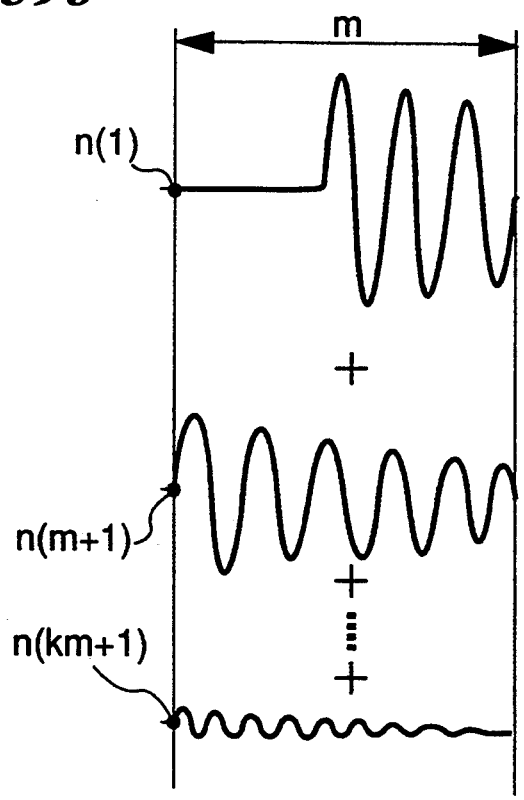
Figure 39C:
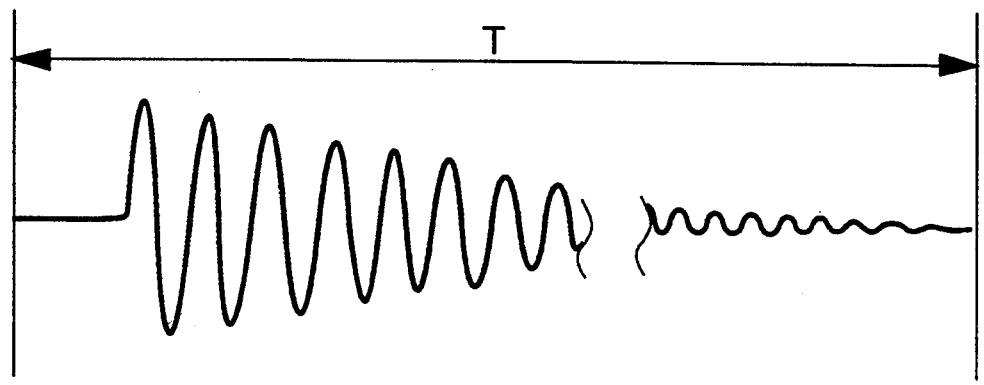

More specifically, as shown in FIG. 39a, the ring buffers 110 and 111 are each formed of a predetermined number m of storages n(1), n(2), ..., n(m) corresponding in number to the number of taps (tap length) of the W filter 60. The ring buffers 110 and 111 are supplied with the random reference signal L' and the first residual component signal $\eta$, which are illustrated by way of example in FIG. 39c, and the input signals L', $\eta$ are sequentially stored into the storages n(1), n(2), n(3), ... n(m) in the order mentioned, at predetermined sampling intervals. A (m+1)th input data of the signal L', $\eta$ and subsequent input data are again sequentially stored into the storages n(1), n(2), ... n(m) in the order mentioned to be added to the respective previously stored values, and this process is repeated. In this way, a pseudo-period train of the signal L', $\eta$ is formed, which has the number m of taps corresponding to the number of taps (tap length) of the W filter.

According to the vibration/noise control system for automotive vehicles thus constructed, the basic pulse signal A detected by the rotation-detecting sensor 19 is supplied to the frequency divider 52 at the sampling interval Fs, where the signal A is divided into the timing pulse signal X having a frequency order corresponding to a particular component of the vibrations and noises to be controlled. The timing pulse signal X is supplied to the W filter 60 and the E filter 104, the S-LMS processor 106, and further the register 103, and based upon the input signal X, the W filter 60 generates the control signal X'.

On the other hand, the random signal L generated by the random signal-generating means 96, which is low in amplitude, is supplied to the band-pass filter 97, which eliminates frequency components of the input signal falling outside a predetermined frequency range into the random reference signal L'. The random reference signal L' is supplied via the second ring buffer 111 to the C filter 107 and the C-LMS processor 109, and at the same time the random reference signal L is superposed on the control signal X' from the W filter 60 to form an output signal V, which in turn is supplied via the D/A converter 56 and the amplifier 57 to the electromechanical transducer means 58. The resulting controlled vibrations and noises are transmitted through the chassis 44, etc. of the vehicle and detected and supplied as the driving signal Y to the error sensor 51.

The error sensor 51 is, on the other hand, supplied with the vibration/noise signal D directly transmitted from the engine 1, and generates the error signal $\epsilon$ indicative of the difference between the driving signal Y and the vibration/noise signal D, which is supplied via the A/D converter 63 to the LMS processor 61 and the adder 105 of the correcting filter 100.

Further, the adder 105 is supplied with the canceling signal $\rho$ from the E filter 104, and the adder 105 generates the first residual component signal $\eta$, which is supplied via the second ring buffer 111 to the adder 108. On the other hand, the adder 108 is supplied with the output signal $\tau$ from the C filter 107. As a result, the adder 108 generates the second residual component signal $\phi$. The filter coefficient of the C filter 107 is renewed based on the second residual component signal $\phi$, the random reference signal L' and the current filter coefficient of the C filter 107, to thereby determine the transfer characteristic corresponding to the transfer function of the vibration/noise-transmitting path, and the determined transfer characteristic is stored into the register 103.

The register 103 supplies the reference signal R indicative of the transfer characteristic corresponding to the transfer function of the vibration/noise-transmitting path to the LMS processor 61, where the filter coefficient of the W filter 60 is renewed based on the reference signal R, the timing pulse signal X, the error signal $\epsilon$ and the current filter coefficient of the W filter 60, and the control signal X' is formed by the renewed correction coefficient of the W filter 60 to thereby control vibrations and noises from the engine 1.

According to the present embodiment, the transfer characteristic, i.e. the transfer function of the vibration/noise-transmitting path is determined based on the timing pulse signal X', the random reference signal L', and the error signal $\epsilon$, while at the same time the vibration/noise control is carried out. Therefore, it is unnecessary to accurately determine in advance the transfer characteristic or transfer function, or to provide the synchronizing circuits $54_1$ to $54_4$ shown in FIG. 9, etc. of the first embodiment. Further, complicated computation required in the previous embodiments to cope with variations in the sampling frequency, etc. is not required, and the vibration/noise control system can easily and quickly adapt itself to aging changes in characteristics of a system to which the present system is applied, such as a change in the ambient temperature. Further, since the transfer characteristic of the vibration/noise-transmitting path is determined while the vibration/noise control is carried out, as described above, it is possible to adapt the system to the specification and optional equipment of the vehicle, and further to the driving manner by the driver. Still further, the periodic component-eliminating means 101 eliminates periodic signal components (or pseudo-periodic signal components), which are large in amplitude, depending on operating conditions of the engine, so that the first residual component signal $\eta$ having an excellent S/N ratio is supplied to the transfer characteristic-determining means 102 to thereby form the reference signal R which is very accurately determined.

Further, according to the seventh embodiment described above, the first and second ring buffers 110 and 111 form pseudo-period trains of the random reference signal L' and the first residual component signal $\eta$ corresponding to the number of taps of the W filter 60, which makes it possible to omit complicated computing steps and hence reduce the computing load on the system, as well as to enhance the follow-up capability of the adaptive control.

Further, although in the seventh embodiment as well, the signal indicative of rotation of the flywheel is detected by the rotation-detecting sensor formed e.g. by a magnetic sensor, this is not limitative, but a rotary encoder may be provided in the vicinity of the camshaft or the crankshaft, instead of the rotation-detecting sensor, for detecting a signal indicative of rotation of the camshaft or crankshaft, which may then be subjected to frequency division to form the a pulse signal having the sampling frequency Fs, and the timing pulse signal X'.

In addition, it goes without saying that the present invention is by no means limited to the above embodiments, but variations are possible insofar as it does not go beyond the scope of the invention. For example, the invention can be applied to a four-cylinder type engine, an eight cylinder-type engine, etc. Further, the number of kinds of timing pulse signals X is not limited to 4, but it may be increased to 6, to thereby perform more accurate and fine vibration/noise control.

What is claimed is:

1. In a vibration/noise control system for a vehicle having a chassis, a compartment, and a power plant for driving said vehicle, periodic or semi-periodic vibrations and noises being generated from a vibration/noise source including at least said power plant, arranged at at least one predetermined location on said chassis or in said compartment, the system including:
   first filter means for generating a control signal for changing a transfer characteristic of at least one vibration/noise-transmitting path formed between said at least one source and said at least one predetermined location by filtering a predetermined input signal supplied thereto, said first filter means having a filter coefficient on which it operates;
   driving signal-forming means for converting said control signal into a driving signal;
   electromechanical transducer means responsive to said driving signal for controlling said vibrations and noises;
   error signal-forming means for forming an error signal indicative of residual vibrations and noises remaining after said vibrations and noises have been reduced by an output from said at least one electromechanical transducer means through addition of vectors;
   second filter means for representing a transfer characteristic of a vibration/noise-transmitting path formed between said driving signal-forming means and said error signal-forming means, and generating a reference signal; and
   control signal-renewing means for renewing said filter coefficient of said first filter means such that said error signal assumes the minimum value, based on said error signal, said reference signal From said second filter means, and said filter coefficient of said first filter means;
   the improvement comprising:
   first driving repetition period signal-forming means for forming a first pulse signal indicative of a driving repetition period of said power plant per a predetermined very small angle;
   second driving repetition period signal-forming means for dividing said first pulse signal to form a plurality of kinds of second pulse signals which are synchronous, respectively, with repetition periods of components of said vibrations and noises generated from respective component parts of said power plant and inherent to said power plant;
   tap length-changing means responsive to a time interval between adjacent pulses of each of said second pulse signals formed by said second driving signal-forming means for changing a tap length (number of taps) of said first filter;
   said first filter means having a plurality of adaptive digital filters, and said second filter means having a plurality of correcting digital filters corresponding, respectively, to said adaptive digital filters; and
   means for supplying said second pulse signals formed by said second driving repetition period signal-forming means as said predetermined input signal, respectively, to said adaptive digital filters and said correction digital filters.

2. A vibration/noise control system according to claim 1, including external signal-generating means for generating an external signal indicative of operating conditions of said power plant, and wherein said control signal-renewing means includes renewal amount-changing means for continuously changing an amount of renewal of said control signal in response to said external signal.

3. A vibration/noise control system according to claim 2, including a plurality of operating parameter-detecting means for generating respective detection signals indicative of respective operating parameters of said power plant, and wherein said external signal generated by said external signal-generating means comprises at least one combination of said detection signals, changing speed signals indicative of respective rates of change in said detection signals, and change acceleration signals indicative of respective accelerations of change in said detection signals.

4. A vibration/noise control system according to claim 2 or 3, wherein said external signal generated by said external signal-generating means is formed through computation by first computing means, said renewal amount-changing means including second computing means for calculating an amount of change in said amount of renewal based on an output from said first computing means indicative of a result of said computation of said external signal, and said error signal.

5. In a vibration/noise control system for a vehicle having a chassis, a compartment, and a power plant for driving said vehicle, periodic or semi-periodic vibrations and noises being generated from at least one vibration/noise source including said power plant, arranged at at least one predetermined location on said chassis or in said compartment, the system including:
   first filter means for generating a control signal for changing a transfer characteristic of at least one vibration/noise-transmitting path formed between said at least one source and said at least one predetermined location by filtering a predetermined input signal supplied thereto, said first filter means having a filter coefficient on which it operates;
   driving signal-forming means for converting said control signal into a driving signal;
   electromechanical transducer means responsive to said driving signal for controlling said vibrations and noises;
   error signal-forming means for forming an error signal indicative of residual vibrations and noises remaining after said vibrations and noises have been reduced by an output from said at least one electromechanical transducer means through addition of vectors;
   second filter means for representing a transfer characteristic of a vibration/noise-transmitting path formed between said driving signal-forming means and said error signal-forming means, and generating a reference signal; and control signal-renewing means for renewing said filter coefficient of said first filter means such that said error signal assumes the minimum value, based on said error signal, said reference signal from said second filter means, and said filter coefficient of said first filter means;

the improvement wherein said error signal-forming means comprises a plurality of error signal-forming means arranged at a plurality of predetermined locations as said at least one predetermined location for generating respective error signals corresponding, respectively, to said predetermined locations, said vibration/noise control system including operating condition-detecting means for detecting operating conditions of said power plant, and weighing means for weighing said error signals in dependence on said operating conditions of said power plant detected by said operating condition-detecting means.

6. A vibration/noise control system according to claim 5, wherein said plurality of error signal-forming means comprise a first error signal-generating means for generating an error signal indicative of residual error in controlled noises occurring in said compartment, a second error signal-generating means for generating an error signal indicative of residual error in controlled vibrations occurring in a floor of said compartment, and a third error signal-generating means for generating an error signal indicative of residual error in controlled vibrations related to steering of said vehicle.

7. A vibration/noise control system according to claim 3, wherein said power plant includes an intake passage, and a throttle valve arranged in said intake passage, and said operating parameter-detecting means at least includes rotational speed-detecting means for detecting a rotational speed of said power plant, intake passage absolute pressure-detecting means for detecting absolute pressure within said intake passage of said power plant, and valve opening-detecting means for detecting opening of said throttle valve.

8. A vibration/noise control system according to claim 5, wherein said power plant includes an intake passage, and a throttle valve arranged in said intake passage, and said operating condition-detecting means at least includes rotational speed-detecting means for detecting a rotational speed of said power plant, intake passage absolute pressure-detecting means for detecting absolute pressure within said intake passage of said power plant, and valve opening-detecting means for detecting opening of said throttle valve.

9. A vibration/noise control system according to claim 5, including power plant control means for controlling operation of said power plant, driving frequency-detecting means for detecting driving frequency of clock pulses on which said power plant control means operates, and sampling frequency-determining means for determining a sampling interval governing sequential operations of outputting and renewing said filter coefficient of said first filter means, according to timing of said driving frequency detected by said driving frequency-detecting means.

10. A vibration/noise control system according to claim 9, wherein said sampling frequency-determining means determines said sampling interval by dividing said driving frequency.

11. In a vibration/noise control system for a vehicle having a chassis, a compartment, and a power plant for driving said vehicle, periodic or semi-periodic vibrations and noises being generated from at least one vibration/noise source including said power plant, arranged at least one predetermined location on said chassis or in said compartment, the system including:

first filter means for generating a control signal for changing a transfer characteristic of at least one vibration/noise-transmitting path formed between said at least one source and said at least one predetermined location by filtering a predetermined input signal supplied thereto, said first filter means having a filter coefficient on which it operates;

driving signal-forming means for converting said control signal into a driving signal;

electromechanical transducer means responsive to said driving signal for controlling said vibrations and noises;

error signal-forming means for forming an error signal indicative of residual vibrations and noises remaining after said vibrations and noises have been reduced by an output from said at least one electromechanical transducer means through addition of vectors;

second filter means for representing a transfer characteristic of a vibration/noise-transmitting path formed between said driving signal-forming means and said error signal-forming means, and generating a reference signal; and control signal-renewing means for renewing said filter coefficient of said first filter means such that said error signal assumes the minimum value, based on said error signal, said reference signal from said second filter means, and said filter coefficient of said first filter means;

the improvement comprising:

first driving repetition period signal-forming means for forming a first pulse signal indicative of a driving repetition period of said at least one vibration/noise source per a predetermined very small angle;

second driving repetition period signal-forming means for dividing said first pulse signal to form a plurality of kinds of second pulse signals which are synchronous, respectively, with repetition periods of components of said vibrations and noises inherent to respective component parts of said at least one vibration/noise source;

sampling interval-determining means for determining a sampling interval governing sequential operations of outputting and renewing said filter coefficient of said first filter means, based upon timing of detection of the first pulse signal detected by the first driving repetition period signal-forming means;

transfer characteristic-correcting means for correcting a transfer characteristic of said second filter means according to said sampling interval determined by said sampling interval-determining means;

memory means for storing said transfer characteristic of said second filter means corrected by said transfer characteristic-correcting means;

means for setting a tap length of said first filter means to a value substantially equal to a ratio of a frequency of said second pulse signal to a frequency of said first pulse signal;

said first filter means having a plurality of adaptive digital filters, and said second filter means having a plurality of correcting digital filters corresponding, respectively, to said adaptive digital filters; and means for supplying said second pulse signals formed by said second driving repetition period signal-forming means, as said predetermined input signal, respectively, to said adaptive digital filters and said correction digital filters.

12. A vibration/noise control system according to claim 11, including:
   third filter means interposed between said first filter means and said electromechanical transducer means for correcting a rate of change in said control signal from said first filter means, said third filter means having a filter coefficient on which it operates;
   corrected signal-renewing means for renewing said filter coefficient of said third filter such that said error signal indicative of residual vibrations and noises assumes the minimum value, based on said error signal and said filter coefficient of said third filter means;
   change rate-calculating means for calculating a rate of change in said driving repetition period detected by said first driving repetition period signal-forming means;
   determining means for determining whether or not said rate of changed calculated by said change rate-calculating means is larger than a predetermined value; and
   means for causing said corrected signal-renewing means to operate while inhibiting said control signal-renewing means from operating when it is determined by said determining means that said rate of change calculated is larger than said predetermined value, and for causing said control signal-renewing means to operate while setting said filter coefficient of said third filter means to a fixed value and inhibiting said corrected signal-renewing means from operating.

13. A vibration/noise control system according to claim 12, wherein said third filter means comprises an adaptive digital filter having a number of taps which is one.

14. A vibration/noise control system according to claim 11 or 12, including means providing a plurality of frequency ranges of said sampling frequency corresponding, respectively, to different values of rotational speed of said power plant, said transfer characteristic-correcting means storing a plurality of transfer characteristics, said transfer characteristic-correcting means including selecting means for selecting an optimum transfer characteristic from said plurality of transfer characteristics, based on one of said frequency ranges corresponding to a value of said rotational speed of said power plant and said sampling interval detected by said sampling interval-determining means.

15. A vibration/noise control system according to claim 11 or 12, wherein said transfer characteristic-correcting means stores a high order transfer characteristic determined by a sampling frequency corresponding to a high frequency which is several times as high as a frequency corresponding to an upper limit of a rotational speed of said power plant.

16. A vibration/noise control system according to claim 5, 11 or 12, including pseudo-period train-forming means for forming a pseudo-period train of said filter coefficient of said second filter means, based on the number of taps of said first filter means, a time interval between adjacent pulses of each of said second pulse signals, and a sampling frequency governing sequential operations of outputting and renewing said filter coefficient of said first filter means, and memory means for storing said pseudo-period train of said filter coefficient of said second filter means formed by said pseudo-period train-forming means.

17. A vibration/noise control system according to claim 16, including point number-calculating means for calculating a point number indicative of a ratio of a repetition period of a component of said vibrations and noises to a sampling interval determined by said sampling frequency, based on said time interval between adjacent pulses of each of said second pulse signals and said sampling interval, equalizing means for making the number of taps of said first filter means equal to said point number calculated by said point number-calculating means; and
   wherein said pseudo-period train-forming means comprises first pseudo-period train-forming means for forming a first pseudo-period train of said filter coefficient of said second filter means, when said point number is smaller than the number of taps of said second filter means, by the use of the following equation:

$$C\sim = \sum_{a=0}^{JdivN} CA(n - aN)$$

$(n = 0, 1, 2, \ldots, n - 1)$
$(a = 0, 1, 2, \ldots, JdivN)$ where C represents said pseudo-period train, CA said filter coefficient of said second filter means, J the number of taps of said second filter means, N said point number, and JdivN an integer obtained from J/N by omitting fractions of J/N, and
   second pseudo-period train-forming means for forming a second pseudo-period train of said filter coefficient of said second filter means, when said point number is larger than the number of taps of said second filter means, by the use of the following equation:

$$C\sim = [CAj \; Cj=0, 1, \ldots, J-1), 0, \ldots 0]$$

where the number of 0 in $(0, \ldots, 0)$ is equal to $N-J$; and
   reference signal-forming means for forming a reference signal based on said first or second pseudo-period trains of said filter coefficient of said second filter means formed by said first or second pseudo-period train-forming means.

18. A vibration/noise control system according to claim 17, wherein said memory means stores two sets of each period of said pseudo-period train of said filter coefficient of said second filter means, and said reference signal-forming means forms said reference signal by shifting a reading range of said reference signal corresponding to one period of said pseudo-period train within said two sets of each period of said pseudo-period train of said filter coefficient of said second filter means.

19. A vibration/noise control system according to claim 17, wherein said reference signal-forming means forms said reference signal by shifting said reading range per each sampling interval based on said pseudo-period train of said filter coefficient of said second filter means.

20. A vibration/noise control system according to claim 11 or 12, wherein said power plant comprises a four-cycle engine, said engine having a crankshaft, said vibration/noise control system including reference signal-generating means for generating a reference signal whenever said crankshaft completes two rotations, synchronism-detecting means for detecting synchronism between said reference signal and each of said second pulse signals generated by said second driving repetition period-generating means, and synchronizing means for synchronizing said reference signal detected the next time with each of said second pulse signals when said synchronism-detecting means does not detect synchronism between any of said second pulse signals and said reference signal.

21. In a vibration/noise control system for a vehicle having a chassis, a compartment, and a power plant for driving said vehicle, periodic or semi-periodic vibrations and noises being generated from a vibration/noise source including at least said power plant, arranged at at least one predetermined location on said chassis or in said compartment, the system including:

first filter means for generating a control signal for changing a transfer characteristic of at least one vibration/noise-transmitting path formed between said at least one source and said at least one predetermined location by filtering a predetermined input signal supplied thereto, said first filter means having a filter coefficient on which it operates;

driving signal-forming means for converting said control signal into a driving signal;

electromechanical transducer means responsive to said driving signal for controlling said vibrations and noises;

error signal-forming means for forming an error signal indicative of residual vibrations and noises remaining after said vibrations and noises have been reduced by an output from said at least one electromechanical transducer means through addition of vectors;

second filter means for representing a transfer characteristic of a vibration/noise-transmitting path formed between said driving signal-forming means and said error signal-forming means, and generating a reference signal; and control signal-renewing means for renewing said filter coefficient of said first filter means such that said error signal assumes the minimum value, based on laid error signal, said reference signal from said second filter means, and said filter coefficient of said first filter means;

the improvement comprising:

first driving repetition period signal-forming means for forming a first pulse signal indicative of a driving repetition period of said power plant per a predetermined very small angle;

second driving repetition period signal-forming means for dividing said first pulse signal to form a plurality of kinds of second pulse signals which are synchronous, respectively, with repetition periods of components of said vibrations and noises generated from respective component parts of said power plant and inherent to said power plant;

random signal-generating means for a random signal having a small amplitude which is superposed on said control signal from said first filter means; and sampling interval-determining means for determining a sampling interval governing sequential operations of outputting and renewing said filter coefficient of said first filter means;

said second filter means comprising:

periodic signal component-eliminating means for forming a residual component signal by eliminating a periodic signal component ascribed to said power plant which is large in amplitude from said error signal formed by said error signal-forming means;

transfer characteristic-determining means for determining a transfer characteristic of a path through which said vibrations and noises are transmitted, based on said random signal generated by said random signal-generating means, said residual component signal formed by said periodic signal component-eliminating means, and said filter coefficient of said second filter means; and memory means for storing said transfer characteristic determined by said transfer characteristic-determining means.

22. A vibration/noise control system according to claim 21, wherein said periodic signal component-eliminating means includes filter means formed by an adaptive digital filter for forming a canceling signal, said filter means having a filter coefficient, residual component signal-forming means for forming said residual component signal based on said canceling signal and said error signal, and periodic signal-determining means for determining said periodic signal component based on said second pulse signal, said residual component signal, and said filter coefficient of said filter means.

23. A vibration/noise control system according to claim 21 or 22, including first memory means formed of a train of storages for sequentially storing said random signal per sampling interval determined by said sampling interval-determining means, and first pseudo-period train-forming means for forming a pseudo-period train of said random signal by sequentially adding up values of said random signal stored in said storages, and second memory means formed of a train of storages for sequentially storing said residual component signal per sampling interval determined by said sampling interval-determining means, and second pseudo-period train-forming means for forming a pseudo-period train of said residual component signal by sequentially adding up values of said residual component signal stored in said storages of said second memory means.

24. A vibration/noise control system according to any of claims 1, 2, or 21, wherein said power plant has a crankshaft, a camshaft, and a flywheel rigidly fitted on said crankshaft, said first driving repetition period signal-forming means comprising at least one of first detecting means for detecting a first basic pulse signal generated whenever said crankshaft rotates through a predetermined rotational angle, second detecting means for detecting a second basic pulse signal generated whenever said camshaft rotates through a predetermined rotational angle, third detecting means for detecting a third pulse signal from a spark signal used to cause combustion in said power plant, and fourth detecting means for detecting a fourth basic pulse generated whenever said flywheel rotates together with said crankshaft through a predetermined rotational angle, said first pulse signal comprising one of said signals detected by said first to fourth detecting means.

25. A vibration/noise control system according to any of claims 1, 2, or 21, wherein said power plant has a crankshaft, a camshaft, a flywheel rigidly fitted on said crankshaft, said first driving repetition period signal-forming means comprising at least one of first detecting means for detecting a first basic pulse signal generated whenever said crankshaft rotates through a predetermined rotational angle, second detecting means for detecting a second basic pulse signal generated whenever said camshaft rotates through a predetermined rotational angle, third detecting means for detecting a third pulse signal from a spark signal used to cause combustion in said power plant, and fourth detecting means for detecting a fourth basic pulse generated whenever said flywheel rotates together with said crankshaft through a predetermined rotational angle, said first pulse signal comprising a combination of two or more of said signals detected by said first to fourth detecting means.

26. A vibration/noise control system according to claim 21, wherein said sampling interval-determining means determines said sampling interval by multiplying said first pulse signal.

27. A vibration/noise control system according to claim 1, wherein said power plant comprises an engine having a plurality of cylinders, and other component parts, said repetition periods of components of said vibrations and noises generated from respective component parts of said power plant being classified into ones inherent to said cylinders of said engine and ones inherent to said other component parts of said engine, said adaptive digital filters of said first filter means and said correction filters of said second filter means being for controlling vibrations and noises from respective ones of said cylinders, said second pulse signals including signals corresponding to said ones inherent to said cylinders of said engine, which are supplied, as said predetermined input signal, respectively, to different ones of said adaptive digital filters and said correction digital filters, said control signal-renewing means renewing said filter coefficient of said adaptive digital filters of said first filter means such that an optimum transfer characteristic is generated, for controlling vibrations and noises to a corresponding one of said cylinders.

28. A vibration/noise control system according to claim 21, wherein said power plant comprises an engine having a plurality of cylinders, and other component parts, said repetition periods of components of said vibrations and noises generated from respective component parts of said power plant being classified into ones inherent to said cylinders of said engine and ones inherent to said other component parts of said engine, said first filter means having a plurality of adaptive digital filters, and said second filter means having a plurality of correcting digital filters corresponding, respectively, to said adaptive digital filters, said adaptive digital filters of said first filter means and said correction filters of said second filter means being for controlling vibrations and noises from respective ones of said cylinders, said second pulse signals including signals corresponding to said ones inherent to said cylinders of said engine, which are supplied, as said predetermined input signal, respectively, to different ones of said adaptive digital filters and said correction digital filters, said control signal-renewing means said filter coefficient of said adaptive digital filters of said first filter means such that an optimum transfer characteristic is generated, for controlling vibrations and noises to a corresponding one of said cylinders.

29. A vibration/noise control system according to claim 1 or 2, including power plant control means for controlling operation of said power plant, driving frequency-detecting means for detecting driving frequency of clock pulses on which said power plant control means operates, and sampling frequency-determining means for determining a sampling interval governing sequential operations of outputting and renewing said filter coefficient of said first filter means, according to timing of said driving frequency detected by said driving frequency-detecting means.

30. A vibration/noise control system according to claim 29, wherein said sampling frequency-determining means determines said sampling interval by dividing said driving frequency.

31. A vibration/noise control system according to claim 1 or 2, including pseudo-period train-forming means for forming a pseudo-period train of said filter coefficient of said second filter means, based on the number of taps of said first filter means, a time interval between adjacent pulses of each of said second pulse signals, and a sampling frequency governing sequential operations of outputting and renewing said filter coefficient of said first filter means, and memory means for storing said pseudo-period train of said filter coefficient of said second filter means formed by said pseudo-period train-forming means.

32. A vibration/noise control system according to 31, including point number-calculating means for calculating a point number indicative of a ratio of a repetition period of a component of said vibrations and noises to a sampling interval determined by said sampling frequency, based on said time interval between adjacent pulses of each of said second pulse signals and said sampling interval, equalizing means for making the number of taps of said first filter means equal to said point number calculated by said point number-calculating means; and wherein said pseudo-period train-forming means comprises first pseudo-period train-forming means for forming a first pseudo-period train of said filter coefficient of said second filter means, when said point number is smaller than the number of taps of said second filter means, by the use of the following equation:

$$C\sim = \sum_{a=0}^{JdivN} CA(n - aN)$$

$(n = 0, 1, 2, \ldots, n - 1)$
$(a = 0, 1, 2, \ldots, JdivN)$ where C represents said pseudo-period train, CA said filter coefficient of said second filter means, J the number of taps of said second filter means, N said point number, and JdivN an integer obtained from J/N by omitting fractions of J/N, and second pseudo-period train-forming means for forming a second pseudo-period train of said filter coefficient of said second filter means, when said point number is larger than the number of taps of said second filter means, by the use of the following equation:

$$C\sim = [CAj\ Cj = 0, 1, \ldots, J-1), 0, \ldots 0]$$

where the number of 0 in $(0, \ldots, 0)$ is equal to $N-J$; and reference signal-forming means for forming a reference signal based on said first or second pseudo-period trains of said filter coefficient of said second filter means formed by said first or second pseudo-period train-forming means.

33. A vibration/noise control system according to claim 32, wherein said memory means stores two sets of each period of said pseudo-period train of said filter coefficient of said second filter means, and said reference signal-forming means forms said reference signal by shifting a reading range of said reference signal corresponding to one period of said pseudo-period train within said two sets of each period of said pseudo-period train of said filter coefficient of said second filter means.

34. A vibration/noise control system according to claim 32, wherein said reference signal-forming means forms said reference signal by shifting said reading range per each sampling interval based on said pseudo-period train of said filter coefficient of said second filter means.

35. A vibration/noise control system according to claim 1 or 2, wherein said power plant comprises a four-cycle engine, said engine having a crankshaft, said vibration/noise control system including reference signal-generating means for generating a reference signal whenever said crankshaft completes two rotations, synchronism-detecting means for detecting synchronism between said reference signal and each of said second pulse signals generated by said second driving repetition period-generating means, and synchronizing means for synchronizing said reference signal detected the next time with each of said second pulse signals when said synchronism-detecting means does not detect synchronism between any of said second pulse signals and said reference signal.

36. A vibration/noise control system according to any of claims 5, 11, or 12, wherein said power plant has a crankshaft, a camshaft, and a flywheel rigidly fitted on said crankshaft, said first driving repetition period signal-forming means comprising at least one of first detecting means for detecting a first basic pulse signal generated whenever said crankshaft rotates through a predetermined rotational angle, second detecting means for detecting a second basic pulse signal generated whenever said camshaft rotates through a predetermined rotational angle, third detecting means for detecting a third pulse signal from a spark signal used to cause combustion in said power plant, and fourth detecting means for detecting a fourth basic pulse generated whenever said flywheel rotates together with said crankshaft through a predetermined rotational angle, said first pulse signal comprising one of said signals detected by said first to fourth detecting means.

37. A vibration/noise control system according to any of claims 5, 11, or 12, wherein said power plant has a crankshaft, a camshaft, a flywheel rigidly fitted on said crankshaft, said first driving repetition period signal-forming means comprising at least one of first detecting means for detecting a first basic pulse signal generated whenever said crankshaft rotates through a predetermined rotational angle, second detecting means for detecting a second basic pulse signal generated whenever said camshaft rotates through a predetermined rotational angle, third detecting means for detecting a third pulse signal from a spark signal used to cause combustion in said power plant, and fourth detecting means for detecting a fourth basic pulse generated whenever said flywheel rotates together with said crankshaft through a predetermined rotational angle, said first pulse signal comprising a combination of two or more of said signals detected by said first to fourth detecting means.

38. A vibration/noise control system according to claim 11 or 12, wherein said sampling interval-determining means determines said sampling interval by multiplying said first pulse signals.

39. A vibration/noise control system according to claim 11 or 12, wherein said power plant comprises an engine having a plurality of cylinders, and other component parts, said repetition periods of components of said vibrations and noises inherent to respective component parts of said at least one vibration/noise source being classified into ones inherent to said cylinders of said engine and ones inherent to said other component parts of said engine, said adaptive digital filters of said first filter means and said correction filters of said second filter means being for controlling vibrations and noises from respective ones of said cylinders, said second pulse signals including signals corresponding to said ones inherent to said cylinders of said engine, which are supplied, as said predetermined input signal, respectively, to different ones of said adaptive digital filters and said correction digital filters, said control signal-renewing means renewing said filter coefficient of said adaptive digital filters of said first filter means such that an optimum transfer characteristic is generated, for controlling vibrations and noises to a corresponding one of said cylinders.

* * * * *